US009026462B2

(12) United States Patent
Lin et al.

(10) Patent No.: US 9,026,462 B2
(45) Date of Patent: May 5, 2015

(54) PORTABLE POINT OF PURCHASE USER INTERFACES

(75) Inventors: Gloria Lin, San Ramon, CA (US); Amir Mahmood Mikhak, Cambridge, MA (US); Taido Lantz Nakajima, Cupertino, CA (US); Sean Anthony Mayo, Dover, NH (US); Michael Rosenblatt, Campbell, CA (US)

(73) Assignee: Apple Inc., Cupertino, CA (US)

( * ) Notice: Subject to any disclaimer, the term of this patent is extended or adjusted under 35 U.S.C. 154(b) by 655 days.

(21) Appl. No.: 12/286,421

(22) Filed: Sep. 30, 2008

(65) Prior Publication Data

US 2010/0082444 A1    Apr. 1, 2010

(51) Int. Cl.
*G06G 1/14* (2006.01)
*G06Q 20/00* (2012.01)
(Continued)

(52) U.S. Cl.
CPC ............ *G07G 1/0081* (2013.01); *G06Q 20/042* (2013.01); *G06Q 20/204* (2013.01); *G06Q 20/206* (2013.01); *G06Q 20/32* (2013.01); *G06Q 20/322* (2013.01); *G06Q 20/3278* (2013.01); *G06Q 20/40145* (2013.01); *G06F 21/32* (2013.01)

(58) Field of Classification Search
CPC ................... G06K 19/0723; G06K 19/07336; G06K 7/0008
USPC ..................................................... 705/17–22
See application file for complete search history.

(56) References Cited

U.S. PATENT DOCUMENTS 4,701,601 A    10/1987 Francini et al.
4,868,376 A    9/1989 Lessin et al.
(Continued)

FOREIGN PATENT DOCUMENTS

EP    1331561 A2    7/2003
WO    02/08863 A2    1/2002
(Continued)

OTHER PUBLICATIONS

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

(Continued)

*Primary Examiner* — Ig T An
(74) *Attorney, Agent, or Firm* — Novak Druce Connolly Bove + Quigg LLP

(57) ABSTRACT

Systems, methods, and devices for conducting sales transactions are provided. Embodiments include handheld, portable, electronic, point of purchase devices configured to acquire identification information from articles to be purchased, to determine a purchase price, and to acquire payment information for the purchase price. The point of purchase devices may include one or more input devices such as a near field communication device, a camera, a scanner, and a biometric sensor for acquiring the identification information and/or the payment information. In some embodiments, the near field communication device may be detachable from the point of purchase device. The point of purchase devices also may contain communication interfaces, such as a near field communication interface, a local area network interface, a short message service interface, and a personal area network interface, for transmitting the information to an external server.

9 Claims, 42 Drawing Sheets

(51) Int. Cl.

| | |
|---|---|
| G07G 1/00 | (2006.01) |
| G06Q 20/04 | (2012.01) |
| G06Q 20/20 | (2012.01) |
| G06Q 20/32 | (2012.01) |
| G06Q 20/40 | (2012.01) |
| G06F 21/32 | (2013.01) |
| G06Q 10/00 | (2012.01) |

(56) References Cited

U.S. PATENT DOCUMENTS

| | | | |
|---|---|---|---|
| 4,929,819 | A | 5/1990 | Collins, Jr. |
| 5,239,167 | A | 8/1993 | Kipp |
| 5,276,311 | A | 1/1994 | Hennige |
| 5,489,773 | A | 2/1996 | Kumar |
| 5,540,301 | A | 7/1996 | Dumont |
| 5,917,913 | A | 6/1999 | Wang |
| 5,918,211 | A * | 6/1999 | Sloane ............... 705/16 |
| 6,175,922 | B1 | 1/2001 | Wang |
| 6,400,270 | B1 | 6/2002 | Person |
| 6,512,919 | B2 | 1/2003 | Ogasawara |
| 6,684,269 | B2 | 1/2004 | Wagner |
| 6,694,387 | B2 | 2/2004 | Wagner |
| 6,910,697 | B2 | 6/2005 | Varatharajah et al. |
| 7,089,214 | B2 | 8/2006 | Wang |
| 7,128,274 | B2 | 10/2006 | Kelley et al. |
| 7,240,036 | B1 | 7/2007 | Mamdani et al. |
| 7,334,728 | B2 | 2/2008 | Williams |
| 7,376,591 | B2 | 5/2008 | Owens |
| 7,411,503 | B2 * | 8/2008 | Stewart et al. ............ 340/572.1 |
| 7,464,050 | B1 | 12/2008 | Deaton et al. |
| 7,593,873 | B1 * | 9/2009 | Oakes, III ............... 705/26.1 |
| 8,239,276 | B2 | 8/2012 | Lin et al. |
| 2002/0065728 | A1 | 5/2002 | Ogasawara |
| 2002/0082931 | A1 | 6/2002 | Siegel et al. |
| 2002/0170961 | A1 * | 11/2002 | Dickson et al. .............. 235/383 |
| 2002/0178088 | A1 | 11/2002 | Lurie et al. |
| 2003/0110097 | A1 * | 6/2003 | Lei ................... 705/27 |
| 2004/0203352 | A1 | 10/2004 | Hall et al. |
| 2005/0116027 | A1 | 6/2005 | Algiene et al. |
| 2005/0125343 | A1 | 6/2005 | Mendelovich |
| 2005/0131871 | A1 | 6/2005 | Howard et al. |
| 2005/0136949 | A1 * | 6/2005 | Barnes, Jr. ............... 455/461 |
| 2005/0160004 | A1 | 7/2005 | Moss et al. |
| 2005/0187843 | A1 | 8/2005 | Lapsley et al. |
| 2005/0222961 | A1 | 10/2005 | Staib et al. |
| 2006/0085297 | A1 * | 4/2006 | Minerley ................. 705/28 |
| 2006/0111944 | A1 | 5/2006 | Sirmans et al. |
| 2006/0187046 | A1 * | 8/2006 | Kramer ............. 340/572.3 |
| 2006/0213972 | A1 | 9/2006 | Kelley et al. |
| 2006/0235796 | A1 * | 10/2006 | Johnson et al. ............. 705/44 |
| 2006/0243609 | A1 | 11/2006 | Cole et al. |
| 2006/0266822 | A1 | 11/2006 | Kelley et al. |
| 2006/0287004 | A1 | 12/2006 | Fuqua |
| 2007/0022058 | A1 | 1/2007 | Labrou et al. |
| 2007/0051801 | A1 * | 3/2007 | Garver ................. 235/383 |
| 2007/0088596 | A1 | 4/2007 | Berkelhamer et al. |
| 2007/0150369 | A1 | 6/2007 | Zivin |
| 2007/0156579 | A1 * | 7/2007 | Manesh .................. 705/39 |
| 2007/0190939 | A1 | 8/2007 | Abel |
| 2007/0205275 | A1 | 9/2007 | Nicola et al. |
| 2007/0228179 | A1 | 10/2007 | Atkinson |
| 2007/0235539 | A1 | 10/2007 | Sevanto et al. |
| 2007/0255652 | A1 | 11/2007 | Tumminaro et al. |
| 2007/0265033 | A1 | 11/2007 | Brostrom |
| 2007/0278290 | A1 | 12/2007 | Messerges et al. |
| 2008/0005195 | A1 | 1/2008 | Li |
| 2008/0010215 | A1 * | 1/2008 | Rackley, III et al. ............ 705/70 |
| 2008/0052243 | A1 | 2/2008 | Narayanaswami et al. |
| 2008/0059323 | A1 | 3/2008 | Cheng et al. |
| 2008/0113614 | A1 | 5/2008 | Rosenblatt |
| 2008/0113658 | A1 | 5/2008 | Bloebaum et al. |
| 2008/0154734 | A1 | 6/2008 | Fernandez et al. |
| 2008/0162291 | A1 | 7/2008 | Schuler et al. |
| 2008/0191878 | A1 * | 8/2008 | Abraham ............... 340/572.1 |
| 2008/0222048 | A1 * | 9/2008 | Higgins et al. ............. 705/67 |
| 2008/0237340 | A1 * | 10/2008 | Emmons et al. ............. 235/383 |
| 2008/0242274 | A1 * | 10/2008 | Swanburg et al. ......... 455/414.1 |
| 2008/0259829 | A1 | 10/2008 | Rosenblatt |
| 2008/0261528 | A1 | 10/2008 | Rosenblatt |
| 2008/0261529 | A1 | 10/2008 | Rosenblatt |
| 2008/0296392 | A1 * | 12/2008 | Connell et al. ............ 235/472.01 |
| 2010/0082485 | A1 | 4/2010 | Lin et al. |
| 2010/0289627 | A1 * | 11/2010 | McAllister et al. ......... 340/10.42 |
| 2012/0296770 | A1 | 11/2012 | Lin et al. |

FOREIGN PATENT DOCUMENTS

| | | |
|---|---|---|
| WO | 2008/112497 A1 | 9/2008 |
| WO | 2009/018255 A2 | 2/2009 |

OTHER PUBLICATIONS

NFC Forum; Near Field Communication and the NFC Forum: The Keys to Truly Interoperable Communications; http://www.nfc-forum.org/resources/white_papers/nfc_forum_marketing_white_paper.pdf; Wakefield, MA, USA 2007.

Near Field Communication in the real world part I; Turning the NFC promise into profitable, everyday applications; http://www.nfc-forum.org/resources/white_papers/Innovision_whitePaper1.pdf ; Innovation Research & Technology plc; Gloucestershire, United Kingdom.

Near Field Communication in the real world part II, Using the right NFC tag type for the right NFC application; http://www.nfc-forum.org/resources/white_papers/Innovision_whitePaper2.pdf ; Innovation Research & Technology plc; Gloucestershire, United Kingdom.

Near Field Communication in the real world part III, Moving to System on Chip (SoC) integration; http://www.nfc-forum.org/resources/white_papers/Innovision_whitePaper3.pdf ; Innovation Research & Technology plc; Gloucestershire, United Kingdom 2007.

Ricker Thomas; Nokia's 6212 with Bluetooth NFC: Let the Pairing revolution being!; http://www.engadget.com/2008/04/15/nokias-6212-with-bluetooth-nfc-let-the-pairing-revolution-begi/; Engadget; 2008.

NFC trial in NYC enables merchant and transit payment via cell phones; http://www.contactlessnews.com/2006/12/14/nfc-trial-in-nyc-enables-merchant-and-transit-payments-via-cell-phones; Citi/ATT/MasterCard/Nokia run trial in NYC with MTA et al.; Contactless News; 2008.

Port Authority, NJ TRANSIT to test contactless cards; http://www.contactlessnews.com/2008/02/25/port-authority-nj-transit-to-test-contactless-cards/; Port Authority/NJ Transit run compatible trial with NYC; Contactless News 2008.

BART NFC trial first to use mobile phones to pay for fares, food; http://www.contactlessnews.com/2008/01/29/bart-nfc-trial-first-to-use-mobile-phones-to-pay-for-fares-food/; BART et al. run trial for automated food and transit payments; Contactless News 2008.

New NFC trial launched in Spokane; U.S. Bank/MasterCard run trial in Spokane, WA; http://www.contactlessnews.com/2008/01/28/new-nfc-trial-launched-in-spokane/; Contactless News 2008.

"Cairo Launches Online Shopping Resource to Find and Track Local Retail Sales, Saving Consumers Time and Money." Business Wire. Oct. 25, 2004. [recovered from Dialog on Mar. 16, 2012].

* cited by examiner

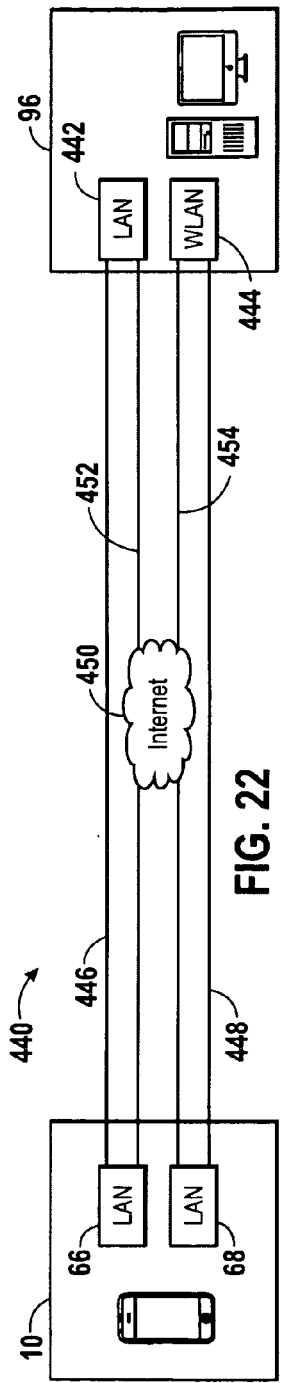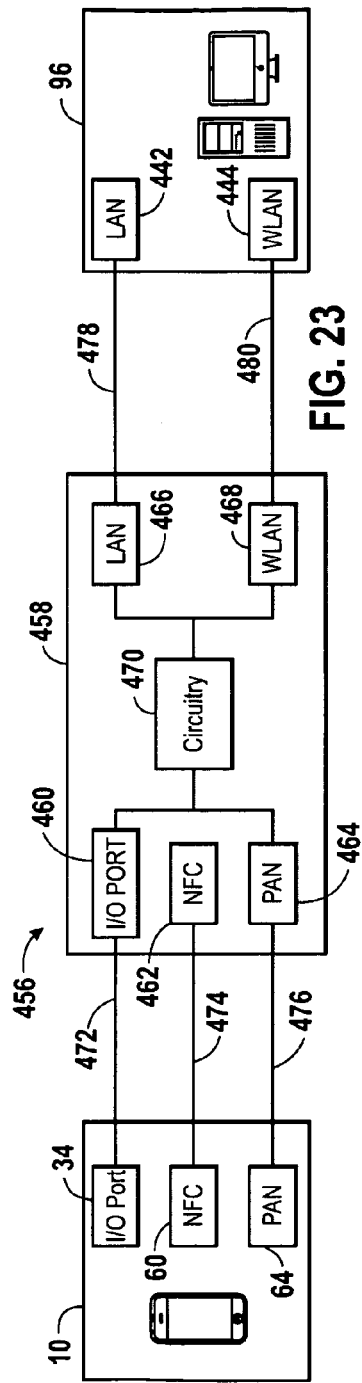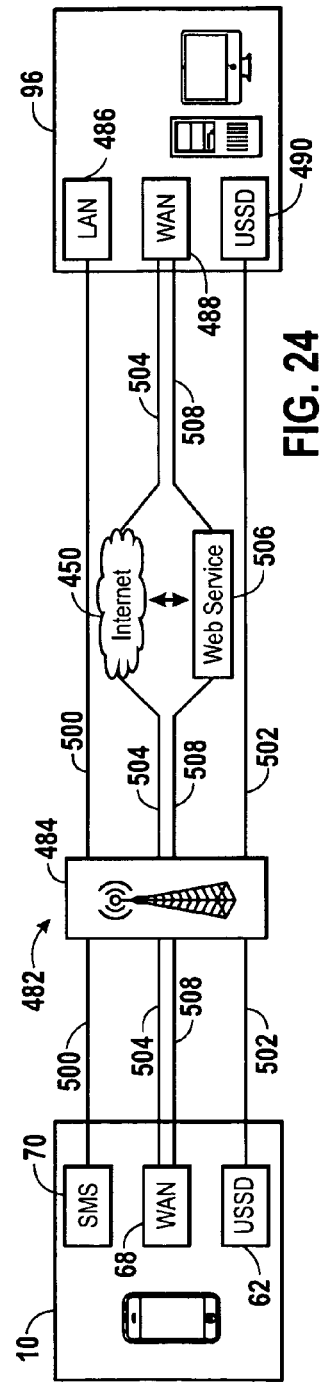

PORTABLE POINT OF PURCHASE USER INTERFACES

BACKGROUND OF THE INVENTION

1. Field of the Invention

Embodiments of the present disclosure relate generally to handheld electronic devices and, more particularly, to electronic devices configured to conduct sales transactions.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Merchants often use point-of-sale or point-of-purchase (POP) systems to complete sales transactions. Typical POP systems may include several independent devices, each performing a different function. For example, a scanner may ring up articles of merchandise and transmit the amount to a cash register to calculate the amount due. The cash register may then transmit the amount due to a credit card reader to receive payment.

The use of multiple devices often results in an immobile POP system due to device sizes and communication requirements. The fixed location of a POP system also may decrease operational flexibility and create time-consuming sales transactions. Today's fast-paced consumers may be unwilling or unable to wait to purchase merchandise, resulting in lost sales and profits for the merchant. Further, sales transactions frequently occur outside of the traditional retail environment in mobile locations. For example, consumers may purchase food, drinks, and magazines on an airplane or subway.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for performing sales transactions using a portable device. In accordance with one disclosed embodiment, a portable electronic device may be capable of completing an entire sales transaction including ringing up articles of merchandise, receiving payment information, and communicating with an external server to receive authorization for payment. The electronic device may include input devices, such as a near field communication (NFC) interface, camera, and scanner, for retrieving article information and payment information. The electronic device also may use a device identification networking protocol to establish a communication link with another device in order to receive payment information. A software application of the device may calculate the amount due and may retrieve inventory and price information from the merchant's server.

The electronic device also may include one or more communication interfaces for communicating with the merchant's server over a wireless network, personal area network, near field communication channel, or the like. In certain embodiments, the electronic device may use a smart selection method to determine the most suitable communication interface based on data transmission speed, security features, and other user preferences. The electronic device also may include applications for performing various sales related transactions such as exchanging information for a merchant rewards program, establishing customer financing, and performing returns and exchanges.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 22 is a diagrammatical representation of communication channels for conducting a sales transaction in accordance with one embodiment;

FIG. 23 is a diagrammatical representation of communication channels for conducting a sales transaction in accordance with one embodiment;

FIG. 24 is a diagrammatical representation of communication channels for conducting a sales transaction in accordance with one embodiment;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for conducting a sales transaction using a handheld, portable electronic device. The handheld electronic device integrates several functionalities for performing sales transactions, including but not limited to, retrieving merchandise information, acquiring payment information, and obtaining payment authorization. One or more input devices, such as a scanner, camera, keypad, or near field communication (NFC) device, may be used to acquire merchandise information and payment information. For example, a NFC device may be used to scan an article of merchandise and a camera may be used to receive credit card information. The handheld electronic device may communicate with an internal memory and/or an external server to acquire price information and payment authorization through a selected communication channel, such as a wide area network (WAN), local area network (LAN), personal area network (PAN), or near field communication channel. The electronic device may display a notification authorizing the sales transaction. The electronic device also may provide additional functionalities, such as exchanging information for a merchant rewards program, transmitting receipts, and obtaining financing.

Figure 1:
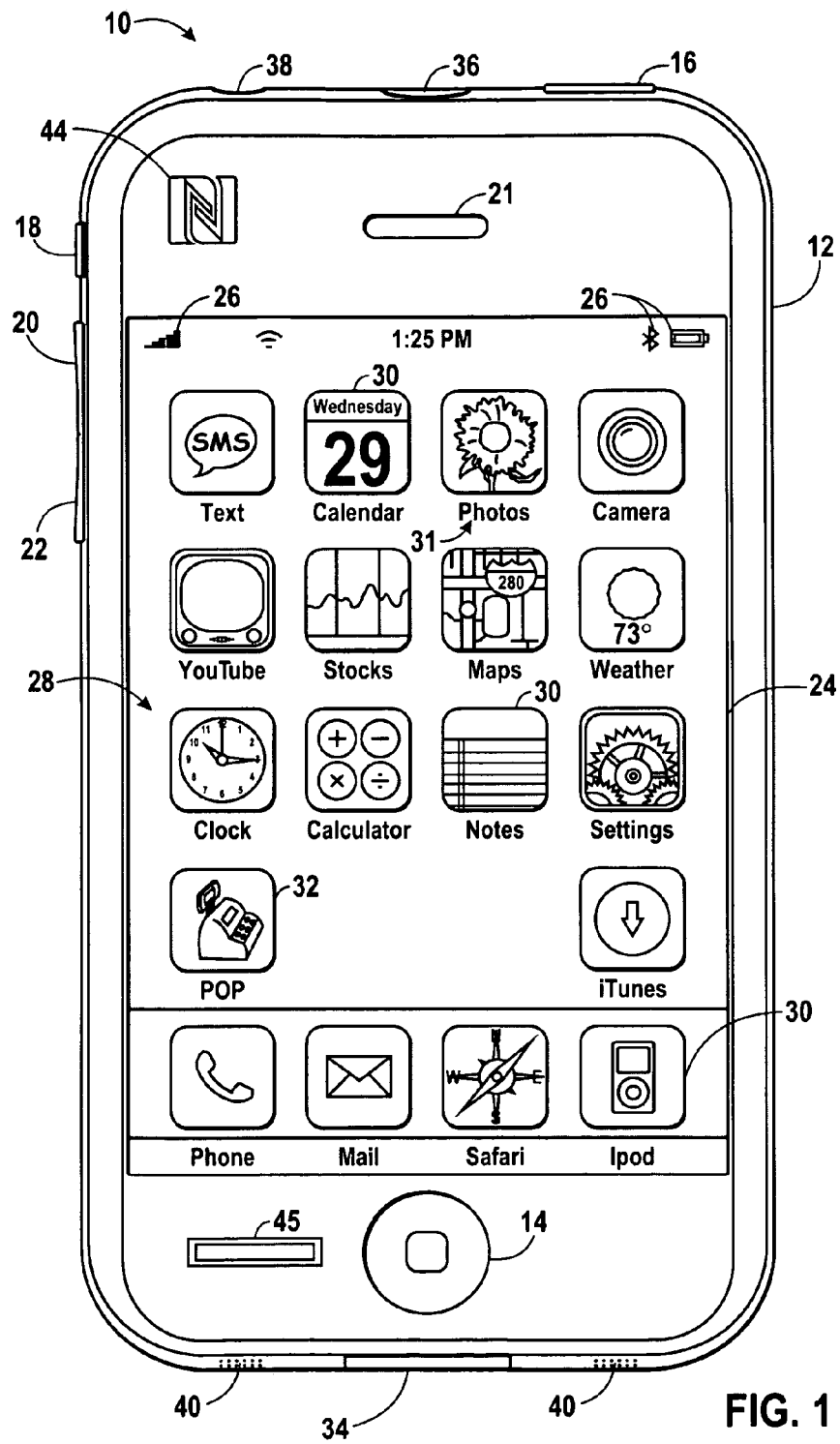
FIG. 1 is a front view of a portable electronic device in accordance with one embodiment.

FIG. 1 illustrates an electronic device 10 that may make use of the techniques for conducting a sales transaction described above. As illustrated in FIG. 1, the electronic device 10 may be a handheld device incorporating the functionality of one or more portable devices, such as a media player, a cellular phone, a personal data organizer, and so forth. Depending, of course, on the functionalities provided by the electronic device 10, a user may scan articles of merchandise, listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connections, such as Bluetooth and near field communication. By way of example, the electronic device 10 may be a model of an iPhone®, or a derivative thereof provided for sales transactions, available from Apple Inc. of Cupertino, Calif.

In the depicted embodiment, the device 10 includes an enclosure 12 that protects the interior components from physical damage and shields them from electromagnetic interference. The enclosure 12 may be formed from any suitable material such as plastic, metal or a composite material and may allow certain frequencies of electromagnetic radiation to pass through to wireless communication circuitry within the device 10 to facilitate wireless communication.

The enclosure 12 allows access to user input structures 14, 16, 18, 20, and 22 through which a user may interface with the device. Each user input structure 14, 16, 18, 20, and 22 may be configured to control a device function when actuated. For example, the input structure 14 may include a button that when pressed causes a "home" screen or menu to be displayed on the device. The input structure 16 may include a button for toggling the device 10 between a sleep mode and a wake mode. The input structure 18 may include a two-position slider that silences a ringer for the cell phone application. The input structures 20 and 22 may include buttons for increasing and decreasing the volume output of the device 10. In general, the electronic device 10 may include any number of user input structures existing in various forms including buttons, switches, control pads, keys, knobs, scroll wheels, or other suitable forms.

The device 10 also includes a display 24 that may display various images generated by the device. For example, the display 24 may show photos of merchandise, advertisements, movies, and/or data, such as text documents, work schedules, financial spreadsheets, text messages, and e-mail, among other things. The display 24 also may display system indicators 26 that provide feedback to a user, such as power status, signal strength, call status, external device connection, and the like. The display 24 may be any type of display such as a liquid crystal display (LCD), a light emitting diode (LED) display, an organic light emitting diode (OLED) display, or other suitable display. Additionally, the display 24 may include a touch-sensitive element, such as a touch screen.

The display 24 may be used to display a graphical user interface (GUI) 28 that allows a user to interact with the device. The GUI 28 may include various layers, windows, screens, templates, elements, or other components that may be displayed in all, or a portion, of the display 24. Generally, the GUI 28 may include graphical elements that represent applications and functions of the device 10. The graphical elements may include icons and other images representing buttons, sliders, menu bars, and the like. In certain embodiments, the user input structure 14 may be used to display a home screen of the GUI 28. For example, in response to actuation of the input structure 14, the device may display graphical elements, shown here as icons 30, of the GUI 28. The icons 30 may correspond to various applications of the device 10 that may open upon selection of an icon 30. The icons 30 may be selected via a touch screen included in the display 24, or may be selected by user input structures, such as a wheel or button.

The icons 30 may represent various layers, windows, screens, templates, elements, or other components that may be displayed in some or all of the areas of the display 24 upon selection by the user. Furthermore, selection of an icon 30 may lead to a hierarchical navigation process, such that selection of an icon 30 leads to a screen that includes one or more additional icons or other GUI elements. Textual indicators 31 may be displayed on or near the icons 30 to facilitate user interpretation of each icon 30. It should be appreciated that the GUI 30 may include various components arranged in hierarchical and/or non-hierarchical structures.

When an icon 30 is selected, the device 10 may be configured to open an application associated with that icon and display a corresponding screen. For example, when the Point of Purchase (POP) icon 32 is selected, the device 10 may be configured to open an application for conducting a sales transaction. The application may facilitate sales based transactions such as scanning an article of merchandise, receiving payment information, and retrieving customer information. For each application, screens including additional icons or other GUI elements may be displayed on the display 24. Of course, if the device 10 is configured to be used solely or primarily for sales transactions, the POP icon 32 may not be present, as the related application may already be loaded and running at device startup.

The electronic device 10 also may include various input and output (I/O) ports 34, 36, and 38 that allow connection of the device 10 to external devices. The I/O port 34 may be a connection port for transmitting and receiving data files, such as media files or customer order files. For example, the I/O port 34 may be a proprietary port from Apple Inc. In certain embodiments, they I/O port 34 may be used to connect an external scanning device, such as a barcode reader. The I/O port 36 may be a connection slot for receiving a subscriber identify module (SIM) card. The I/O port 38 may be a headphone jack for connecting audio headphones. In other embodiments, the device 10 may include any number of I/O ports configured to connect to a variety of external devices, including but not limited to a power source, a printer, a computer, and an intermediate device, such as a dock, for communicating with an external server. In certain embodiments, multiple ports may be included on the device. The ports may be any interface type, such as a universal serial bus (USB) port, serial connection port, Firewire port, IEEE-1394 port, or AC/DC power connection port.

The electronic device 10 may also include various audio input and output structures 40 and 42. For example, the audio input structures 40 may include one or more microphones for receiving voice data from a user. The audio output structures 42 may include one or more speakers for outputting audio data, such as data received by the device 10 over a cellular network. Together, the audio input and output structures 40 and 42 may operate to provide telephone functionality. Further, in some embodiments, the audio input structures 40 may include one or more integrated speakers serving as audio output structures for audio data stored on the device 10. For example, the integrated speakers may be used to play music stored in the device 10.

The device 10 may further include a near field communication (NFC) device 44. The NFC device 44 may be located within the enclosure 12, and a mark or symbol on the exterior of the enclosure 12 may identify its location within the enclosure 12. The NFC device 44 may allow for close range communication at relatively low data rates (424 kb/s), and may comply with standards such as ISO 18092 or ISO 21481, or it may allow for close range communication at relatively high data rates (560 Mbps), and may comply with the TransferJet® protocol. In certain embodiments, the communication may occur within a range of approximately 2 to 4 cm. The close range communication with the NFC device 44 may take place via magnetic field induction, allowing the NFC device 44 to communicate with other NFC devices or to retrieve information from tags having radio frequency identification (RFID) circuitry. As discussed below, the NFC device 44 may provide a manner of acquiring merchandise information, acquiring payment information, and communicating with an external server.

Information also may be acquired through a biometric sensor 45. The biometric sensor 45 may be located within the enclosure 12 and may be used to verify or identify a user. For example, the biometric sensor 45 may be used in conjunction with a smartcard to verify the identity of a consumer. In another example, the biometric sensor 45 may be used to identify a customer and obtain payment information for that customer by accessing a database of stored customer information. The database may be maintained by the merchant or by a third party service provider. The biometric sensor 45 may include a fingerprint reader or other feature recognition device and may operate in conjunction with a feature-processing program stored on the electronic device 10.

Figure 2:
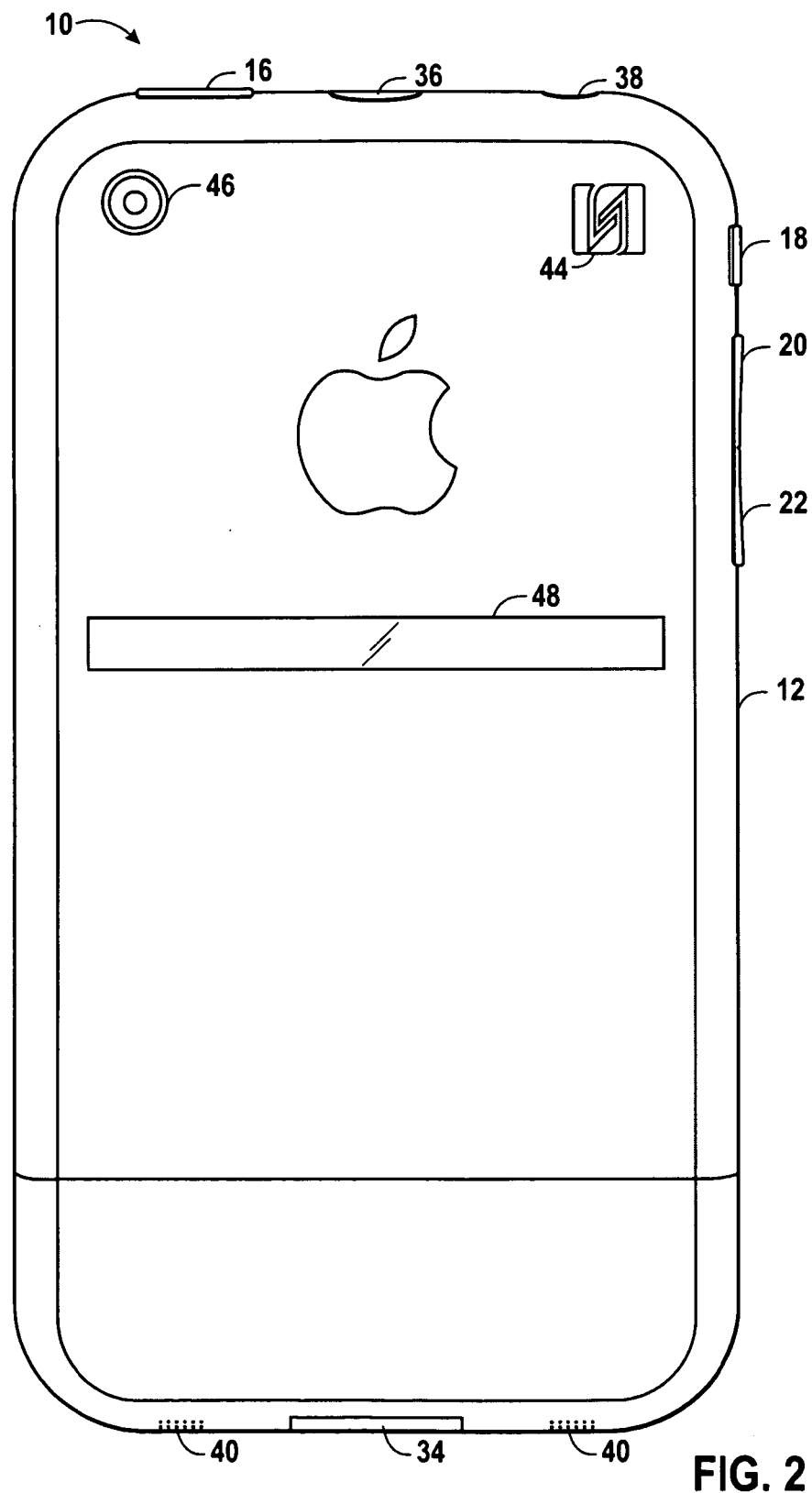
FIG. 2 is a rear view of the portable electronic device of FIG. 1 in accordance with one embodiment.

FIG. 2 illustrates the back of the electronic device 10. Two additional input devices may be accessed from the back of the device 10, a camera 46 and a scanner 48. Of course, the locations of the camera 46 and the scanner 48 are provided for illustrative purposes. In other embodiments, the camera 46 and scanner 48 may be accessed from the front or side of the device 10.

The camera 46 may be used to capture images or video and may be used to obtain merchandise information or payment information. For example, the camera 46 may be used to capture an image of a credit card to obtain payment information. In another example, the camera 46 may be used to take a picture of an item for purchase to identify the item. The camera 46 may be a 2.0 megapixel camera or other suitable camera and may operate in conjunction with image processing software stored within the electronic device 10.

The scanner 48 may be located within the enclosure 12 and may be used to obtain merchandise information and/or payment information. For example, the scanner 48 may be used to read a stock-keeping unit (SKU) number of an article for purchase. In another example, the scanner 48 may be used to read bank account information from a check. The scanner 48 may be a laser scanner, LED scanner, or other suitable scanning device and may operate in conjunction with a decoder stored within the electronic device 10.

Figure 3:
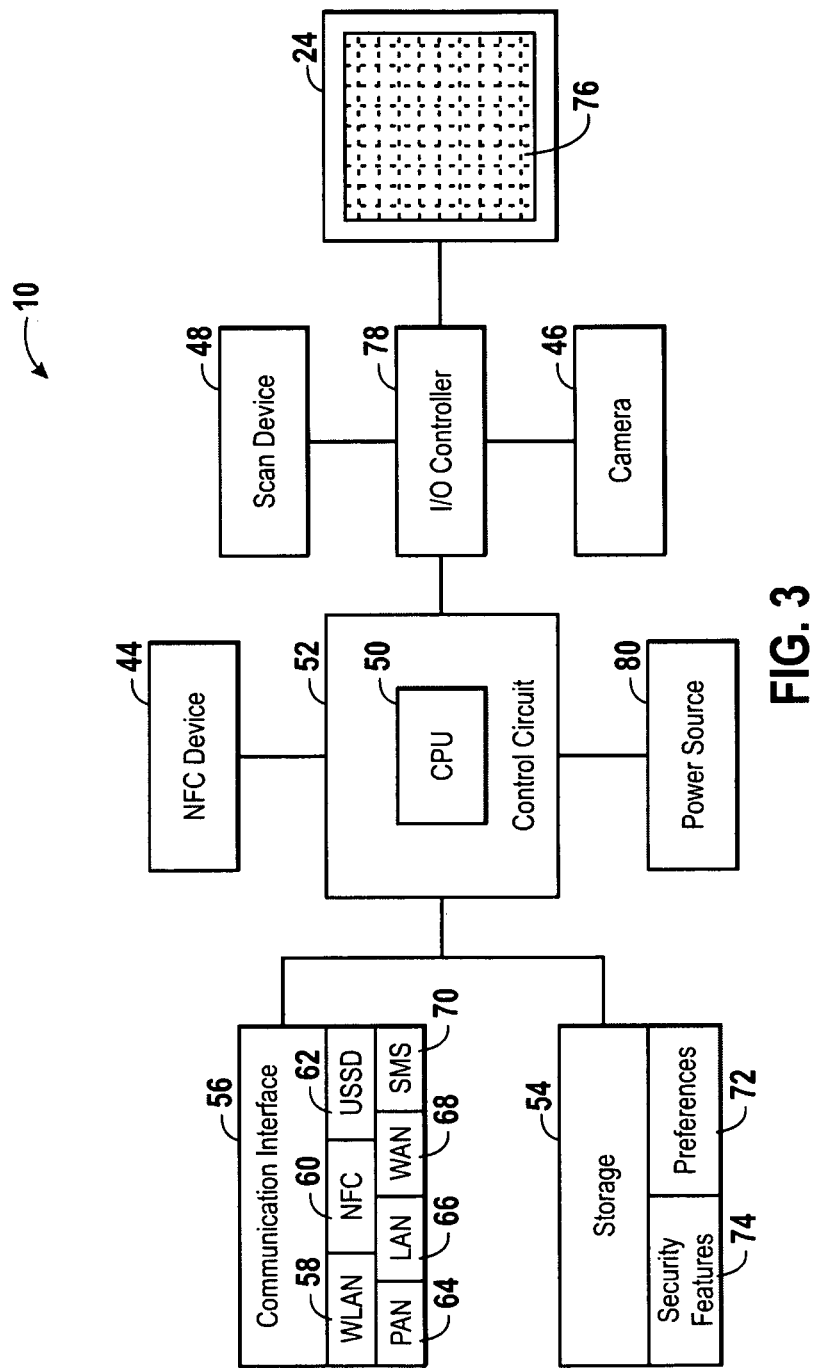
FIG. 3 is a simplified block diagram of the device of FIGS. 1 and 2 in accordance with one embodiment.

Additional details of the illustrative device 10 may be better understood through reference to FIG. 3, which is a block diagram illustrating various components and features of the device 10 in accordance with one embodiment of the present invention. The block diagram includes the display 24, the NFC device 44, the camera 46, and the scan device 48 discussed above, as well as many other components.

The operation of the device 10 may be controlled by a central processing unit (CPU) 50 and a control circuit 52 that provide the processing capability required to execute the operating system, programs, GUI 28, and any other functions of the device 10. The CPU 50 may include a single processor or it may include a plurality of processors. For example, the CPU 50 may include "general purpose" microprocessors, a combination of general and special purpose microprocessors, instruction set processors, graphics processors, video processors, and/or related chips sets, and/or special purpose microprocessors. The control circuit 52 may include one or more data buses for transferring data and instructions between components of the device 10. The control circuit 52 also may include on board memory for caching purposes.

Information used by the CPU 50 may be located within long-term storage 54. The long-term storage 54 of electronic device 10 may be used for storing data required for the operation of the CPU 50 as well as other data required by the device 10. For example, the storage 54 may store the firmware for the electronic device 10 that is used by the CPU 50. The firmware may include an operating system, as well as other programs that enable various functions of the electronic device 10, GUI functions, and/or processor functions. The storage 54 also may store components for the GUI 28, such as graphical elements, screens, and templates. Additionally, the long term storage 54 may store data files such as media (e.g., music and video files), image data, software, preference information (e.g., media playback preferences), wireless connection information (e.g., information that may enable the device 10 to establish a wireless connection, such as a telephone connection), subscription information (e.g., information that maintains a record of podcasts, television shows or other media to which a user subscribes), telephone information (e.g., telephone numbers), and any other suitable data.

In certain embodiments, the storage 54 may include an image-processing program for extracting textual or encoded information from an image. For example, the image-processing program may be used to extract credit card information from a picture of the credit card. In another example, the image-processing program may be used to identify an article from the store database using the picture of the article. The long-term storage 54 may be non-volatile memory such as read only memory, flash memory, a hard drive, or any other suitable optical, magnetic, or solid-state computer readable media, as well as a combination thereof.

One or more communication interfaces 56 may provide additional connectivity channels for receiving and transmitting information. The communication interface 56 may represent, for example, one or more network interface cards (NIC) or a network controller as well as associated communication protocols. The communication interface 56 may include several types of interfaces, including but not limited to, a wireless local area network (WLAN) interface 58, an NFC interface 60, an unstructured supplementary service data (USSD) interface 62, a personal area network (PAN) interface 64, a local area network (LAN) interface 66, a wide area network (WAN) interface, and a short message service (SMS) interface 70.

The PAN interface 64 may provide capabilities to network with, for example, a Bluetooth® network, an IEEE 802.15.4 (e.g., ZigBee) network, or an ultra wideband network (UWB). As should be appreciated, the networks accessed by the PAN interface 64 may, but do not necessarily, represent low power, low bandwidth, or close range wireless connections. The PAN interface 64 may permit one electronic device 10 to connect to another local electronic device, such as a computer or portable media player, via an ad-hoc or peer-topeer connection. However, the connection may be disrupted if the separation between the two electronic devices exceeds the range of the PAN interface 64.

The LAN interface 66 and WLAN interface 58 may provide longer-range communication channels, generally exceeding the range available via the PAN interface 64. The LAN interface 66 may represent an interface to a wired Ethernet-based network, and the WLAN interface 58 may represent an interface to a wireless LAN, such as an IEEE 802.11x wireless network. Additionally, in many cases, a connection between two electronic devices via the LAN interface 66 may involve communication through a network router or other intermediary device.

Connection to a wide area network (WAN) may be provided through the WAN interface 68. In certain embodiments, the wide area network may include a private network maintained by a merchant for transferring information between retail stores. The WAN interface 68 may permit a connection to a cellular data network, such as the Enhanced Data rates for GSM Evolution (EDGE) network or the 3G network. When connected via the WAN interface 68, the electronic device 10 may remain connected to the Internet and, in some embodiments, to another electronic device, despite changes in location that might otherwise disrupt connectivity via the PAN interface 64 or the LAN interface 66.

In certain embodiments, the device 10 may use a device identification networking protocol to establish a connection with an external device through a network interface. For example, both the device 10 and the external device may broadcast identification information using internet protocol (IP). The devices may then use the identification information to establish a network connection, such as a PAN connection or a LAN connection, between the devices. By way of example, the device identification protocol may be Bonjour® by Apple Inc.

Small size communications may be sent using the USSD interface 62 and the SMS interface 70. The SMS interface 70 may allow transmission of text messages of 140 bytes or less. In certain embodiments, larger size messages may be sent using concatenated SMS. The USSD interface 62 may facilitate the transmission of real-time text messages over GSM signaling channels. For example, the USSD interface 62 may be used to query inventory or price information for an article of merchandise.

Close range communication may occur through the NFC interface 60. The near field communication (NFC) interface 60 may operate in conjunction with the NFC device 44 to allow for close range communication. The NFC interface 60 may exist as a separate component, may be integrated into another chipset, or may be integrated with the NFC device 44, for example, as part of a system on a chip (SoC). The NFC interface 60 may include one or more protocols, such as the Near Field Communication Interface and Protocols (NFCIP-1) for communicating with another NFC enabled device. The protocols may be used to adapt the communication speed and to designate one of the connected devices as the initiator device that controls the near field communication. In certain embodiments, the NFC interface 60 may be used to receive information, such as the service set identifier (SSID), channel, and encryption key, used to connect through another communication interface 58, 64, 66, or 68.

The NFC interface 60 may control the near field communication mode of the NFC device 44. For example, the NFC interface 60 may be configured to switch the NFC device 44 between a reader/writer mode for reading NFC tags, a peer-to-peer mode for exchanging data with another NFC enabled device, and a card emulation mode for allowing another NFC enabled device to read information. The NFC interface 60 also may be configured to switch the device 44 between an active mode where the device 44 generates its own RF field and a passive mode where the device 44 uses load modulation to transfer data to another device generating a RF field. Operation in passive mode may prolong the battery life of the device 10. In certain embodiments, the modes of the NFC device 44 may be controlled based on user or manufacturer preferences 72.

The preferences 72 may be stored within the storage 54 and may be set by the device manufacturer or by a user through the GUI 28 (FIG. 1). The preferences 72 may determine properties of a communication interface 56, 58, 60, 62, 64, 66, 68, and 70. For example, the preferences 72 may include a list of networks to which the device 10 may connect. In another example, the preferences 72 may specify the mode of the NFC device 44. For example, the NFC device 44 may operate in a passive mode unless the POP application is running.

The preferences 72 also may govern the selection priority between the communication interfaces 56, 58, 60, 62, 64, 66, 68, and 70. For example, the device 10 may be configured to communicate through the LAN interface 66 whenever a LAN connection is available. In certain embodiments, the preferences 72 may be based on properties of the data to be transferred. For example, a user may specify that purchases involving a large number of articles be communicated only through the WLAN interface 58 or the WAN interface 68. The preferences 72 may be based on a number of factors, including, but not limited to, the currency amount of a sales transaction, the size of the data to be transferred, the type of data, and the security features 74 available for that communication interface.

The security features 74 may include one or more cryptographic protocols, such as a secure sockets layer (SSL) protocol or a transport layer security (TLS) protocol, for establishing secure communications between the device 10 and another device. In certain embodiments, the security features 74 may be configured to authenticate a device in accordance with the teachings of the commonly assigned U.S. patent application Ser. No. 12/286,313, entitled "Systems and Methods for Secure Wireless Transactions," to Michael Rosenblatt et al., filed on Sep. 30, 2008, incorporated herein by reference in its entirety for all purposes. The security features 74 may be particularly useful when transmitting payment information, such as credit card information or bank account information. The security features 74 also may include a secure storage area that may have restricted access. For example, a pin or other verification may need to be provided to access the secure storage area. In certain embodiments, some or all of the preferences 72 may be stored within the secure storage area. Further, security information, such as an authentication key, for communicating with a retail server may be stored within the secure storage area. In certain embodiments, the secure storage area may include a microcontroller embedded within the electronic device 10.

Information received through the communication interface 56, as well as information contained in the storage 54, may be displayed on the display 24. As noted above, a user may select information to display through the GUI 28 (FIG. 1). A touch screen 74 may be positioned in front of or behind the display 24 and may be used to select graphical elements, such as the icons 30 (FIG. 1), shown on the display 24. The touch screen 54 is configured to receive input from a user's or object's touch and to send the information to the CPU 50, which interprets the touch event and performs a corresponding action. The touch screen 76 may employ any suitable type of touch screen technology such as resistive, capacitive, infrared, surface acoustic wave, electromagnetic, or near field imaging. Furthermore, the touch screen 76 may employ single point or multipoint sensing.

An input/output (I/O) controller 78 may provide the infrastructure for exchanging data between the control circuit 52 and the input/output devices, such as the touch screen 76, the scan device 48, the camera 46, and the display 24. The I/O controller 78 may contain one or more integrated circuits and may be integrated within the control circuit 52 or exist as a separate component. The I/O controller 78 also may provide the infrastructure for communicating with external devices through the I/O ports 34, 36, and 38 shown in FIG. 1 and may be used for connecting the device 10 to an external computer, bar code scanner, a printer, audio headphones, or the like.

The I/O controller 78 also may provide the infrastructure for communicating with the CPU 50 through the input structures 14, 16, 18, 20, and 22 shown in FIG. 1. The user input structures 14, 16, 18, 20, and 22 may be used in conjunction with, or independently of, the touch screen 76 to select inputs for the device 10.

The portability of the device 10 makes it particularly well suited to performing sales transactions. To facilitate transport and ease of motion, the device 10 may include an integrated power source 80 for powering the device 10. The power source 80 may include one or more batteries, such as a Li-Ion battery, which may be user-removable or secured to the enclosure 12. In certain embodiments, the proprietary connection I/O port 34 may be used to connect the device 10 to a power source for recharging the battery.

Figure 4:
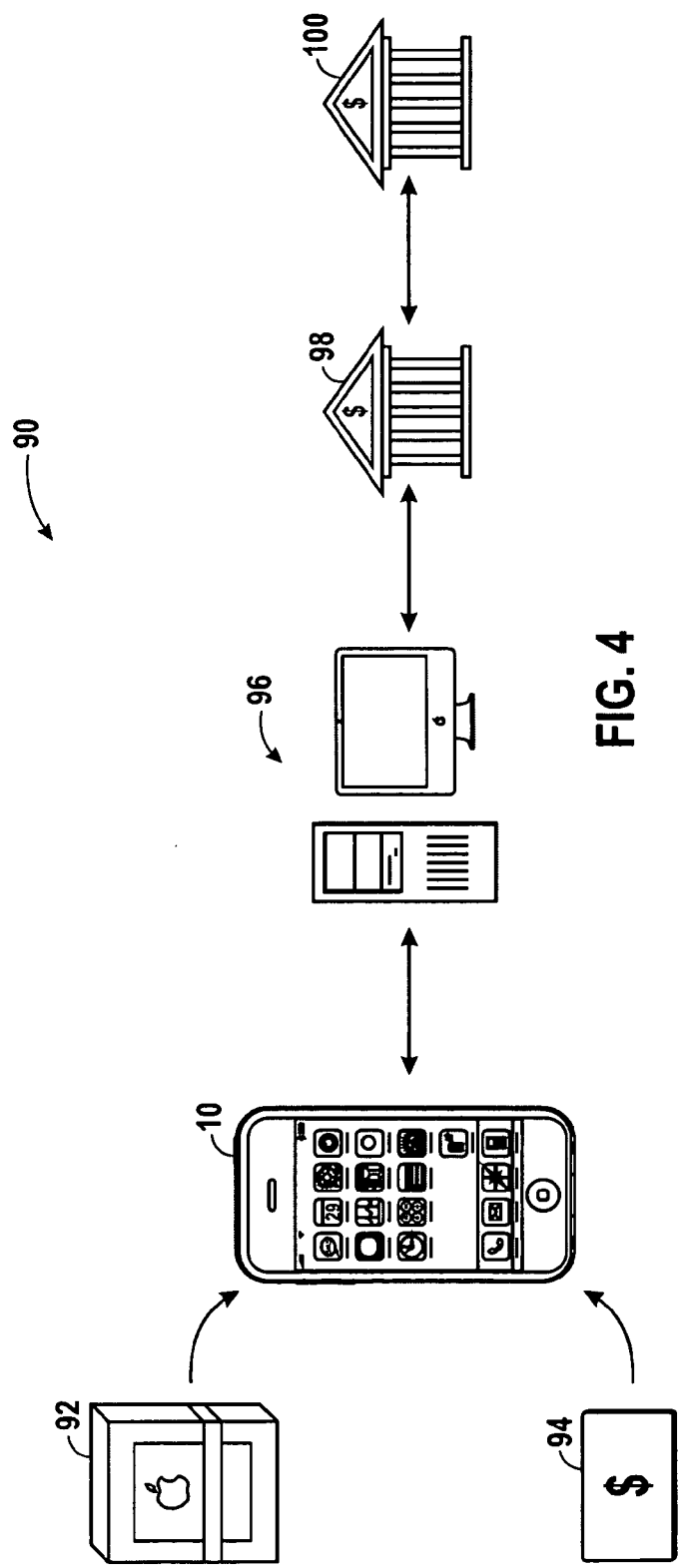
FIG. 4 is a diagrammatical representation of a system for conducting a sales transaction in accordance with one embodiment.

FIG. 4 illustrates a system 90 for conducting a sales transaction using the electronic device 10. Due to the portability of the electronic device 10, the sales transaction maybe conducted within a wide variety of environments. For example, the sales transaction may occur near a clothing rack within a retail store, on an airplane, for example, when a flight attendant sells a snack to a passenger or in a customer's home when a merchant such as a pizza delivery person delivers food. The electronic device 10 may receive identification information, such as a SKU number, UPC code, model number, serial number, or other identifier, for an article 92. The article of merchandise 92 may be any article generally available for sale, such as an article of clothing, an electronic device, or an article of food. In certain embodiments, the article of merchandise 92 may represent a service item such as a car wash or medical procedure.

The electronic device 10 may receive the identification information through the communication interface 56. For example, the identification information may be received through a PAN communication channel, a near field communication channel, or a network communication channel. In one example, the electronic device 10 may read an NFC tag located on the article 92 to obtain the identification information. The identification information also may be input into the device 10 using the GUI 28 (FIG. 1). For example, a sales person may read the identification information from an article and input it into the electronic device 10 using a keypad or touch screen of the electronic device 10. In other embodiments, the scanner 48 (FIG. 1) or the camera 46 (FIG. 1) may be used to obtain the identification information.

In certain embodiments, the price information may be included within the identification information. For example, the price of article 92 may be encoded on a bar code or NFC tag located on the article 92. However, in other embodiments, the electronic device 10 may use the received identification information to query the price information. For example, the electronic device 10 may transmit a SKU number to an external device, such as a server, to obtain the price information associated with that SKU number.

Using the received identification information, the device 10 may determine a payment amount or amount due. In certain embodiments, identification information for multiple articles 92 may be transmitted to the electronic device 10. The electronic device may calculate an amount due, for example, by totaling the price for each article 92. In other embodiments, the device 10 may transmit the identification information to an external server or other electronic device capable of calculating the amount due. In these embodiments, the external device may perform the calculation and then transmit the calculated amount due to the electronic device 10.

The electronic device 10 also may receive payment information through the communication interface 56. The payment information 94 may include information to process payment for the article 92. For example, the payment information 94 may include credit card information or bank account information. The payment information 94 may be received by a variety of methods, such as through the communication interface 56 (FIG. 3), through the camera 46 (FIG. 2), through the scanner 48 (FIG. 2), through the biometric sensor 45 (FIG. 1), or through the GUI 28 (FIG. 1). For example, the device 10 may be brought in close proximity to a smart card or NFC enabled credit card to receive the payment information 94. In another example, the device 10 may establish a PAN communication link, or other short-range communication link, with a customer's electronic device. The link may be established using a device identification networking protocol, such as Bonjour®. The device 10 may then receive the payment information 94 from the customer's electronic device. For example, the customer's electronic device may include an electronic wallet application that stores the customer's credit card information.

The electronic device 10 also may communicate with an external sever 96. The server 96 may be maintained by the merchant or by a third party service provider and may include a database containing inventory information, price information, and other sales information related to articles available for purchase. In certain embodiments, the server 96 may be located within close proximity to the electronic device 10. For example, the server 96 may be located within a department store where the electronic device 10 is used to complete sales transactions for articles located within the store. The server 96 also may be located in a remote location. For example, the server 96 may be located within a pizza restaurant where the electronic device 10 is used to complete sales transactions at a customer's home when pizza is delivered.

The electronic device 10 may communicate with the server 96 through the communication interface 56 or through an I/O port, such as proprietary connection port 36. For example, the communication interface 56 may be used to communicate with the server 96 or a PAN, WAN, or WLAN. The I/O port 36 also may be used to connect to an Ethernet port to communicate with the server 96 over a LAN. The electronic device 10 may communicate directly with the server 96 or information may be passed to the server 96 through an intermediate device such as a dock or external computer. Further, in certain embodiments, the server 96 may authenticate the electronic device 10 using one or more machine identifiers of the electronic device 10 as described in the commonly assigned and previously incorporated patent application Ser. No. 12/286,313. The authentication process may provide an additional level of security by allowing the server 96 to verify that the electronic device 10 has been authorized for communication with the server 96.

The electronic device 10 may communicate with the server 96 to obtain article information, such as price information and inventory information that is stored within the server database. The electronic device 10 also may transmit the payment information 94 to the server 96 in order to obtain authorization for payment. To authorize payment, the server 96 may transmit the payment information 94 to financial institutions 98 and 100. Specifically, the server 96 may transmit an authorization request containing the account information to the merchant's financial institution 98. The merchant's financial institution 98 may be a bank where the merchant maintains its accounts.

The merchant's financial institution 98 may then pass the authorization request along to financial institution 100 associated with the payment information 94. The financial institution 100 may be a bank that maintains the customer's checking account or credit card. In other embodiments, the financial institution 100 may include a credit card company such as American Express or MasterCard. The financial institution 100 may use the payment information 94 received along with the authorization request to authorize the payment. For example, the financial institution 100 may verify that the customer has sufficient funds or credit to pay for the amount due.

Once the financial institution 100 has authorized payment, the financial institution 100 may transmit an authorization code to the merchant's financial institution 98. The merchant's financial institution 98 may then transmit the authorization code to the server 96, which in turn may transmit the authorization code to the electronic device 10. In other embodiments, the sever 96 may process the authorization code and transmit an authorization message, instead of the authorization code, to the electronic device 10. The communications between the server 96 and the financial institutions 98 and 100 may occur over a variety of communication channels, such as a LAN or a WAN.

Upon receiving the authorization code or message, the electronic device 10 may display a notification message on the display 24 (FIG. 1) alerting the merchant that the payment has been processed. The merchant may then complete the sales transaction by transferring the article 92 to the customer. In other embodiments, the merchant may receive delivery information from the customer and then subsequently deliver the article 92 to the customer's specified location.

Figure 5:
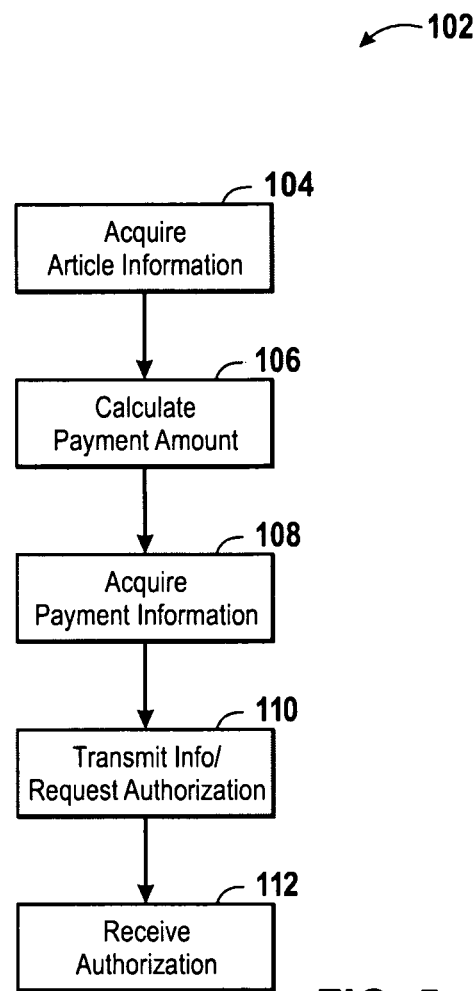
FIG. 5 is a flowchart depicting a method for conducting a sales transaction in accordance with one embodiment.

Referring now to FIG. 5, a flowchart is depicted of an exemplary method 102 for conducting a sales transaction using the electronic device 10. The method 102 may be employed to conduct various types of sales transactions, including but not limited to, ringing up items for sale in a department store, selling food to a passenger on an airplane, billing an insurance company for medical devices used during a surgery, selling food at a restaurant, or selling fundraising items to neighborhood residents.

The method 102 may begin by acquiring (block 104) article information. The article information may be acquired by a variety of methods that will be discussed below with respect to FIGS. 5-8. For example, the article information may be acquired by using the NFC device 44 (FIG. 1) to read information from an NFC tag located on the article. In another example, the scanner 48 (FIG. 2) may be used to read a bar code located on the article. In certain embodiments, the camera 46 (FIG. 2) may be used to take a picture of the article. The article information also may be input through the GUI 28 (FIG. 1) of the electronic device 10.

The article information is then used to calculate (block 106) a payment amount. The calculation may be performed by the electronic device 10 or by an external device such as the server 96. To calculate the payment amount, the device 10 may use the article information to retrieve the purchase price. For example, the purchase price may be encoded on an NFC tag or barcode located on the article. In another example, the device may transmit the article information to the server to obtain the purchase price for that article from the server's database.

The payment amount may be calculated using the purchase price. If only one article is being purchased, the purchase price may correspond to the payment amount. However, if multiple articles are being purchased, the device 10 may total the purchase price for each article to calculate the payment amount. For example, executable code stored within the storage 54 (FIG. 3) may be used to calculate the payment amount. In another example, the server 96 may calculate the payment amount and transmit the amount to the electronic device 10. In certain embodiments, the payment amount may be displayed on the electronic device 10 after each article is input into the electronic device 10.

The electronic device 10 may then acquire (block 108) the payment information. The payment information may include the customer's account number, account type, name, and bank or financial institution, among other things. The payment information may be included within another electronic device, within a magnetic strip of a credit card, within a smart card, on a check, or within a customer's biometric feature. In certain embodiments, the payment information may be stored on the electronic device 10 and retrieved in response to receiving customer information. For example, the payment information may be stored within the storage 54 and retrieved by the device 10 in response to receiving a customer's user name and password. Of course, cash also may be used to pay for the article. The payment information may be acquired through a variety of methods described below with respect to FIGS. 9-19. For example, the payment information may be acquired by bringing the electronic device 10 in close proximity to an NFC enabled device containing the payment information. In another example, the payment information may be acquired through the camera 46 (FIG. 2), the biometric sensor 45 (FIG. 1), or the GUI 28 (FIG. 1) of the electronic device 10. Further, a cash payment may be input using the GUI 28 (FIG. 1).

The electronic device 10 may then transmit (block 110) the payment information and request authorization for payment. The information may be transmitted by connecting the electronic device 10 to the server 96 using a wired or wireless connection. In certain embodiments, an intermediate device, such as a docking station or intermediate sales terminal, may be use to transmit the information. As discussed above with respect to FIG. 4, the server 96 may obtain authorization from the financial institutions 98 and 100 and transmit the authorization back to the electronic device 10.

Upon receiving (block 12) authorization, the electronic device may display an authorization message indicating that the payment as been approved. In other embodiments, the electronic device may emit a sound notifying the merchant that the payment has been approved. The authorization message or notification may notify the merchant that the transaction is complete. The merchant may then transfer the article to the customer.

FIGS. 6-45 further illustrate methods of conducting a sales transaction using the electronic device 10. Many of these figures illustrate various screens that a user of the electronic device 10 may encounter while conducting a sales transaction. The screens may be part of the GUI 28 (FIG. 1) and may be navigated using the touch screen 76 (FIG. 3) or the user input structures 14, 16, 18, 20, and 22 (FIG. 1) of the electronic device 10. As may be appreciated, the functionality described may be achieved with a wide variety of graphical elements and visual schemes. Therefore, the screens shown in the following figures are not intended to be limiting. Other embodiments may include a wide variety of user interface styles and the precise user interface conventions shown herein are provided by way of example only.

Figure 6:
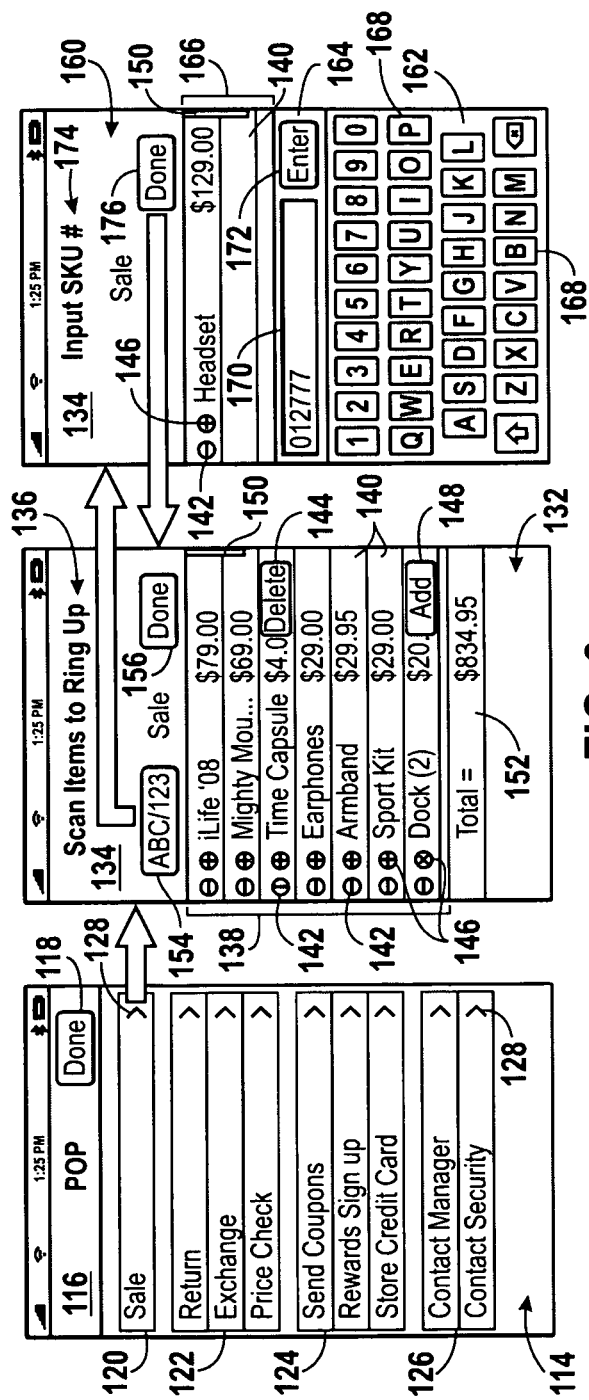
FIG. 6 is a front view of screens of the device of FIG. 1 illustrating a method of ringing up merchandise in accordance with one embodiment.

FIG. 6 illustrates a series of screens for acquiring identification information from an article. Screen 114 may serve as the main menu for conducting sales transactions and may be accessed through selection of the POP icon 32 shown in FIG. 1. Screen 114 includes a title bar 116 indicating the current state of device 10. As shown on screen 114, the device 10 is currently running the POP application. Screen 114 includes several graphical elements 118, 120, 122, 124, and 126 that allow navigation within the POP application. Specifically, graphical element 118 includes a done button that when selected may return the user to the home screen shown in FIG. 1. The user may select button 118 to exit the POP application.

The graphical elements 120, 122, 124, and 126, shown here as selection bars, allow navigation through the POP application. Indications 128 notify the user that additional screens may appear upon selection of the graphical elements 120, 122, 124, and 126. Specifically, selection of the graphical element 120 may display a screen for conducting a sales transaction. The graphical element 122 includes several selection bars for displaying screens for obtaining merchandise information that may be related to a sales transaction. The selection bars 122 may be selected to process a return, to exchange one article of merchandise for another, or to perform a price check.

The graphical element 124 includes several selection bars for obtaining customer information to enroll a customer in a merchant's program. The selection bars 124 may be selected to enter customer information for sending coupons, to enter customer information for enrolling a customer in a rewards program, or to enter customer information to apply for a store credit card.

The graphical element 126 includes selection bars for communicating with various store personnel. The selection bars 126 may be selected to contact a manager or security using a phone or e-mail application of the electronic device 10. As noted above, the graphical elements shown on the screen 114 are provided by way of example only and are not intended to be limiting. For example, many other graphical elements may be provided for performing various sales related transactions, such as checking inventory amounts or determining when a shipment of merchandise may arrive.

In response to selection of the sale selection bar 120, as generally indicated by an arrow, the device 10 may display a screen 132 for scanning an article of merchandise. The screen 132 includes a larger title bar 134 indicating that the device is currently operating in the sale mode. The title bar 134 also includes instructions 136 instructing the merchant to scan items to ring up. In certain embodiments, the device 10 may be automatically configured to scan items using the NFC device 44 (FIG. 1). For example, selection of the sale graphical element 120 may automatically place the NFC device 44 (FIG. 1) in the active mode. Items may then be scanned by bringing the device 10 within close proximity to an NFC tag located on the article. In other embodiments, the device 10 may be automatically configured to scan items using the scanner 48 (FIG. 2).

In yet other embodiments, the device may be configured to receive article identification information through a variety of inputs, such as the camera 46 FIG. 2), the scan device 48 (FIG. 2), the NFC device 44 (FIG. 1), or the GUI 28 (FIG. 1). In these embodiments, the graphical elements may be selected to specify the input method. However, in other embodiments, no selection may be required. The device may be configured to enter the appropriate input mode upon detection of an input through one of the input devices.

Regardless of the input method used, the scanned items may appear within a display window 138. Window 138 includes several selectable display areas 140 that display information about the scanned articles. The selectable display areas 140 may show the name of the article, its price, and other descriptive information. The display areas 140 may be selected to show additional information about the article, such as the article serial number, product description, and delivery charges and requirements. The graphical elements 142, 144, 146, and 148 included within display areas 140 may allow items within the areas 140 to be edited. Specifically, the graphical elements 142 depict subtraction symbols and allow items to be deleted. A user may select the graphical element 142 to display a delete button 144. Once an element 142 has been selected, it may rotate to notify a user that it has been selected. For example, the graphical element 142 has been rotated from a horizontal position to a vertical position to indicate that it has been selected. In response to selection of the delete button 144, the device may remove the corresponding item from the list of scanned items. For example, as shown on screen 132, selection of the delete button 144 may remove the Time Capsule™ article from the list of scanned items.

Graphical elements 146 depict addition symbols and allow items to be added to the list of scanned items. A user may select the graphical element 146 to display an add button 148. In response to selection of the add button 148, the device 10 may be configured to increase the number of corresponding items by one increment. For example, lower display area 140 shows that a dock for an electronic device has been scanned. The graphical element 146 has been rotated to indicate that is has been selected to display the add button 148. The number two appears in parentheses next to the description to indicate that the add button 148 has been selected to increase the number of docks purchased from one to two. As will be appreciated, the delete and add buttons 144 and 148 are just one manner of editing the scanned items. In other embodiments, the display areas 140 may be selected to bring up additional screens for editing the scanned items.

In addition to providing article information, the selectable areas 140 may notify the merchant of the items that have been input. If an article is not scanned or input correctly, it may not appear within the display areas 140. A scroll bar 150 may be used to scroll through the display areas 140 within window 138 and may be used to view the display areas 140 not currently shown on the screen 132. A summary bar 152 is located below window 138. The summary bar 152 displays a total of all of the scanned items that corresponds to the payment amount. If all items have been properly scanned, the merchant may select a graphical element 156, shown as a done button, to end the scanning process.

In certain situations, an article may not properly ring up through scanning. For example, the NFC tag or the bar code may be damaged and unreadable. In these situations, the graphical element 154 may be used to display a keypad for manually entering the article identification information. Selection of the graphical element 154 may display a screen 160 that includes a keypad 162 and display windows 164 and 166. Keys or buttons 168 representing numbers and letters may be used to enter identification information for an article. In certain embodiments, information displayed on the bar code or NFC tag may be entered through the keypad 162. In other embodiments, the keypad 162 may be used to enter the name or model number of an article.

The identification information entered using keypad 162 may be displayed within a display area 170 of the display window 164. A graphical element 172 may be used to enter the identification information show within the display area 170. Upon entry of the article information, the device 10 may display the name and price information for the corresponding article within the display window 166. The graphical elements 142 and 146 may be used to increase or decrease the quantity of the items shown within display window 166 in a manner similar to that described with respect to screen 132. The title bar 134 includes instructions 174 prompting a user to input the SKU number of an article. In other embodiments, the instructions may prompt a user to enter a UPC code, a model number, name of an article, or other identifying information. After all items requiring manual input have been entered, a user may select the graphical element 176 to end the manual input process and return to the sale screen 132.

Figure 7:
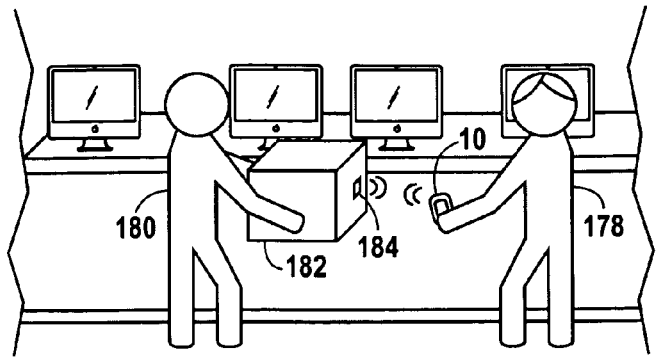
FIG. 7 is an illustration of a near field communication (NFC) based sales transaction in accordance with one embodiment.

FIG. 7 illustrates a near field communication based scanning process. A merchant 178, shown here as a retail store employee, holds the electronic device 10 and approaches a customer 180 to begin the sales transaction. Note that the portability of the electronic device 10 allows the sales transaction to occur anywhere within the retail store. A fixed transaction terminal, such as a cash register, is not required to complete the sales transaction. However, in certain embodiments, the device 10 may be used in conjunction with a fixed transaction terminal.

The customer 180 holds an article 182 that she would like to purchase. The article 182 may be any article of merchandise, such as a computer keyboard or monitor. A NFC tag 184 may be located on the article 182. The NFC tag 184 may be integrated into the packaging of the article 182 or may be affixed to an outer surface of the article 182. To scan the article 182, the merchant 178 may bring the electronic device 10 within close proximity to the NFC tag 184. The electronic device 10 may then read the NFC tag 184 and display a description of the article 182 on a screen of the device. For example, an article description may appear on the screen 132 shown in FIG. 6. Of course, the scanning process may occur within a variety of environments and conditions. For example, in other embodiments, the merchant 178 may scan items located in a cart or shopping bag. In other embodiments, the customer 180 may identify sample articles located on a display floor, and the merchant 178 may scan the articles for delivery or pickup by the customer 180. Further, for larger items or service items, the merchant 178 may scan an NFC tag located on a card that contains a description of the article.

Figure 8:
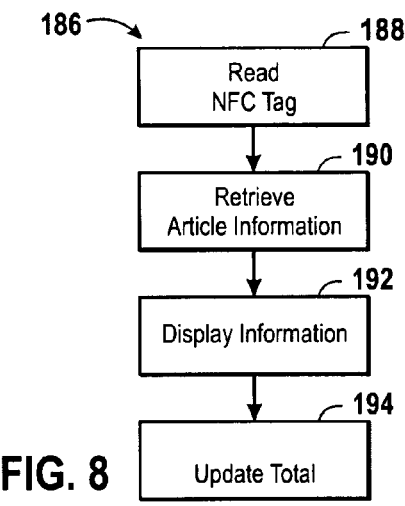
FIG. 8 is a flowchart depicting a method for acquiring article information through an NFC based transaction in accordance with one embodiment.

FIG. 8 is a flowchart depicting an exemplary method 186 for scanning an article using near field communication. The method may begin by reading (block 188) an NFC tag. As noted above, the electronic device may read the NFC tag when it is brought within close proximity of the NFC tag. The device may then retrieve (block 190) article information. In certain embodiments, the article information may be retrieved by reading the NFC tag. However, in other embodiments, the information read from the NFC tag may be used to retrieve the article information from the storage 54 (FIG. 3) of the electronic device or from an external database stored on the server 96 (FIG. 4). The article information may include among other things, the name of the article and the purchase price. The device 10 may then display (block 192) the article information. For example, the device 10 may display the article information within the window 138 shown in FIG. 6.

After, or simultaneously with displaying the article information, the device may update (block 194) the total purchase price for the order. For example, the device 10 may add the purchase price of the scanned item to the previously calculated total. In certain embodiments, the total purchase price may be displayed in the summary bar 152 shown in FIG. 6. After updating the total, the device 10 may begin the method 186 again by reading (block 188) another NFC tag. The device 10 may be configured to repeat the method 186 until all articles for purchase have been scanned. In certain embodiments, the method 186 may end in response to selection of the done button 156 shown in FIG. 6.

Figure 9:
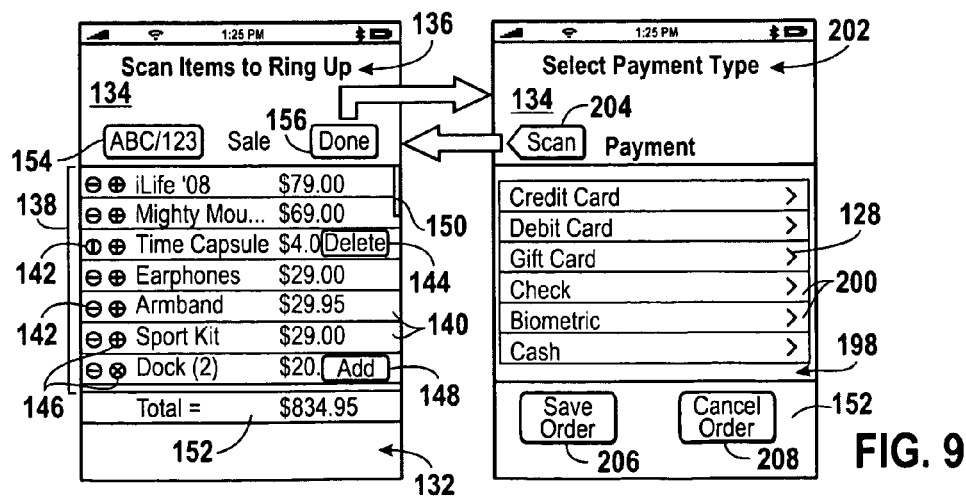
FIG. 9 is a front view of screens of the device of FIG. 1 illustrating a method of acquiring payment information in accordance with one embodiment.

After all the articles have been scanned, the device 10 may receive payment information. As shown in FIG. 9, the merchant may end the scanning process by selecting the done graphical element 156. In response to selection of the done button 156, the device 10 may display a payment screen 198. The title bar 134 notifies the merchant that the device is currently in a payment mode. The screen 198 includes several selection bars 200 for selecting the type of payment. For example, payment may be received by a credit card, gift card, check, or cash.

The title bar 134 includes instructions 202 prompting the merchant to select the payment type. The title bar 134 also includes a graphical element 204 that may be selected to return to the scanning screen 132. For example, if a customer has additional articles to scan, the merchant may select the graphical element 204 to return the device 10 to the scanning mode. If the merchant is ready to receive payment, the merchant may select one of the selection bars 200 to specify the payment type. For example, the merchant may ask the customer how she would like to pay and then select the corresponding selection bar 200 to receive payment by credit card, debit card, gift card, check, biometric feature, or cash. Specific methods for receiving payment through various payment types are discussed below with reference to FIGS. 10-19.

The payment screen 198 also includes graphical elements 206 and 208 for saving or canceling the order. For example, if a customer decides she would like to shop for additional articles, the merchant may select the graphical element 206 to save the order for future reference. In response to selection of the graphical element 206, the device 10 may store the order within the storage 54 (FIG. 1) of the device 10 for later retrieval. A customer also may decide that she no longer wishes to make a purchase. In these situations, the merchant select the graphical element 208 to cancel the order. In response to selection of the graphical element 208, the device 10 may delete the scanned items from the storage 54 (FIG. 3). Of course, the merchant also may edit the order by selecting the graphical element 204 to return to the scanning mode.

Figure 10:
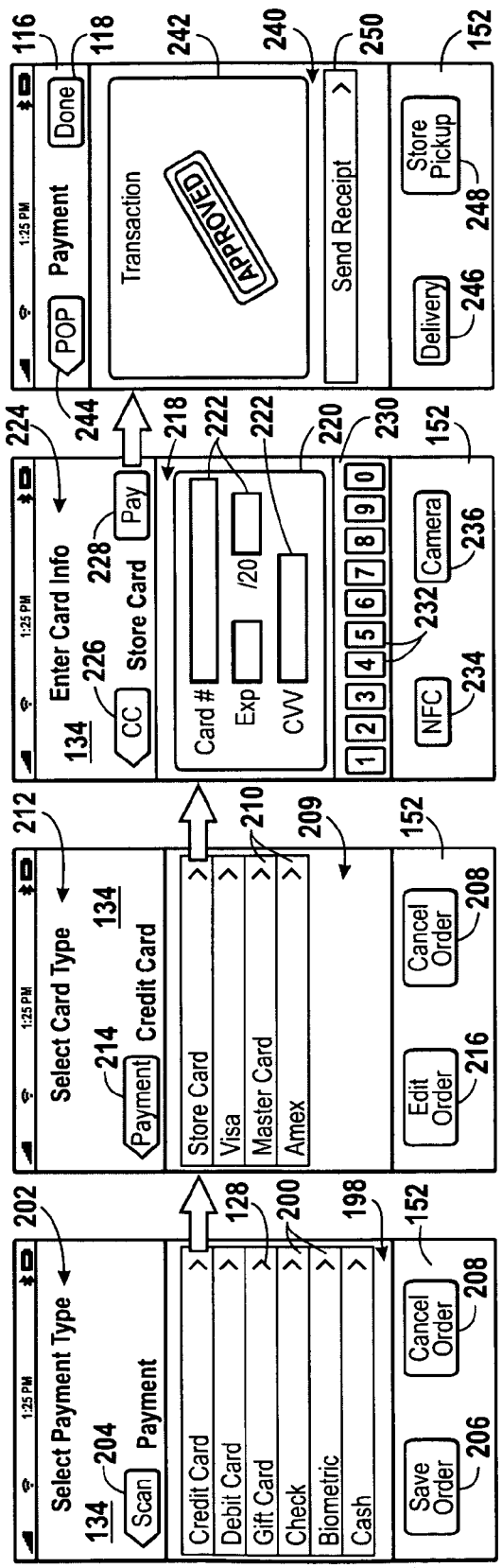
FIG. 10 is a front view of screens of the device of FIG. 1 illustrating a method of acquiring payment information from a credit card in accordance with one embodiment.

FIG. 10 illustrates a series of screens for acquiring payment information from a credit card. As discussed above, the payment screen 198 allows a merchant to specify the type of payment. In response to selection of the credit card selection bar 200, the device 10 may display a credit card payment screen 209. The screen 209 includes several selection bars 210 for choosing the specific type of credit card. The selection bars 210 may be configured to represent any type of credit card. For example, the merchant may select between a store issued credit card, Visa, MasterCard, or American Express. In certain embodiments, the selection bars 210 may be customized to correspond to the types of credit cards that a merchant is able to receive. For example, the screen 209 does not include a selection for a Discover Card, indicating that the merchant is not setup to receive payments using a Discover Card.

Instructions 212, shown on title bar 134, prompt the merchant to select the type of card. If the customer is not ready to pay, the merchant may select a graphical element 214 to return to the payment screen 198. For example, if a customer does not have one of the credit cards listed on screen 209, the merchant may select the payment graphical element 214 to return to the payment screen 198 to select another form of payment. Further, while at screen 209, a customer may wish to edit her order. In this case, the merchant may select a graphical element 216 to add or delete items from the customer's order. For example, during the payment process, the merchant may point out an article that is currently on sale. If the customer wishes to add the article to the order, the merchant may select the edit order button 216 to add the additional item to the order. In certain embodiments, selection of the graphical element 216 may display the scanning screen 132 shown in FIG. 9. The credit card screen 209 also includes the graphical element 208 that may be selected to cancel the order.

After the merchant specifies the card type by selecting one of the selection bars 210, the device 10 may display a payment screen for entering information for the selected type of credit card. The payment screen may be customized to request the information required to process that type of credit card. As shown in FIG. 10, the merchant has selected the store card selection bar 210 to display a screen 218 for entering the store card information. The screen 218 includes a display window 220 with several selectable areas 222. The selectable areas 222 allow entry of the credit card number, the expiration date, and the Card Verification Value (CVV). Of course, the types of selectable areas included may depend on the information required to process the selected type of credit card. Further, additional selectable areas may be included for entering information such as the customer's name or address.

The title bar 134 includes instructions 224 prompting the merchant to enter the card information. The title bar 134 also includes graphical elements 226 and 228 for navigating between screens. The graphical element 226 may be selected to return to the previous card selection screen 209. The graphical element 228 may be selected to pay using the information entered for the credit card.

A keypad 230 that includes keys or buttons 232 may be used to enter the credit card information. For example, a merchant may touch one of the selectable areas 222 to position a cursor within that area. The merchant may then select the buttons 232 to enter the card information for that selectable area 222. In response to selection of a button 232, the corresponding number may be displayed within the selectable area 222. After all of the selectable areas 222 have been completed, the merchant may selected the pay graphical element 228 to process the payment.

In addition to the keypad 230, other methods may be used to enter the card information. These methods may be selected through the graphical elements 234 and 236 included in the lower summary bar 152. Specifically, the graphical element 234 may be selected to enter the card information using near field communication. The techniques for entering information using near field communication are described further below with reference to FIG. 11. The graphical element 236 may be selected to enter the credit card information using the camera 46 (FIG. 1). Entry of information using the camera is explained further below with respect to FIGS. 13 and 14.

After the card information has been entered, the merchant may select the graphical element 228 to process a payment based on the entered card information. A payment status screen 240 may be displayed in response to selection of the graphical element 228. The screen 240 includes a display window 242 indicating the status of the payment transaction. For example, an approval message is shown in the display window 242 indicating that the payment has been approved. If the payment has been rejected, a rejection message may appear within the display window 242. The status of the transaction may be displayed after the device 10 has received authorization from the server 96 (FIG. 4). For example, the device 10 may transmit the entered payment information to the server 96, which may in turn transmit the information to financial institutions 98 and 100 to obtain an authorization code as described with respect to FIG. 4.

The screen 240 also includes graphical elements 244 and 118 for navigating between screens. Specifically, the graphical element 244 may be selected to return to the point of purchase screen 114 (FIG. 6) and conduct another sales transaction. The graphical element 118 may be selected to return to the home screen shown in FIG. 1. For example, the merchant may select the graphical element 118 if all pending sales transactions have been completed.

The payment status screen 240 also includes two graphical elements 246 and 248 for scheduling transfer of the purchased articles to the customer. Specifically, the graphical element 246 may be used to schedule delivery of the articles to the customer's home or business. Selection of the graphical element 246 may display a screen for entering delivery information, such as the customer's address and the desired delivery time. The graphical element 248 may be selected to specify that the article will be picked up within the store. For example, this option may be used when an ordered article is not in stock or needs to be retrieved from a warehouse. Selection of the graphical element 248 may display a screen for entering the customer's preferred pickup time and the customer's contact information so that the merchant may alert the customer when the articles are available for pick up.

The screen 240 also includes a graphical element 250 that may be selected to send a receipt to the customer. Selection of the graphical element 250 may display a screen for entering a customer's e-mail or home address. The receipt may then be sent to the entered address. In other embodiments, the merchant may already have the customer's address through a rewards program or other type of customer account. In these embodiments, selection of the graphical element 250 may cause the device 10 to transmit the receipt to the customer's address. After the receipt has been sent, the merchant may select either the POP element 244 to conduct another sales transaction or the done element 118 to exit the point of purchase application.

Figure 11:
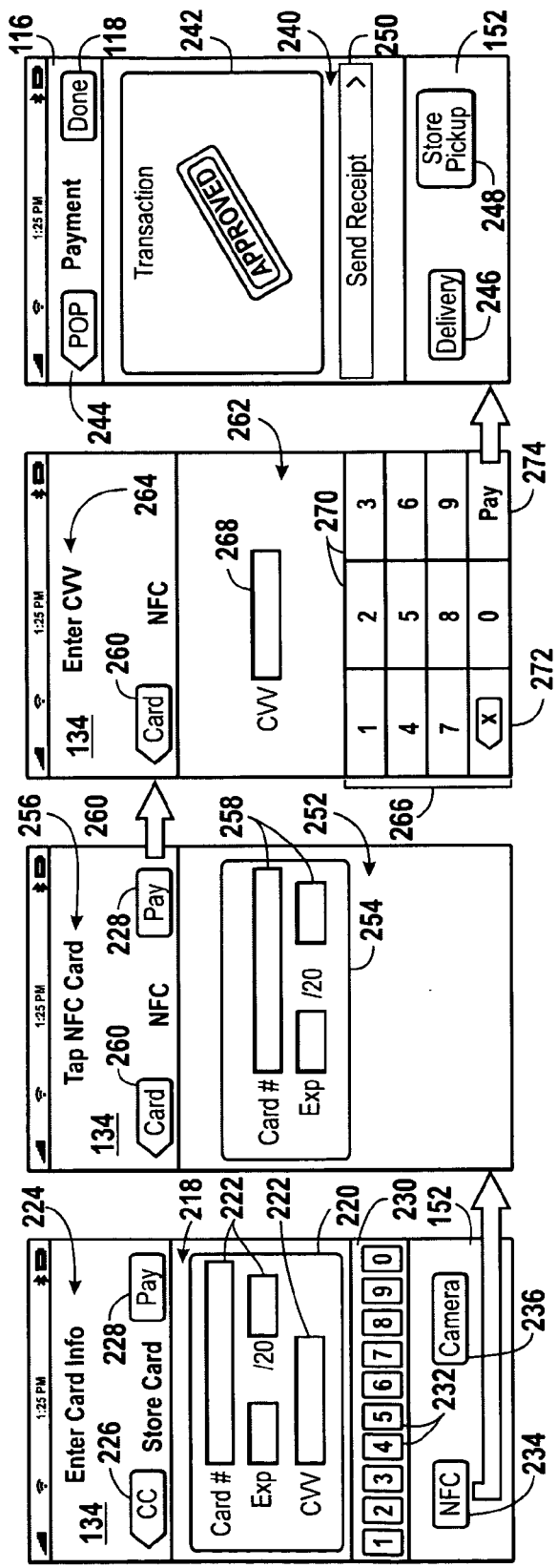
FIG. 11 is a front view of screens of the device of FIG. 1 illustrating a method of acquiring payment information using near field communication in accordance with one embodiment.

FIG. 11 illustrates a series of screens for acquiring credit card information using near field communication. From the information entry screen 218, a merchant may select the graphical element 234 to acquire the payment information using near field communication. The payment information may be acquired from an NFC enabled credit card, a smart card, or an NFC enabled device that stores the credit card information. The device 10 may display an NFC screen 252 in response to selection of the graphical element 234. In certain embodiments, the device 10 may be configured to default to receiving card information via near field communication. In these embodiments, the device 10 may display the NFC screen 252 in response to selection of a credit card type.

The NFC screen 252 includes a display window 254 that shows the payment information that needs to be received. Instructions 256, located within the title bar 134, prompt the merchant to tap an NFC enabled credit card or device to the device 10. For example, the merchant may tap a NFC enabled credit card by bringing the device 10 within close proximity to the NFC enabled credit card. In another example, the merchant may physically touch the device 10 to a NFC enabled credit card or device. In certain embodiments, the NFC enabled credit card may be a credit card that contains an NFC tag and the NFC enabled device may be a portable media player or personal data assistant that includes an electronic wallet software application. Once the information is received from the NFC enabled card or device, the information may be displayed within corresponding areas 258 of the display window 254. For example, the device 10 may display the credit card number within the "Card #" display area 258 and may display the card's expiration month and year within the "Exp" display areas 258.

The screen 252 also includes graphical elements 260 and 228 that allow navigation between screens. Specifically, the graphical element 260 allows the merchant to return to the card entry screen 218. For example, the NFC enabled card may be damaged making it not readable by the device 10. In this circumstance, the merchant may select the graphical element 260 to return to screen 218 and enter the card information using the keypad 230. If the NFC information is received correctly, the merchant may select the graphical element 228 to pay using the displayed card information. In certain embodiments, the areas 258 may be selectable to allow editing of the card information. For example, the keypad 230 may be displayed in response to selection of an area 258.

Selection of the graphical element 228 may display a CVV entry screen 262. The screen 262 may provide additional security for the payment transaction by requiring the merchant to enter the CVV shown on the physical card or device. In other embodiments, the CVV may be replaced by a pin number or other verification code set by the customer or credit card provider. Further, in certain embodiments, such as sales transactions involving payments of twenty-five dollars or less, no CVV information may be required. In these embodiments, the CVV entry screen 262 may be omitted.

Instructions 264, located within the title bar 134, prompt the merchant to enter the CVV. A keypad 266 allows the CVV to be entered and displayed within a window 268. The keypad 266 includes keys or buttons 270 that may be selected to display the corresponding CVV number within the window 268. The keypad 266 also includes a delete key 272 for removing an existing entry, and a pay key 274. After the CVV code is entered correctly and displayed within the window 268, the merchant may select the pay key 274 to process the payment.

Upon selection of the pay key 274, the payment status screen 240 may be displayed. Similar to the transaction described above with respect to FIG. 10, the payment status screen 240 includes the window 242 displaying a message indicating that the transaction has been approved. The merchant may then set up delivery by selecting the graphical element 246, set up store pick up by selecting the graphical element 248, or send a receipt by selecting graphical element 250. Upon competition of the transaction, the merchant may select the POP graphical element 244 to conduct another sales transaction.

Figure 12:
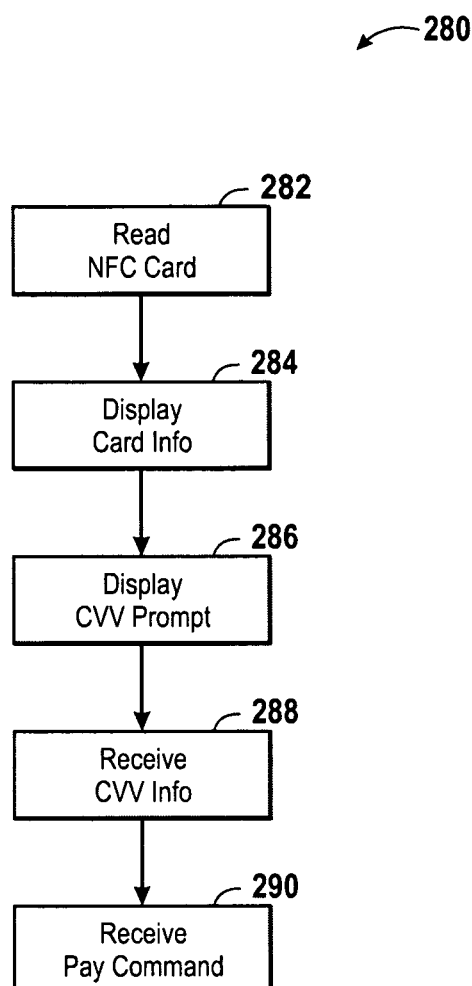
FIG. 12 is a flowchart depicting a method for acquiring payment information using near field communication in accordance with one embodiment.

FIG. 12 is a flowchart depicting an exemplary method 280 for acquiring payment information using near field communication as illustrated in FIG. 11. The method may begin by reading (block 282) an NFC enabled card or device to receive payment information. As noted above, the electronic device 10 (FIG. 1) includes an NFC device 44 (FIG. 1) that may read the NFC enabled card or device when the NFC enabled card or device is brought within close proximity to the electronic device 10 (FIG. 1). After reading the NFC enabled card or device, the electronic device may display (block 284) some or all of the payment information received from the NFC enabled card or device. For example, the displayed payment information may include the card number and the expiration date. In certain embodiments, the electronic device also may display the customer's name. The received payment information may include information that is not displayed on the electronic device. For example, the payment information may include the name and contact information for the financial institution that issued the credit card, as well as any additional information required to authorize a payment from the credit card.

After displaying the received payment information, the electronic device may display (block 286) a CVV prompt. For example, the CVV prompt may be displayed in the form of the instructions 264 shown on the screen 262 illustrated in FIG. 11. In certain embodiments, the CVV prompt may be replaced by a prompt instructing the merchant to enter a pin code or other verification information. Further, in certain embodiments a CVV input may not be required to process the payment, and, therefore, block 286 may be omitted. For example, the CVV may not be required for small dollar transactions, or the CVV already may have been received by near field communication. In response to the CVV prompt, a merchant may enter the CVV using a keypad of the electronic device. The entered CVV may be displayed on the electronic device and in certain embodiments, may be represented by asterisks or other symbols to obscure the CVV data.

After receiving (block 288) the CVV, the electronic device may receive (block 290) a pay command signifying that the payment should be processed. For example, a merchant may select the graphical element 274 shown on the CVV screen 262 in FIG. 11 to issue the pay command. The electronic device may then transmit the payment information to an external server to obtain payment authorization as described above with respect to FIG. 4.

Figure 13:
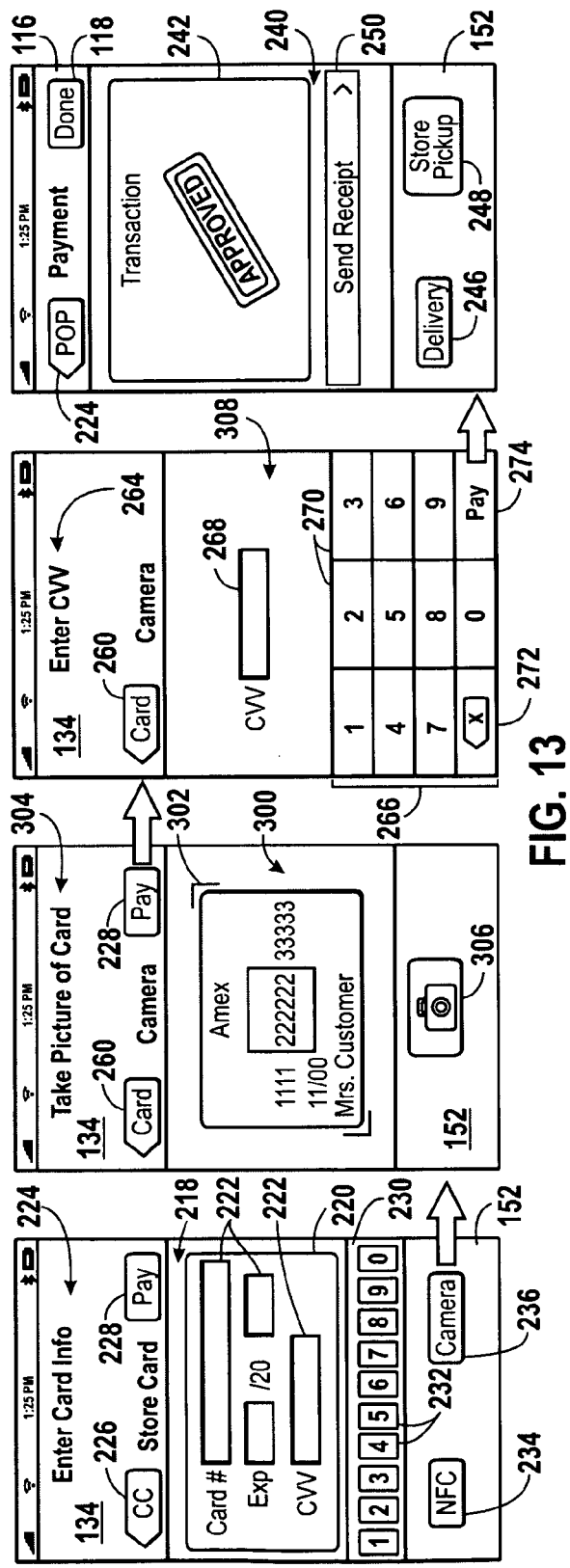
FIG. 13 is a front view of screens of the device of FIG. 1 illustrating a method of acquiring payment information using a camera in accordance with one embodiment.

The payment information also may be acquired from a credit card using a camera instead of near field communication. FIG. 13 illustrates a series of screens for acquiring payment information using the camera 46 shown in FIG. 2. From the card entry screen 218, the merchant may select the camera graphical element 236 to acquire the payment information using the camera. A camera input screen 300 facilitates entry of the payment information using the camera. The screen 300 includes a frame 302 consisting of two corners disposed on the screen 300 to identify the borders of the received image. The frame 302 may function as a viewfinder for the camera. In certain embodiments, the frame 302 may be omitted, and the entire display area may be used to receive the image.

Instructions 304 prompt the merchant to take a picture of the credit card. The merchant may position the electronic device 10 so that the card image is aligned within the frame 302, and then the merchant may select graphical element 306 to capture the image. If the merchant would like to recapture the image, the merchant may select the graphical element 260 to return to the previous screen 218. If the merchant has successfully captured the image, the merchant may select the graphical element 228 to begin the payment process using the captured image. Selection of the graphical element 228 may cause a CVV entry screen 308 to be displayed. Similar to the process described with respect to FIG. 11, the merchant may enter the CVV using the keypad 266. After entry, the merchant may select the pay button 274 to process the payment. The payment status screen 240 may then be displayed and an approval message may be displayed within the window 242 to notify the merchant when the transaction has been approved.

Figure 14:
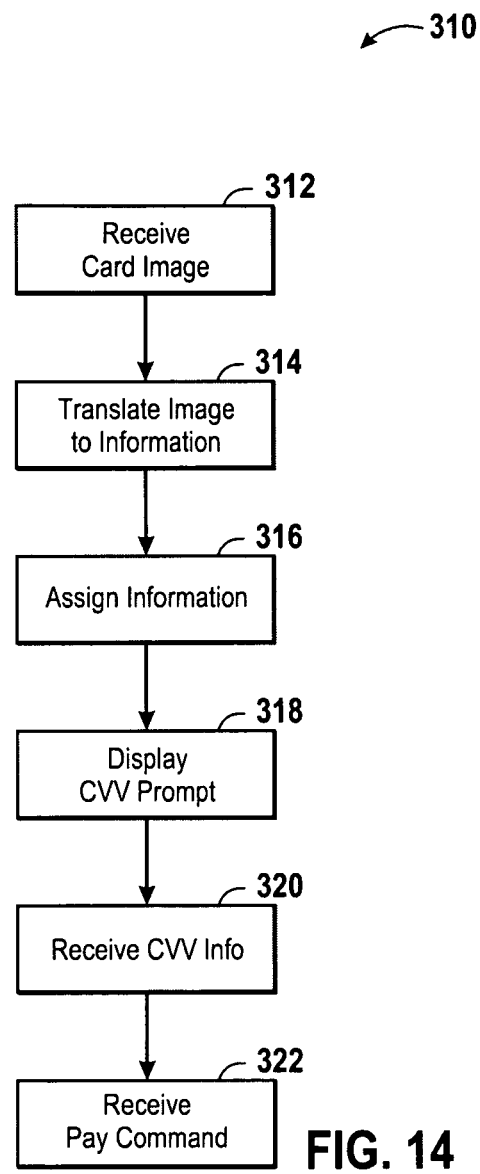
FIG. 14 is a flowchart depicting a method for acquiring payment information in accordance with one embodiment.

FIG. 14 is a flowchart depicting an exemplary method 310 for acquiring payment information using a camera as illustrated in FIG. 13. The method may begin by receiving (block 312) a card image. The image may be received by taking a picture of the card using the camera 46 (FIG. 2) of the electronic device. The electronic device may translate (block 314) the captured image into the payment information. The translation may be performed using optical character recognition (OCR) or other vision based recognition techniques. In certain embodiments, software for performing OCR may be stored within the storage 54 (FIG. 3) of the electronic device.

The electronic device may then assign (block 316) the payment information to the corresponding categories. For example, the device 10 may assign the fifteen-digit credit card number to the card number category. The device 10 also may assign the four-digit expiration date to the expiration date category. In certain embodiments, software within the electronic device may be used to assign the payment information to the corresponding categories. For example, the software may identify zones or regions within the captured image and assign the information within those regions to corresponding fields. In one example, an American Express card may typically display the card number within the center of the card, and, therefore, the software may be configured to assign the information within this center zone to the card number category. In certain embodiments, the device may be configured for allow zonal OCR, allowing the merchant to draw zones on the display using the touch screen around the areas containing the card number and expiration date.

After the payment information has been assigned to the categories, the device may display (block 318) the CVV prompt. For example, the CVV prompt may be displayed in the form of the instructions 264 shown on the screen 308 illustrated in FIG. 13. In certain embodiments, the CVV prompt may be omitted or replaced by a prompt instructing the user to enter a pin code. After the device receives (block 320) the CVV, the device may display the CVV information on the screen 308. After receiving the CVV information, the device may receive a pay command (block 322) to complete the transaction. For example, a merchant may select the pay button 274 shown in FIG. 13 to issue the pay command. In response, the device may transmit the payment information to an external server to obtain payment authorization.

The methods and screen configurations described above with respect to FIGS. 10-14 also may be employed to receive payment using a debit card or gift card. For example, the payment information for a debit card or gift card may be acquired using the keypad 162 (FIG. 6), the NFC device 44 (FIG. 1), or the camera 46 (FIG. 2) using the methods shown in FIGS. 10-14. In certain embodiments, the CVV prompt may be replaced by a prompt for a pin number or other type of security code. For example, a debit card may require a pin code and a gift card may require a password. Further, the CVV prompt may be omitted for cards that do not require a security code.

Figure 15:
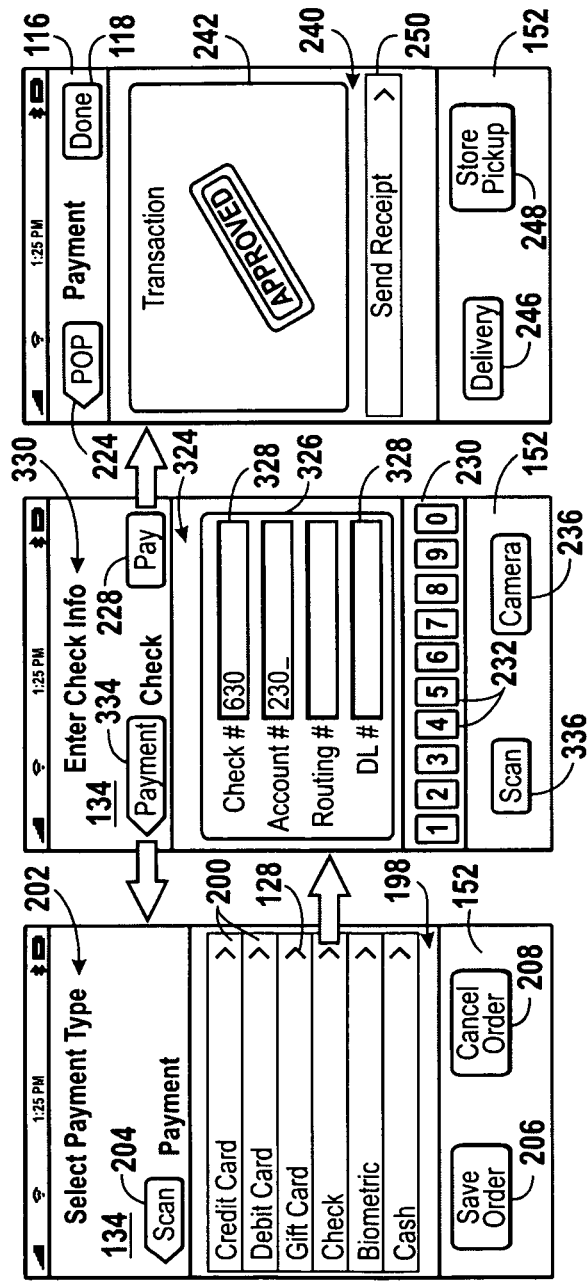
FIG. 15 is a front view of screens of the device of FIG. 1 illustrating a method of acquiring payment information from a check in accordance with one embodiment.

FIG. 15 illustrates a series of screens for acquiring payment information from a check. From the payment entry screen 198, a merchant may select the check selection bar 200 to display a check payment screen 324. The screen 324 includes a display window 326 that includes several areas 328 for displaying the check information. The areas 328 display the check number, the account number, the routing number, and the number of the driver's license issued to the customer. Instructions 330 prompt the merchant to enter the check information. In certain embodiments, the information may be entered using the keypad 230. For example, a merchant may touch one of the display areas 328 to position the cursor within that area and use the buttons 232 to enter the information. Of course, the items represented by the areas 328 may be customized to include additional or alternative types of information based on a merchant's preferences. For example, a merchant may omit the driver's license area 328 if the merchant does not require a driver's license number to process a check.

The check information also may be acquired through the camera. For example, the graphical element 236 may be selected to enter the check information using techniques similar to those described with respect to FIGS. 13 and 14. In certain embodiments, the check information may be acquired using the scanner 48 (FIG. 2). For example, the graphical element 336 may be selected to scan a bar code on the check using the scan device 48 (FIG. 2). In other embodiments, the payment information may be acquired by scanning an NFC enabled check. In these embodiments, a graphical element may be included within the summary bar 152 to enter the check information using near field communication. The check information may be acquired by near field communication using techniques similar to those described above with respect to FIGS. 11-12.

The screen also includes graphical elements 334 and 228 for navigating between screens. Specifically, the graphical element 334 allows the merchant to return to the payment screen 198 to receive a different form of payment. Once the check information has been entered, using the keypad 266 (FIG. 11), the camera 46 (FIG. 2), the scanner 48 (FIG. 2), or the NFC device 44 (FIG. 1), the merchant may select the graphical element 228 to process the payment and advance to the payment screen 240. As noted above, the payment screen 240 includes the display window 242 indicating the status of the transaction.

In certain embodiments, the approval step may include transmitting the check information to a verification service for approval. For example, the merchant may hire a third party check verification service to verify checks received from customers. In these embodiments, selection of the graphical element 228 may cause the device to send the check information to the external server 96 (FIG. 4), which may in turn send the check information to the check verification service. The check verification service may approve the check for payment and transmit the approval to the electronic device 10 through the external server. Upon receipt, the payment authorization may be displayed within the window 242. The check information also may be transmitted to the customer's bank to verify that the customer has sufficient funds to process the transaction. Further, in other embodiments, the approval process may simply include verifying that all the check information has been entered, and no additional verification may be performed. After the transaction has been approved, the merchant may select the POP graphical element 224 to conduct another transaction.

In addition to paying by check or credit card, a customer may pay using account information linked to a biometric feature. For example, a customer may be part of a database that associates credit card or bank account information with a customer's fingerprint. To pay for an article, a customer may scan her fingerprint to pay using an account associated with her fingerprint.

Figure 16:
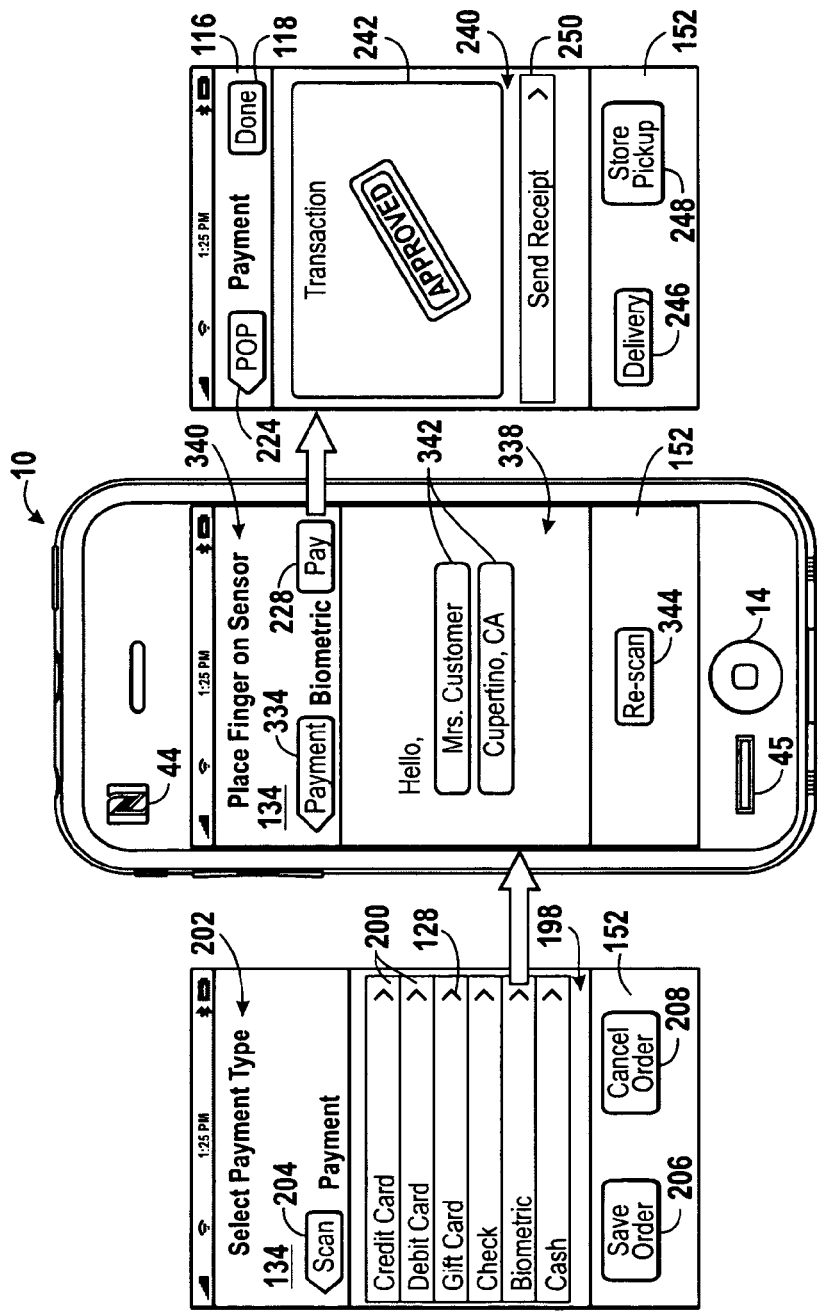
FIG. 16 is a front view of screens of the device of FIG. 1 illustrating a method of acquiring payment information from biometric data in accordance with one embodiment.

FIG. 16 illustrates a series of screens for acquiring payment information using biometric features. From the payment type selection screen 198, a merchant may select the biometric selection bar 200 to display a biometric entry screen 338. The screen 338 includes instructions 340 that prompt a customer to place her finger on the biometric sensor 45, shown here as a fingerprint scanner. Of course, in other embodiments, other types of sensors may be used in conjunction with other types of biometric recognition systems, such as face recognition, hand geometry, or voice recognition.

To enter payment information, a customer may place her finger on the biometric sensor 45. The device 10 may read the fingerprint and acquire payment information based on the fingerprint. For example, the device 10 may compare the fingerprint to a biometric database of fingerprints linked to payment information. The biometric database may be maintained by the merchant or by a third-party service provider and may be stored on the electronic device 10 or on an external device accessed through the external server 96.

The device 10 may query the biometric database to identify the customer. Upon identification of the customer, the customer's name and address, as well as other identifying information, may be displayed within the display areas 342. If the information in the display areas 342 is not correct, the merchant may select the rescan graphical element 344 to re-execute the biometric scanning process. However, if the information is correct, the merchant may select the pay graphical element 228 to process a payment based on the biometric feature. For example, a customer may link her bank account or credit card information with the biometric feature stored in the biometric database. In response to selection of graphical element 228, the device may query the biometric database for the payment information associated with the customer. The device may then transmit the payment information as described in FIG. 4 to obtain authorization for payment. Once the authorization has been received, an approval message may be displayed on the transaction status screen 240 within the display window 242. After completion of the transaction, the merchant may select the POP element 224 to conduct another transaction.

Figure 17:
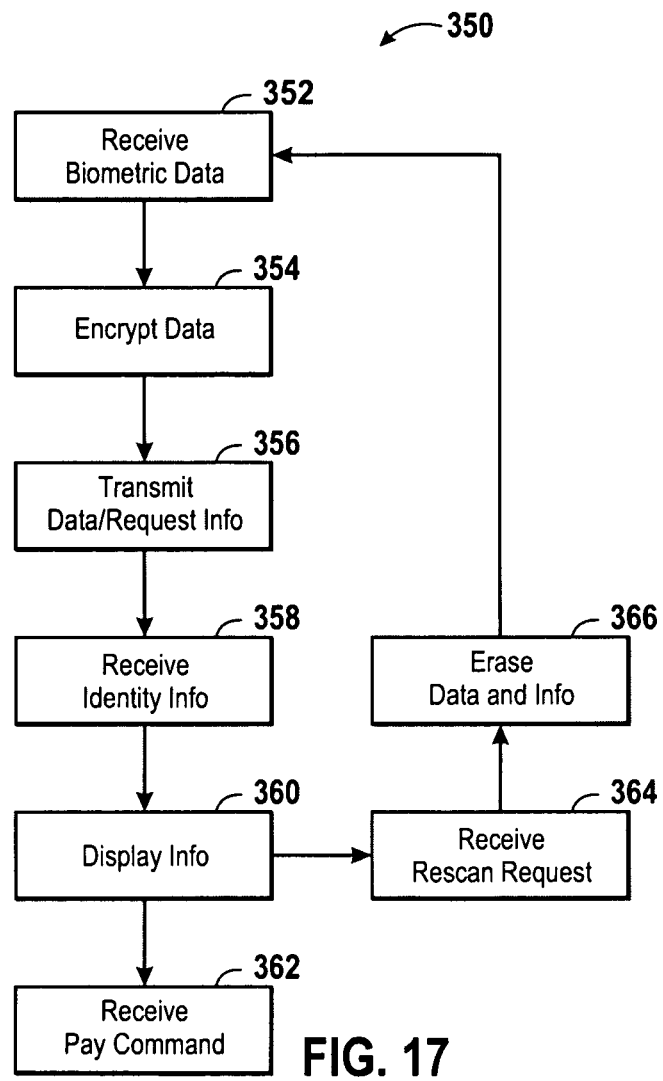
FIG. 17 is a flowchart depicting a method for acquiring payment information based on biometric data in accordance with one embodiment.

FIG. 17 is a flowchart depicting an exemplary method 350 for acquiring payment information based on a biometric feature as illustrated in FIG. 16. The method may begin by receiving (block 352) biometric data. The biometric data may be received through a sensor, such as biometric sensor 45 located on the device 10, and may include biometric features such as a fingerprint, hand geometry, or voice pattern. After receiving the data, the device 10 may encrypt (block 354) the data, using an SSL protocol, for example, to provide data security during transmission. In certain embodiments, the device 10 may perform feature extraction prior to encryption of the data. For example, a feature extraction program within the storage of the device may extract the sensed biometric features. In these embodiments, the extracted features may be encrypted. However, in other embodiments, the device 10 may encrypt the raw data and transmit the data to an external device for feature extraction. For example, the external server 96 may perform the feature extraction or transmit the data to a commercial biometric service provider for feature extraction. In certain embodiments, the biometric service provider may perform feature extraction and maintain a database of biometric features associated with customers' payment information.

After encryption, the raw or extracted features are transmitted (block 356) to a database to request identification information and payment information. For example, the data may be sent to a commercial database that maintains templates of biometric features. In certain embodiments, the templates may be acquired from customers when they sign up for the database service. The database service provider may compare the received data to the templates stored within the database to identify the customer. In certain embodiments, the database service provider also may maintain the customer's payment information, such as credit card or bank accounts linked to the customer. In these embodiments, the service provider may transmit both the customer's identity and the payment information to the electronic device. However, in other embodiment, the service provider may only transit the customer's identity, and the merchant may maintain a database of the customer's payment information linked to the customer's identify.

The electronic device 10 may then receive (block 358) the identity information for the customer. The information may be received over any of the communication channels available to the electronic device 10. As mentioned above, the identity information may include the payment information, or it may only include identification information, such as the customer's name and address, among other things. The information may then be displayed (block 360) on the device 10. If the information is correct, the device may receive (block 362) a pay command signifying that the payment should be processed. For example, a merchant may select the graphical element 228 (FIG. 16) to issue the pay command. If the displayed information if not correct, the device may receive (block 364) a re-scan request. For example, if the displayed information does not correspond to the customer, the merchant may select a graphical element on the device 10 to instruct the device to perform a re-scan. In response to the re-scan request, the device may erase (block 366) the data and corresponding identification information and payment information. The device may then be ready to receive (block 352) new biometric data.

Figure 18:
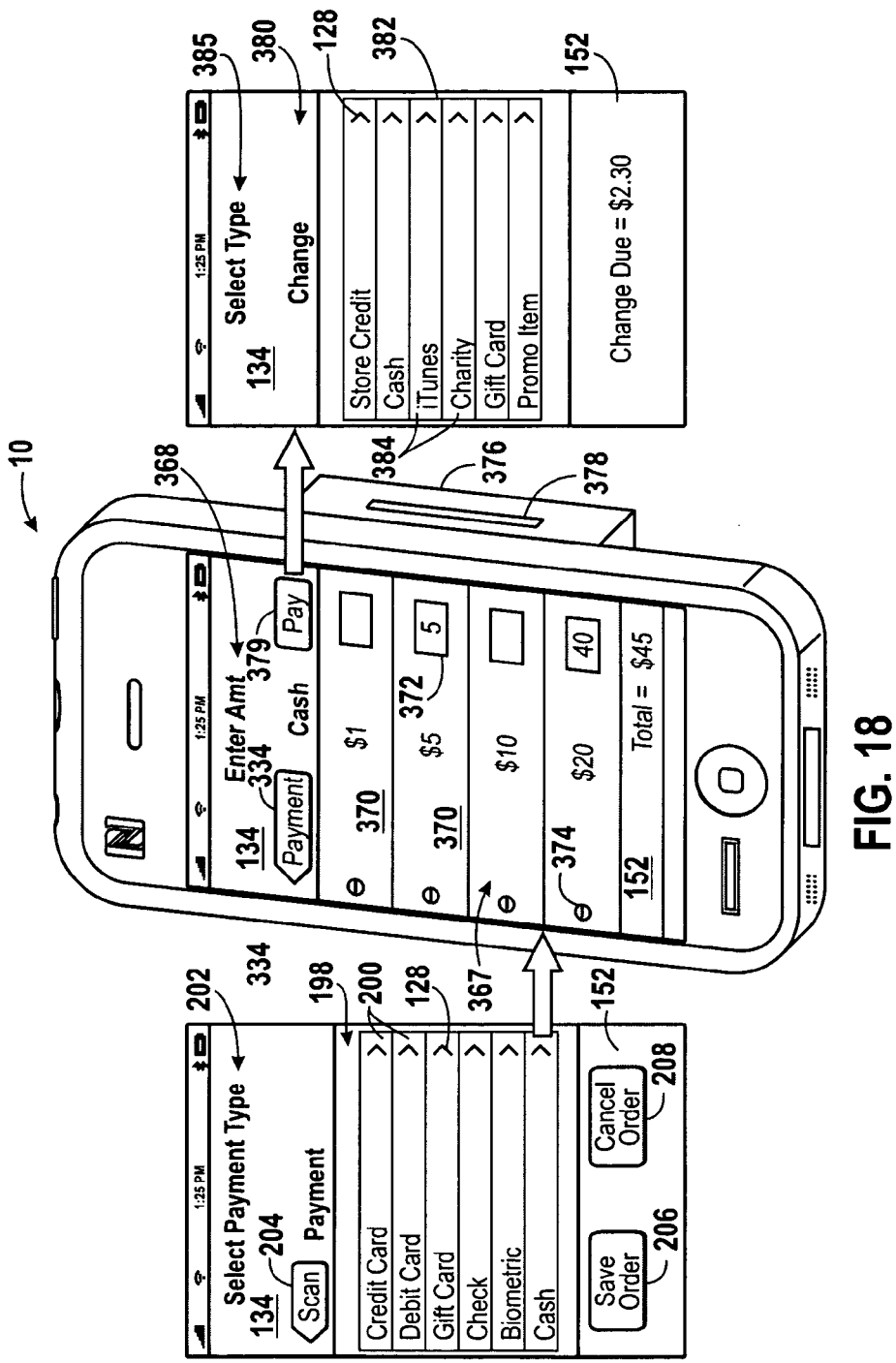
FIG. 18 shows screens of the device of FIG. 1 illustrating a method of receiving a cash payment in accordance with one embodiment.

In addition to receiving payment by credit card, check, or biometric features, the device 10 also may receive a cash payment as illustrated in FIG. 18. From the payment type selection screen 198, a merchant may select the cash selection bar 200 to display the cash payment screen 367. The screen 367 includes instructions 368 that prompt the merchant to enter the amount of cash received using the graphical elements 370. Each graphical element 370 may correspond to a different cash denomination, such as one, five, ten, or twenty dollars.

A merchant may select the graphical elements 370 that correspond to the amount of money received, and the selected amount may be displayed within areas 372. For example, as shown on the screen 367, the merchant has selected the $5 selection bar 370 to indicate that he has received a five-dollar bill. The corresponding display area 372 displays the number five to indicate that one five-dollar bill has been received. The merchant also has selected the $20 selection bar 370 two times to indicate that he has received two twenty-dollar bills. The corresponding display area 372 displays the number forty to indicate that two twenty-dollar bills have been received. The total amount of cash received may be displayed within the summary bar 152, which in this case displays the total amount of forty-five dollars.

To select a denomination more than once, a merchant may simply tap the selection bar the desired number of times. For example, to enter the receipt of two twenty-dollar bills, the merchant may tap the $20 selection bar 370 two times until a "40" is displayed within area 372. The selection bars 370 also include graphical elements 374 for deleting an entered denomination. For example, in response to selection of the deletion element 374 shown within the $20 selection bar 372, the area 372 may display an amount that is twenty dollars less than the amount previously displayed. Using the selection bars 370 and graphical elements 374, a merchant may enter amount of cash received into the device.

The device 10 also includes an optional storage box 376 that may be attached or affixed to the device 10 to provide a storage area for the cash received. The storage box 376 may be constructed of metal, plastic, or other suitable materials and attached to the device 10 using brackets, clips or other mechanical fasteners. The storage box 376 includes a slot 378 through which the bills may be received. In certain embodiments, the size of the storage box 376 may vary to compensate for larger numbers of bills or to accommodate coins. Furthermore, the selection bars 370 shown on screen 386 may include other values, such as $50 and 25¢.

In addition to instructions 368, the title bar 134 includes graphical elements 334 and 379 for navigating between screens. A merchant may select the graphical element 334 to return to the payment selection screen 198. If a merchant has finished entering the amount of cash received, the merchant may select the graphical element 379 to advance to a change screen 380. In certain embodiments, selection of the graphical element 379 also may cause the device to verify that the amount of cash input is greater than the amount due. The screen 380 includes a summary bar 152 that displays the amount of change due.

The change screen 380 allows the merchant to specify how a customer may receive her change. The screen 380 includes a window 382 that lists the change options available. For example, a customer may receive change in the form of store credit, cash, iTunes®, or a gift card. A customer also may donate her change to charity or receive a promotional item instead of receiving change. The window 382 includes selection bars 384 corresponding to each type of change. Instructions 385 prompt the merchant to select the type of change using the selection bars 384.

The change may be provided to the customer using various methods. For example, selection of the store credit selection bar 384 may display additional screens that prompt a merchant to enter the customer's identification information, such as an e-mail address, name, or address. The customer's identification information and corresponding store credit amount may be stored within the external server 96 (FIG. 4) and applied against a future purchase. Further, in certain embodiments, the store credit amount may be linked to a customer's credit card or electronic device using the near field communication based techniques described herein. For example, the customer's credit card number may be received using near field communication and stored within the external server 96 with the corresponding store credit amount. The store credit amount may then be automatically deducted from the purchase price in a subsequent transaction using the customer's credit card. In other embodiments, the customer may receive an e-mail providing a promotional code for using the store credit.

To provide change in the form of cash, a merchant may enter the customer's identification information into the device 10 and then instruct the customer to go to a customer service counter to receive her change. The device 10 may transmit the customer's identification information to the external server 96 or may send the identification information directly to a computer or other electronic device located at the customer service center.

Change also may be given to a customer by crediting one of her existing accounts, such as an iTunes® account. Specifically, selection of the iTunes® selection bar 384 may display screens for entering the customer's account information. If the customer does not have an existing account, the electronic device 10 also may be used to create a new account for the customer. The change amount may automatically be applied in the form of a credit to the customer's account.

A merchant may select the charity selection bar 384 to display screens allowing a customer to choose a charity to which to donate the change. In certain embodiments, a merchant may have established relationships with charities that a customer may select. The customer may select the charity from the list of charities displayed on the device.

A merchant may also provide change in the form of a gift card or promotional item. For example, a merchant may select the gift card selection bar 384 to enter the customer's identification information. The device 10 may then transmit the identification information to a customer service center where the customer may pick up her gift card. In other embodiments, the merchant may directly give the gift card to the customer or mail the gift card to the customer's home address. To provide a promotional item as change, a merchant may select the promotional item selection bar 384 to display a screen listing the available promotional items. The customer may then choose a promotional item from the list and receive the item from a customer service center or from the sales merchant. For example, the promotional items may include items such as candy, headphones, and song credits for iTunes®. In certain embodiments, the promotional items may be designed to entice the customer to purchase future items from the store or from one of the merchant's retail partners.

Figure 19:
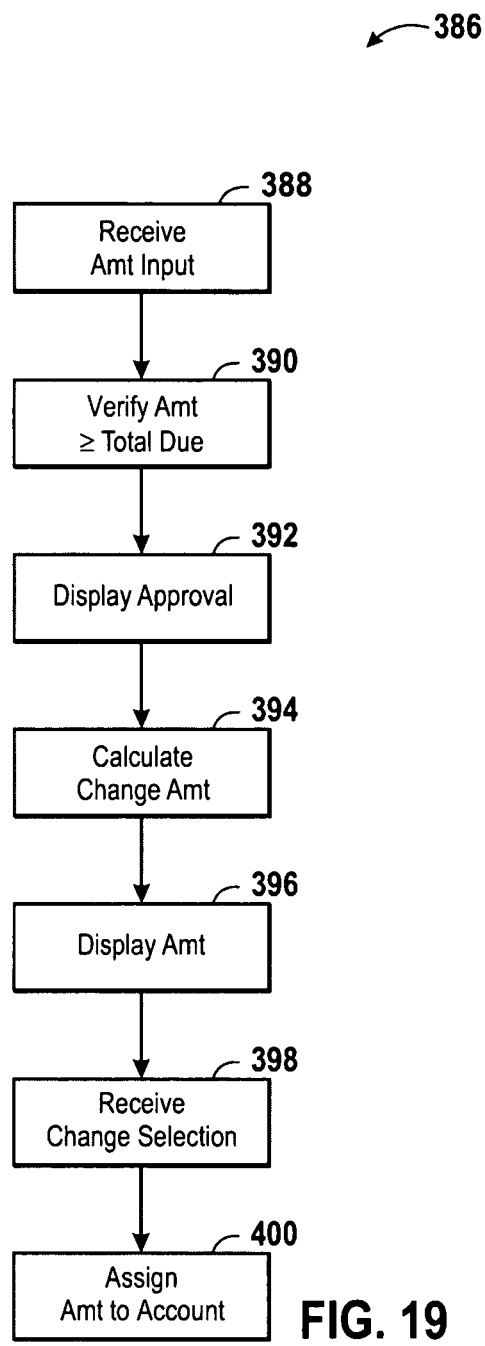
FIG. 19 is a flowchart depicting a method for receiving a cash payment in accordance with one embodiment.

FIG. 19 is a flowchart depicting an exemplary method 386 for accepting a cash payment as illustrated in FIG. 18. The method may begin by receiving (block 388) an input designating the amount of cash received. For example, the merchant may touch areas of the display screen corresponding to the cash denominations received from the customer. The device 10 may then total the amount of cash received and verify (block 390) that the amount received is greater than or equal to the total amount due. The verification may be performed in response to receiving a pay command, which may be generated by selection of the graphical element 379 shown in FIG. 18. Software may be included within the device 10 for performing this verification. After a successful verification, the device may display (block 392) an approval screen or message. In certain embodiments, the approval message may be displayed within the lower summary bar 152 shown on screen 380 in FIG. 18.

The device may then calculate (block 394) the amount of change due. The device may perform the calculation using software included within the device and may display the amount due on a screen of the device. The device 10 may then receive (block 398) a selection specifying how the change should be received. For example, a customer may verbally specify the change type and the merchant may enter this method into the device, for example using the screen 380 shown in FIG. 18. After receiving the change selection, if needed, the device may request additional information, such as the customer's identification information. The device may then assign (block 400) the amount of change to the designated account. The account may be a temporary customer account that allows the customer to receiver her change from customer service, or the account may be in the form of a store credit or gift card. In certain embodiments, the account may be a customer's personal account, such as an iTunes® account, or the account may be associated with a certain charity.

After payment has been received, by credit card, check, cash, or other suitable method, the merchant may offer incentives, such as rewards, to the customer. The rewards may be designed to promote customer loyalty and entice customers to shop with the merchant in the future. The rewards also may be provided by merchant partners. For example, a magazine company may pay the merchant to offer the company's magazine as a reward. In these embodiments, the rewards may serve as a form of advertising.

Figure 20:
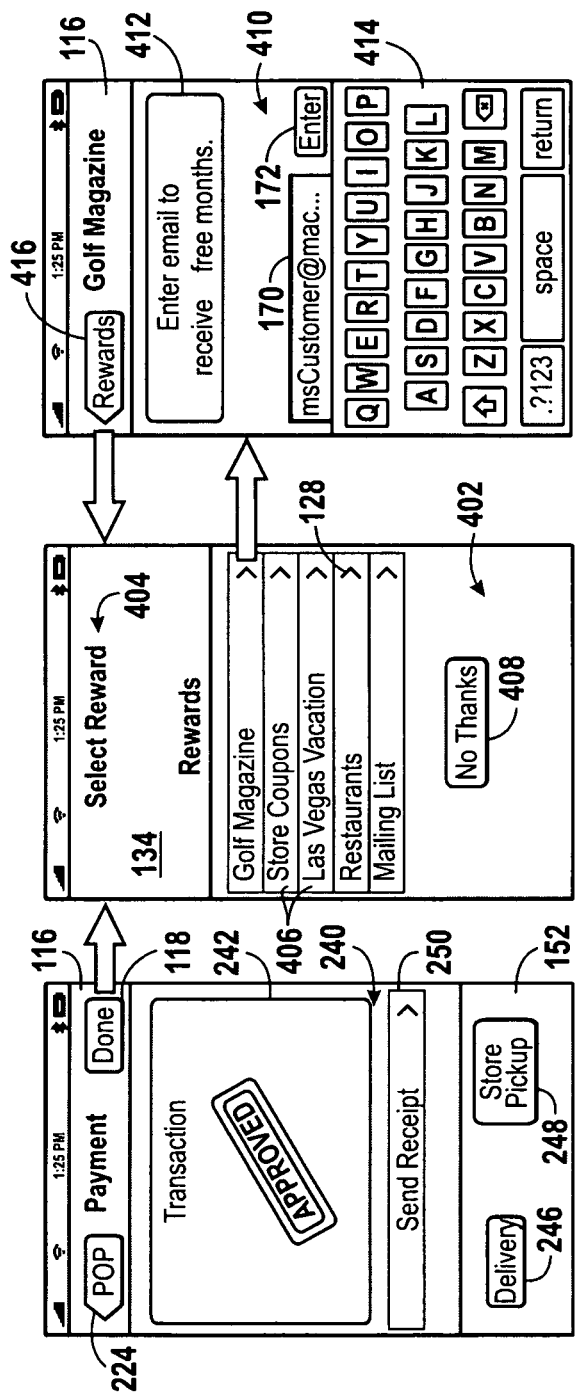
FIG. 20 is a front view of screens of the device of FIG. 1 illustrating a method of selecting rewards in accordance with one embodiment.

FIG. 20 illustrates a series of screens for providing a reward to a customer. After receiving payment, through cash, near field communication, credit card, check, or other similar method, the device may display the transaction approval screen 240. From the screen 240, selection of the done graphical element 118 may cause the device to display a rewards screen 402. The rewards screen 402 includes instructions 404 prompting the merchant to select the reward type. The reward type may be selected using the selection bars 406 that correspond to specific rewards. For example, a customer may choose to receive a golf magazine, store coupons, a Las Vegas vacation, restaurant coupons, or other type of reward. The customer also may choose to be added to the merchant's mailing list, and may receive rewards for signing up. Of course, many other types of rewards from various types of merchants may be listed on the rewards screen 402.

If the customer would not like to receive a reward, the merchant may select the graphical element 408 to end the reward selection process. Selection of the graphical element 408 may return the merchant to the point of purchase main menu 114 shown in FIG. 6. If the customer chooses to receive a reward, the merchant may select the corresponding selection bar 406. For example, selection of the golf magazine selection bar 406 may display a screen 410 tailored to the selected reward. The screen 410 includes a window 412 that provides details about the reward. For example, the golf magazine may be received free for three months. If a customer, after seeing the reward details, would not like to receive that reward, the merchant may select a graphical element 416 to return to the reward selection screen 402.

If a customer would like to receive the reward, the merchant may enter the customer's information through a keypad 414. The display window 412 may include information specifying the type of information required to receive the reward. After entry, the information may be displayed within the display area 170. For example, as shown on screen 410, the customer's e-mail address has been entered using the keypad 414 and is shown in display area 170. After successful entry of the customer's information, the merchant may select the graphical element 172 to enter the information. The information may then be transmitted to the external server 96 (FIG. 4), which in turn may provide the information to the company issuing the reward. In other embodiments, the device 10 may transmit the reward information directly to the company issuing the reward. Of course, instead of an e-mail address, other identification information, such as the customer's mailing address, may be received. Further, the customer's information may be received using other methods and devices described above, such as the NFC device 44 (FIG. 1), the camera 46 (FIG. 2) or the biometric sensor 45 (FIG. 1).

Figure 21:
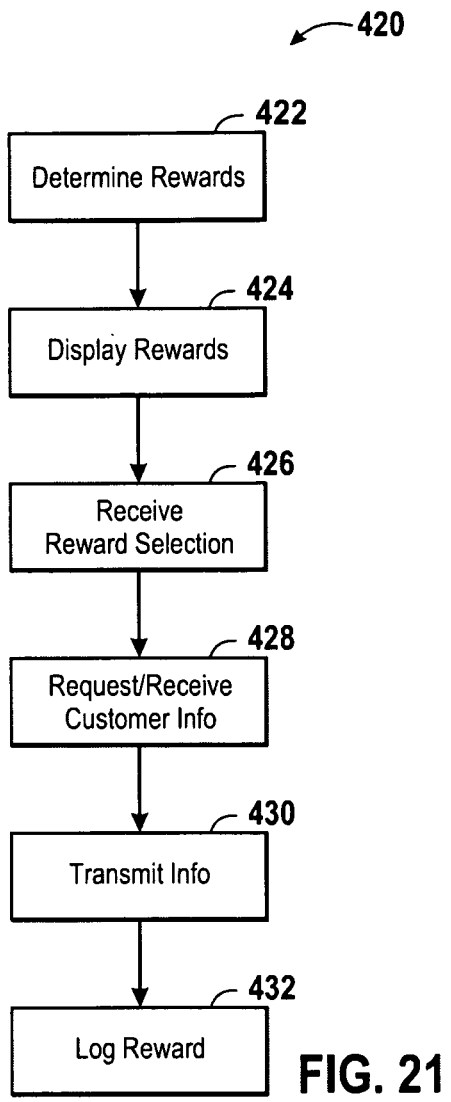
FIG. 21 is a flowchart depicting a method of selecting rewards in accordance with one-embodiment.

FIG. 21 is a flowchart depicting an exemplary method 420 for providing rewards as illustrated in FIG. 20. The method may begin by determining (block 422) available rewards. The rewards may be determined based on the purchase price, items purchased, partner offers, shopping frequency, payment method, and other preferences or criteria. For example, customers who spend over a specified amount may be offered rewards that are more valuable. In another example, a customer purchasing golf clubs may be offered a golf magazine as a reward. The rewards may be determined based on preferences set by the merchant or by the company offering the reward. After the rewards have been determined, the device 10 may display (block 424) the rewards. Of course, in certain embodiments, only one set of rewards may be available, and in this case, no determination may be needed. The device 10 may then receive the reward selection (block 426).

Based on the reward selection, the device may request and receive (block 428) the required customer information. The customer information may be specific to the type of reward selected. For example, a magazine subscription may require the mailing address of the customer. In other embodiments, the reward company may request the customer's e-mail address for sending further information about the reward. Of course, if the reward is provided by the store, for example as a promotional item or coupons, the reward may be automatically applied to the customer's next purchase, applied to the current purchase, or physically given to the customer. Further, in certain embodiments, the customer's information may be automatically provided by the device 10. For example, if the customer has paid by credit card, the merchant may already have the customer's home address. In this case, the device may automatically retrieve the customer's information from the device storage or from the external server.

After the information has been received, the information may be transmitted to the rewards company (block 430). The information may be transmitted to the server 96 (FIG. 4) over one of the communication channels and subsequently transmitted to the rewards company. The device 10 may then log (block 432) the reward by transmitting the information to the server for recordation. For example, the merchant may track the number of each type of reward provided in order to receive payment from a rewards company.

After receiving article information and/or payment information, the electronic device 10 may communicate with an external device, such as the external server 96 (FIG. 4) or an intermediate sales terminal that may be in communication with the external server 96. As described above with respect to FIG. 3, the device 10 includes many communication interfaces 56, 58, 60, 62, 64, 66, 68, and 70 that may be used to communicate with an external device. Through the communication interfaces 56, 58, 60, 62, 64, 66, 68, and 70, the device 10 may transmit and/or receive various types of information. For example, the device 10 may query inventory information from a store database. In another example, the device 10 may transmit credit card information to receive authorization for payment. In yet another example, the device 10 may transmit the customer's name and address to schedule delivery of purchased articles.

FIG. 22 illustrates a communication system 440 for transmitting information between the electronic device 10 and the external server 96 using a local area network. The local area network may serve a relatively small geographic area that encompasses the location of the external server and the articles of merchandise. For example, the local area network may provide communication between the electronic device 10 and the external server when the device and server are located within the same building. In certain embodiments, the local area network may be maintained by the merchant.

The device 10 may communicate over a wired local area network using the LAN interface 66 or over a wireless local area network using the WLAN interface 68. The LAN interface 66 may communicate with a corresponding LAN interface 442 located on the external server 96, and the WLAN interface 68 may communicate with a corresponding WLAN interface 444 on the external server 96. A peer-to-peer connection may be used to establish a communication path 446 between the device LAN interface 66 and the server LAN interface 442. The communication path 446 also may include a router or network controller for connecting the device LAN interface 66 to the server LAN interface 442. In certain embodiments, the device 10 may be connected to the LAN communication path 446 by connecting an Ethernet cable to the device 10 and to a corresponding Ethernet port located along the communication path 446. Similarly, the WLAN interfaces 68 and 444 may be connected through a wireless connection, such as an IEEE standard 802.11x wireless network, or Wi-Fi hotspot.

The device 10 and server 96 also may be connected over a local area network through the Internet 450. Communication path 452 represents connection of the LAN interface 66 to the LAN interface 442 through the Internet 450. Similarly, communication path 454 represents connection of the WLAN interface 68 to the WLAN interface 444 through the Internet 450. In certain embodiments, both the device 10 and the server 96 may connect to the LAN or WLAN communication paths. These paths may be established locally allowing the device 10 and server 96 to be located within different geographical regions. For example, the external server 96 (FIG. 4) may be located in another state or country than the electronic device 10. The Internet 450 may allow the electronic device 10 and the external server 96 to communicate even though they are not located within the same local geographic region. Further, the Internet 450 may provide access to a database containing inventory and pricing information.

FIG. 23 illustrates a communication system 456 for transmitting information between the device 10 and the server 96 using an intermediate device 458. The intermediate device 458 may be a docking station, computer, or other similar device located within the retail area. The intermediate device 458 includes an I/O port 456 that may be connected to the IO port 34 of the device 10. For example, the I/O port 456 may be a proprietary connection from Apple Inc. that corresponds to the I/O port 34. The intermediate device 458 also may include a NFC interface 462 that may be connected to the NFC interface 60 of the device 10. Further, the intermediate device 458 may include a PAN interface 464 that may be connected to the PAN interface 64 of the device 10.

The intermediate device 458 may receive information from the device 10 through the interfaces 460, 462, and 464, and then transmit the information using a LAN interface 466 or a WLAN interface 468. Specifically, the LAN interface 466 may communicate with the LAN interface 404 of the server 96, and the WLAN interface 468 may communicate with the WLAN interface 406 of the server 96. Control circuitry 470 may be included within the intermediate device 458 for controlling and routing information within the intermediate device 458. In certain embodiments, the control circuitry 470 may include a microprocessor or microcontroller.

Communication between the device 10 and the intermediate device 458 may be established by connecting a cable, such as a serial cable or proprietary connection cable, between the I/O ports 34 and 460. The connection between the I/O ports 34 and 460 may be generally referred to as a communication path 472. The device 10 and the intermediate device 458 also may be connected by a NFC communication path 474 that connects the NFC interfaces 60 and 462. The NFC communication path 474 may be established by bringing the device 10 and the intermediate device 458 within close proximity of each other. The PAN interfaces 64 and 464 may be connected by a PAN communication path 476. The PAN communication path may include a peer-to-peer connection established over a network such as a Bluetooth network, an IEE 802.15.4 (ZigBee) network, or an ultra wideband network. In certain embodiments, a device identification networking protocol may be used to establish the NFC communication path 474 or the PAN communication path 476. For example, the working device 10 and the intermediate device 458 may broadcast identification information using Internet protocol to open a peer-to-peer connection.

Upon receiving information from the electronic device 10, the intermediate device 458 may transmit the information to the external server 96. Within the intermediate device 458, the control circuitry 470 may direct the information to the LAN interface 466 or the WLAN interface 468 for transmission to the server 96. The LAN interface 466 of the intermediate device 458 may connect to the LAN interface 442 of the external server over a wired communication path 478. For example, the communication path 478 may include an Ethernet connection. The connection may be a direct connection between the interfaces or may include an intermediate connection device such as a router or network controller. The WLAN interface 468 of the intermediate device 458 may connect to the WLAN interface 44 of the external server over a wireless communication path 480, such as an IEEE 802.11x wireless network or Wi-Fi network.

FIG. 24 illustrates a communication system 482 for transmitting information between the device 10 and the server 96 through a cellular system 484. The cellular system 484 may include one or more antennas integrated into a cellular network maintained by a mobile service provider. Interfaces 486, 488, and 490 of the external server 96 may connect to corresponding interfaces 70, 68, and 62 of the electronic device 10. For example, the SMS interface 486 of the server 96 may be connected to the SMS interface 70 of the device 10 over a communication path 500. In certain embodiments, the external server 96 may include a phone or GSM modem configured to receive the SMS communication. In other embodiments, the external server may receive messages forwarded from a Short Message Service Center (SMSC). The SMSC may be included within the cellular network 484 to control the SMS messages. In yet other embodiments, the server 96 may receive messages forwarded from the SMS gateway of the service provider.

The USSD interface 490 of the server may be connected to the USSD interface 62 of the electronic device 10 over a communication path 502. Similar to the SMS communication path 500, the USSD communication path 502 may transmit information through the cellular network 484. However, instead of SMS messages, the device 10 may transmit USSD messages. The USSD messages may include short messages that may be transmitted without storage capabilities over the cellular network 484.

The device 10 and the external server 96 also may communicate through the Internet 450 over a wide area network communication path 504. The WAN interface 68 of the electronic device 10 may transmit information to the cellular network 484 that may subsequently transmit the information over the Internet 450 to the external server 96. The cellular network 484 may include an Enhanced Data rates for GMS Evolution (EDGE) network, a 3G network, or other suitable network.

In addition to using the Internet 450, the WAN interfaces 68 and 488 may be connected through a web service 506, illustrated by a communication path 508. The web service 506 may allow the device 10 and server 96 to locate each other over the Internet 450. For example, the device 10 may query the web service 506 to obtain an Internet protocol (IP) address for the server 96.

The device 10 and the server 96 may communicate using any of the communication paths illustrated in FIGS. 22-24. Of course, the communication paths are illustrated by way of example and are not intended to be limiting. Certain embodiments may include only some of the communication paths illustrated, while other embodiments may include all of the communication paths illustrated in addition to other communication paths. Further, the device 10 may include a protocol, such as a High-Speed Downlink Packet Access (HSDPA) protocol, for rapidly downloading data and switching between the communication paths. For example, the device 10 may automatically switch between an EDGE network, a 3G network, and a WLAN network, to maintain increased data transfer rates.

The device 10 may select a communication path based on the preferences 72 (FIG. 3) stored within the device. The preferences 72 may determine the available communication paths and the order of selection. For example, the preferences 72 may direct the device 10 to select the communication path with the highest level of security. In another example, the preferences 72 may direct the device 10 to select a communication path with a high rate of data transfer. The preferences 72 also may include different sets of rules for different types of sales transactions. For example, the preferences 72 may be set so that for orders above a certain purchase price or number of articles the device selects a communication path that uses encryption.

Figure 25:
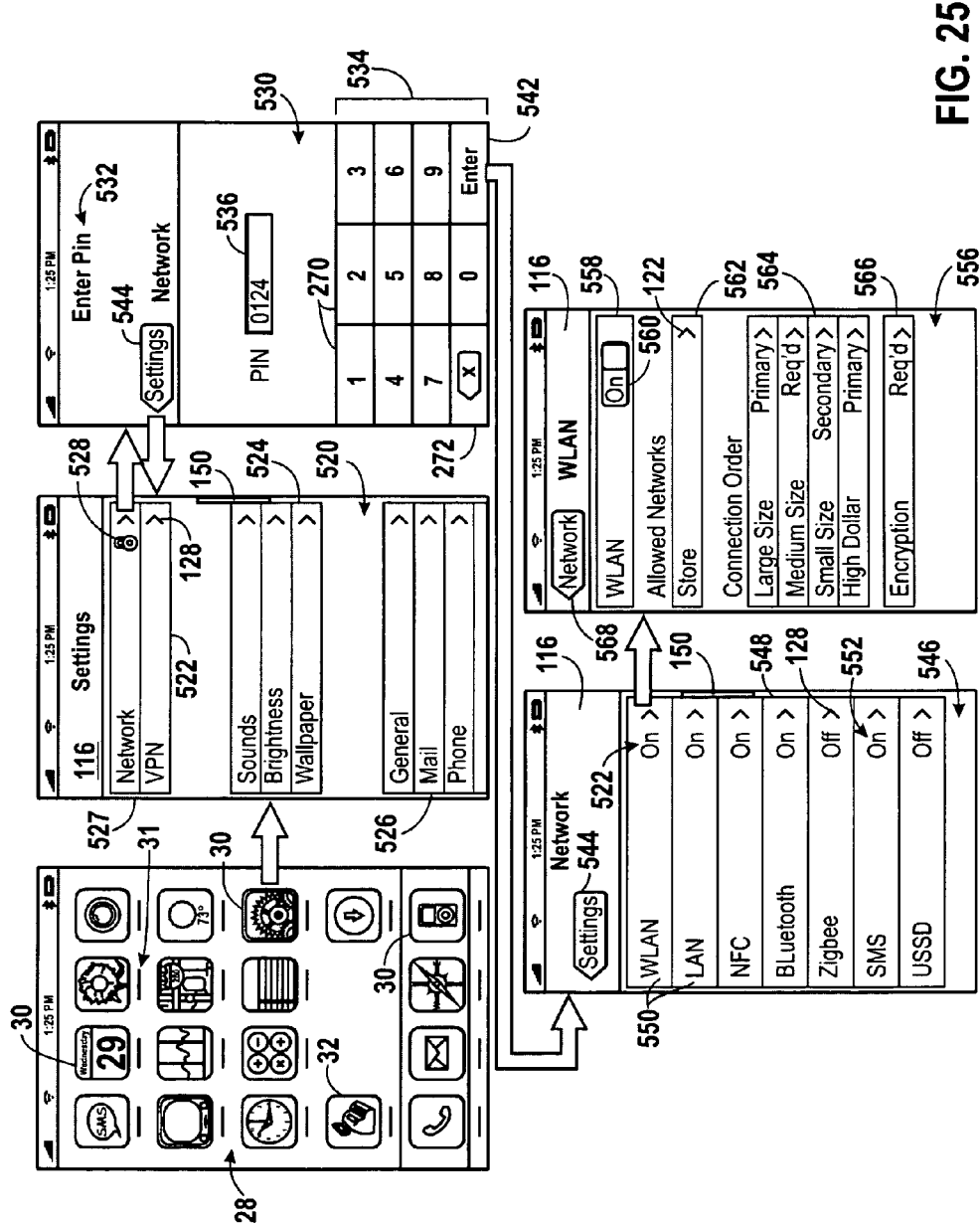
FIG. 25 is a front view of screens of the device of FIG. 1 illustrating a method of setting communication channel preferences in accordance with one embodiment.

FIG. 25 illustrates a series of screens for setting the preferences 72 (FIG. 3). The preferences 72 may be accessed through the settings icon 30 on the home screen 28. In response to selection of the settings icon 30, the device 10 may display the settings main menu screen 520. The screen 520 includes several display windows 522, 524, and 526 displaying selection bars for various types of settings. For example, the display window 524 includes selection bars for accessing settings related to audio and visual properties, such as sounds, brightness, and wallpaper. The display window 526 includes selection bars for changing operational parameters of phone functionality, such as general settings, e-mail settings, and phone settings. As will be appreciated, the types of settings are provided for illustrative purposes only, and additional settings may be provided based on individual POP system requirements. Further, additional settings may be viewed using the scroll bar 150.

The preferences 72 may be accessed through selection bars within the display window 522. The network selection bar 527 includes an indicator 528, shown here as a lock icon, that indicates that the network settings are locked. The locked settings may require a pin or other security input in order to access the network settings. The device 10 may display a pin entry screen 530 in response to selection of the selection bar 527. The pin screen 530 includes an instruction 532 prompting the user to enter the pin through a keypad 534. The keypad 534 includes the keys 270 that a user may select to enter the pin code. In certain embodiments, the network settings and preferences may be configured by the device manufacture and may be changed using a pin provided by the manufacture. The merchant may maintain the pin so that only certain employees, such a manager, may change the preferences. If a user does not have the pin code, the graphical element 544 may be selected to return to the settings screen 520.

The pin numbers entered using the keypad 534 may be displayed within the display area 536. However, in other embodiments, symbols, such as an asterisk, may be displayed to conceal the pin number. Once the pin has been entered, the graphical element 542 may be selected to submit the pin code and access the network settings. As will be appreciated, the pin code may be replaced by other, or additional, security features, such as a biometric sensor for reading a fingerprint of an authorized user or an authorization token that may be read using near field communication.

After the pin code has been entered successfully, the network settings screen 546 may be displayed. The network settings screen 546 includes a window 548 with selection bars 550 for configuring various types of network interface preferences. Status indicators 522 are provided on each selection bar to indicate whether the network interface is turned on or off. For example, the ZigBee selection bar 550 displays an "Off" status indicating that the device may not access a ZigBee network. The selection bars 550 also include arrows 128 that indicate that additional screens may be accessed by selecting the selection bars 550.

In response to selection of a selection bar 550, the device 10 may display screens for configuring a communication interface of the device 10. For example, selection of the WLAN selection bar 550 may display a WLAN settings screen 556. The screen 556 includes a display window 558 that shows the status of the WLAN network. A slider 560 may be used to enable or disable the network interface. For example, a user may drag the slider 560 to the right to turn the WLAN interface off.

The settings screen 556 also includes a window 562 displaying the specific networks that the device has permission to access. For example, the store network is an allowed network, and, therefore, the device 10 may connect to the store network through the WLAN interface 58. A user may change the allowed networks by selecting the window 562 to display one or more screens for configuring allowed networks. The window 562 may display the allowed networks by the network's name, IP address, or other identification information.

Another window 564 includes selection bars for determining the connection order. The selection bars allow the connection order to be set based on the data size or the transaction purchase amount. In other embodiments, additional priority preferences may be employed, such as the customer's shopping frequency or the number of items in the sales order. As shown, the WLAN connection is the primary connection for sales transactions with large amounts of data. For medium size data transfers the WLAN network is required, and for small size transfers the WLAN is the secondary network. In certain embodiments, the primary, secondary, and tertiary communication interfaces may be specified from any of the communication interface setting screens. For example, the SMS or USSD interface may be the primary network for small size transactions. The data amounts corresponding to the large, medium, and small sizes may be configured by the device manufacture or by the user.

Selection of the connection order selection bars may display screens summarizing the preferences for each type. For example, selection of the "large size" selection bar may display the primary, secondary, and tertiary communication interfaces for large size transactions. In certain embodiments, a user may change the priority preferences from these screens. Of course, other preferences, such as the customer's amount of reward points or shopping frequency, may also be used to determine the connection priority.

The settings screen 556 also includes a display window 566 showing the status of data encryption. Under the current preferences, encryption is required for transmitting data through the WLAN communication interface. In certain embodiments, the encryption may be performed by an SSL protocol executed by the processor. The display window 556 also may display the type of encryption required. In certain embodiments, the encryption preferences may be changed by selecting the encryption selection window 566.

Figure 26:
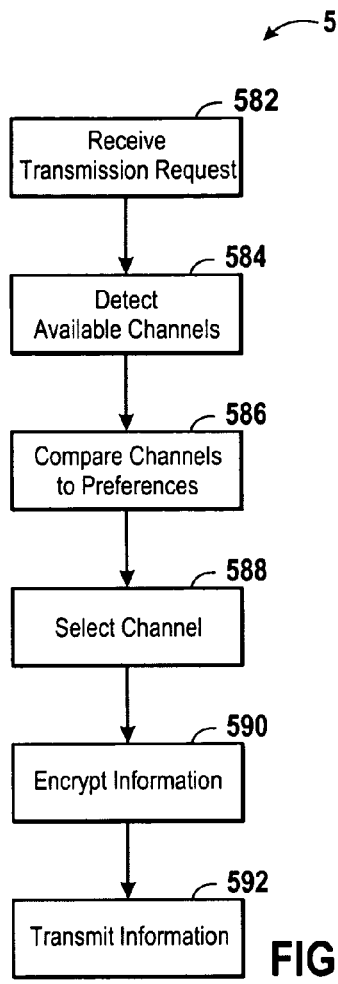
FIG. 26 is a flowchart depicting a method of transmitting information in accordance with one embodiment.

FIG. 26 is a flowchart depicting an exemplary method 580 for selecting a communication interface based on the preferences. The method may begin by receiving (block 585) a transmission request. For example, the device may need to transmit payment information for authorization, or the device may need to query inventory or article identification information from the server 96. In response to receiving a transmission request, the device may detect (block 584) available channels or paths for communication. For example, the device may determine whether a WLAN connection is available from the external server. In another example, the device may detect whether a near field communication path has been established. The device 10 may have multiple pending communication channels that allow communication with the server 96.

After detecting the available channels, the device may compare (block 586) the channel to the stored preferences. For example, the device 10 may determine the size of the information to be transmitted or the amount of the payment transaction. Control logic stored within the device 10 may be used to determine the appropriate communication channel and interface based on the stored preferences. The device may then select (block 588) the communication channel that most closely matches the preferences. For example, as shown in FIG. 25, if the device detects that the amount of information to be transmitted is of a large size, the device may automatically select the WLAN communication interface. In another example, the device may determine that the payment information to be transmitted is credit card information, and in this case, the preferences may require a LAN connection to be used.

The device also may encrypt (block 590) the information prior to transmitting it over the selected path. Of course, depending on the type of the information, encryption may not be required and block 590 may be omitted. For example, if the information is inventory information, no encryption may be required. In certain embodiments, the type of encryption used may depend on the selected path. For example, a high level of encryption may be used if the selected path is a wide area network, while no encryption may be used for a local area network. After encryption, the device may transmit (block 592) the information over the selected communication path.

Figure 27:
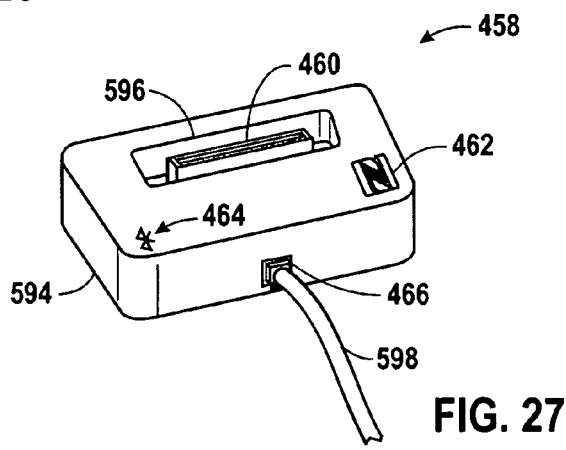
FIG. 27 is a perspective view of an intermediate device in accordance with one embodiment.

As noted above with respect to FIGS. 22-24, several communication paths may include transmission through the intermediate device 458. FIG. 27 illustrates one embodiment of the intermediate device 458, shown here as a docking station. The docking station 458 includes a base 594 that may be composed of plastic, metal, or other suitable material. The base 594 includes a recess 596 that houses the I/O port 460. According to certain embodiments, the I/O port 460 may be designed to connect to the IO port 34 included on the device 10. In certain embodiments, the I/O port 34 of the device 10 may be connected directly to the IO port 460. However, in other embodiments, a connection cable may be used to connect the I/O port 34 and the I/O port 460.

The base 594 also includes the NFC interface 462. No physical connection may be required when using the NFC interface 462. For example, the device 10 may be brought within close proximity to the docking station 458 to establish a communication link between the NFC interfaces 60 and 462 using the NFC device 44 of the electronic device 10. The base 594 also includes the PAN interface 464. Again, no physical connection may be required. The PAN communication path may be established when the device 10 is brought near the docking station 458. In certain embodiments, the NFC interface 462 and/or the PAN interface 464 may be used to establish a wireless connection between the device 10 and the intermediate device 458. Further, the PAN interface and the NFC interface may be used to establish a wireless communication channel directly to the server 96. The intermediate device 458 also includes the LAN interface 466. A cable 598, such as an Ethernet cable, may connect the LAN interface 466 to the LAN interface of the server 96 (FIG. 4).

Figures 28, 29:
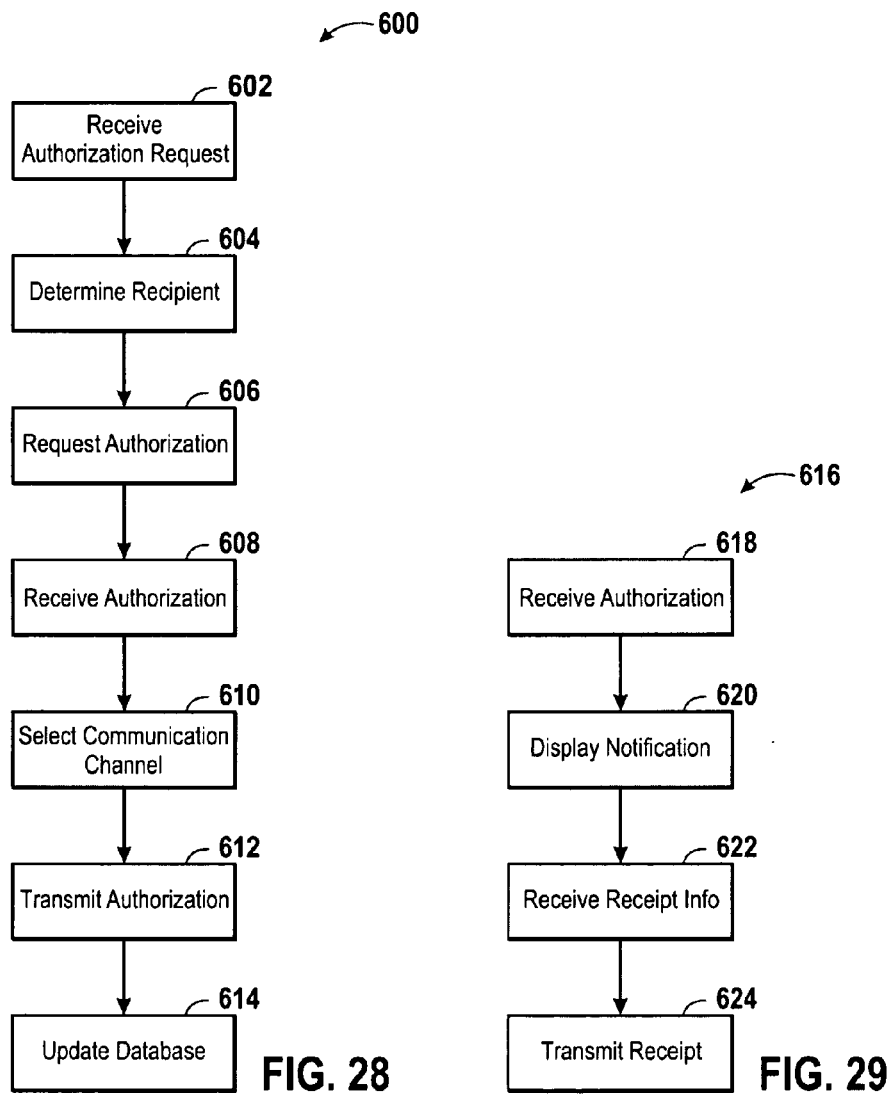
FIG. 28 is a flowchart depicting a method of transmitting authorization in accordance with one embodiment.
FIG. 29 is a flowchart depicting a method of receiving authorization in accordance with one embodiment.

In certain embodiments, the server 96 may be configured to select a communication path for communicating with the device 10. FIG. 28 is a flowchart depicting an exemplary method 600 for transmitting information and requesting authorization, as generally described in block 110 of FIG. 5. The method 600 may begin by receiving (block 602) an authorization request. For example, the authorization request may be received from the device 10 and may be coupled with the transmission of payment information such as credit card account information or checking account information. The server 96 may then determine the recipients (block 604) of the authorization request. For example, the authorization request may include financier information encoded with the payment information. This information may identify the bank that should receive the authorization request. In certain embodiments, the server 96 may be configured to transmit the information to the merchant's bank for determination of the recipient. In this case, the merchant's bank may decode the financer information encoded with the payment information.

The method may continue by requesting (block 606) authorization from the financial institutions. For example, the server 96 may transmit the payment information to the merchant's bank 98 as shown in FIG. 4. The server 96 may then receive (block 608) authorization for the payment from the financial institution. As described above, the financial institution may verify that sufficient funds are available for payment before transmitting the authorization to the server. After the authorization is received, the server 96 may select the communication channel (block 610) or path. Of course, in certain embodiments the server 96 may be configured to transmit the authorization over the same communication path that was used to receive the authorization request. However, in other embodiments, the communication path may be selected by detecting the available communication paths and then selecting the path with the fastest data transmission rate. The selection also may be based on preferences similar to those used by the device 10, such as the data size or the transaction amount. In certain embodiments, the preferences 72 may be transmitted to the external server 96 and employed by the server to determine the communication path. As will be appreciated, the server 96 may select the communication path from multiple communication channels that may be pending between the device 10 and the server 96. After a communication channel is selected, the server 96 may then transmit (block 612) the authorization to the device 10.

The server 96 also may perform additional functions such as updating a database (block 614). For example, the server 96 may update an inventory database based on the articles purchased. The server 96 also may update the amount of payment received for maintaining the financial records of the merchant. In certain embodiments, the server 96 may track analytics information, such as transaction volumes, locations, behavioral contexts, and transaction amounts, for the merchant. The server 96 may update a database with analytics information after each transaction or at the end of a batch period. The server 96 also may update a database of transaction information for credit card providers. For example, the server 96 may compile level 1, 2, and 3 data related to the credit card transactions into a database that is provided to the credit card providers when the authorized transactions are sent to the credit card providers as batches. In certain embodiments, the preferences 72 (FIG. 4) may specify the level of data that is maintained for each type of credit card transaction. For example, a merchant may set the preferences 72 to track and send level 2 data for transactions using government credit cards and to track and send level 1 data for transactions using individual consumer credit cards. The level of data provided for each type of credit card may allow a merchant to pay lower transaction fees. Of course, the server 96 also may perform many other retail functions associated with bookkeeping and database management.

FIG. 29 is a flowchart depicting an exemplary method 616 for receiving authorization from the server 96. The method 616 may be executed by the device 10 and may be used as a method for receiving authorization as shown by block 112 in FIG. 5. The method may begin by receiving (block 618) an authorization for payment. For example, the authorization may indicate that the customer has sufficient funds to purchase the articles. After receiving the authorization, the device 10 may display (block 620) a notification that the transaction has been approved. The notification may be displayed as shown by screen 240 depicted in FIGS. 10, 11, and 13. The device 10 may then receive receipt information (block 622). The receipt information may include the customer's e-mail address or postal address for subsequent transmission of the receipt. In certain embodiments, the receipt information may be received using the selection bar 250 shown in FIG. 14 as part of the screen 240. The device 10 may transmit (block 624) the receipt to the customer. However, in other embodiments, the device 10 may transmit the receipt information to the server 96 for subsequent transmission to the customer.

Figure 30:
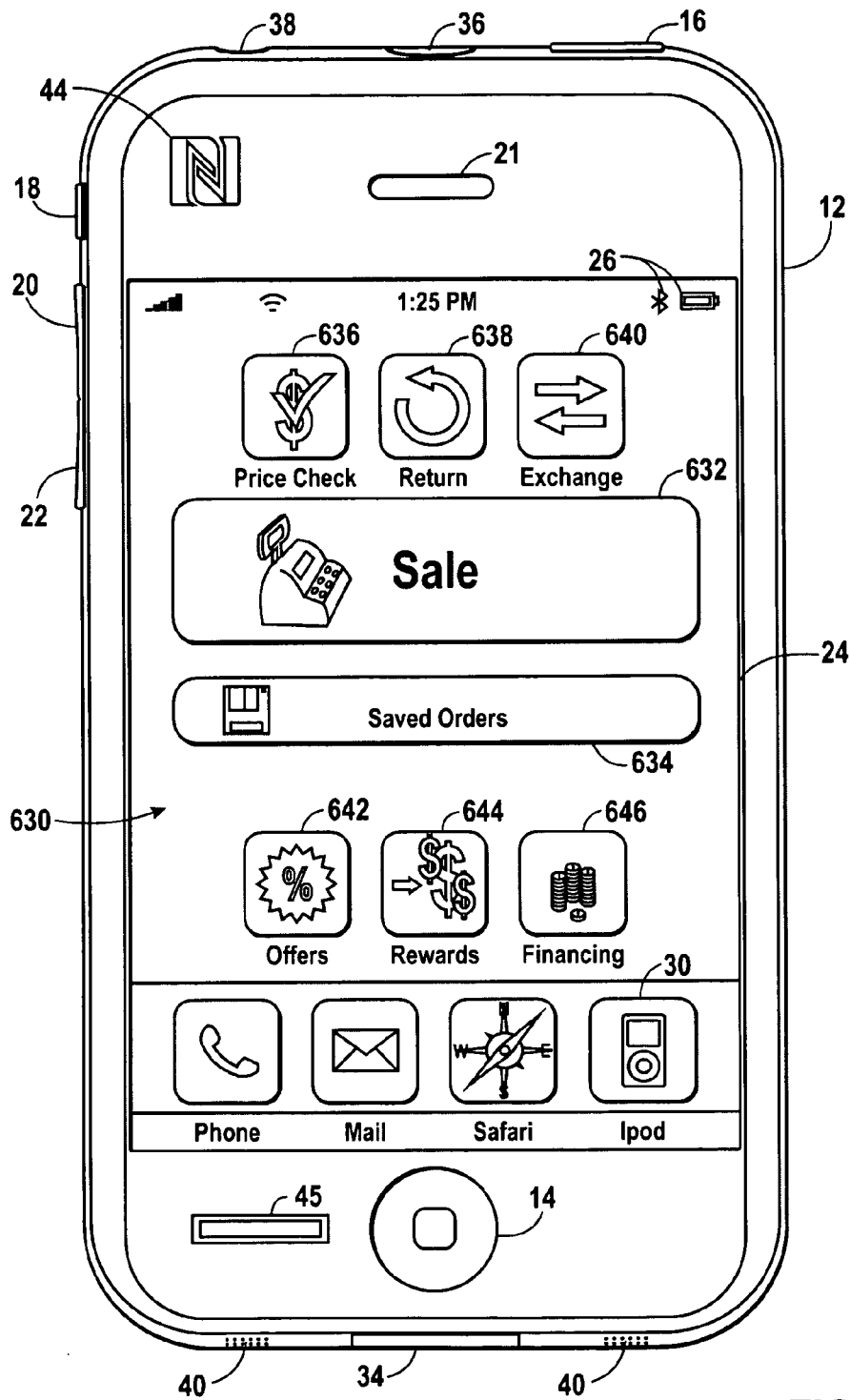
FIG. 30 is a front view of a portable electronic device illustrating another home screen for conducting sales transactions in accordance with one embodiment.

The home screen of the device 10 may be customized for sales transactions. FIG. 30 illustrates an alternate embodiment of the device 10 that includes a customized home screen 630. The screen 630 includes a graphical element 632 that may be selected to perform a sales transaction. Upon selection of the graphical element 632, the device may enter a near field communication scanning mode. For example, the device 10 may display the screens illustrated in FIGS. 9 and 11 for scanning articles and receiving payment using near field communication. In other embodiments, the device 10 may be configured to automatically enter a bar code scanning mode or a keypad entry mode. Of course, the graphical element 632 may be used to conduct sales transactions by any of the methods described herein, including the use of NFC, the camera, and the biometric sensor.

The screen 630 also includes several other graphical elements 634, 636, 638, 640, 642, 644, and 646 that may be selected to perform sales related transactions. The graphical elements provided and their corresponding functionality may be tailored to the specific needs of a merchant. For example, the graphical element 634 may be selected to retrieve and display orders saved during a previous transaction. In another example, the graphical elements 636, 638, and 640 may be selected to perform a price check, a return, and an exchange, respectively. Details of theses transactions are described below with respect to FIGS. 31-34.

The screen 630 also includes graphical elements 642, 644, and 646 for obtaining information from and transmitting information to the customer. For example, the graphical element 642 may be selected to retrieve current store specials and offers available to customers. The graphical element 644 may be selected to access the merchant's rewards program. For example, the graphical element 644 may be used to enter a mode for enrolling a customer in the store rewards program or for redeeming awards available to the customer. The graphical element 646 may be selected to enroll a customer in a financing program.

The screen 630 also may include a lower summary bar containing graphical elements 30 for performing various non-commercial functions, such as accessing a telephone, a mail application, an Internet browser, or a music player. These graphical elements 30 may be customizable by the user and may allow convenient access to the integrated functionality of the device 10. For example, the phone graphical element 30 may be configured to contact security or a store manager when selected. In another example, the Internet graphical element 30 may be configured to open an internal store website displaying work schedules and store policies.

Figure 31:
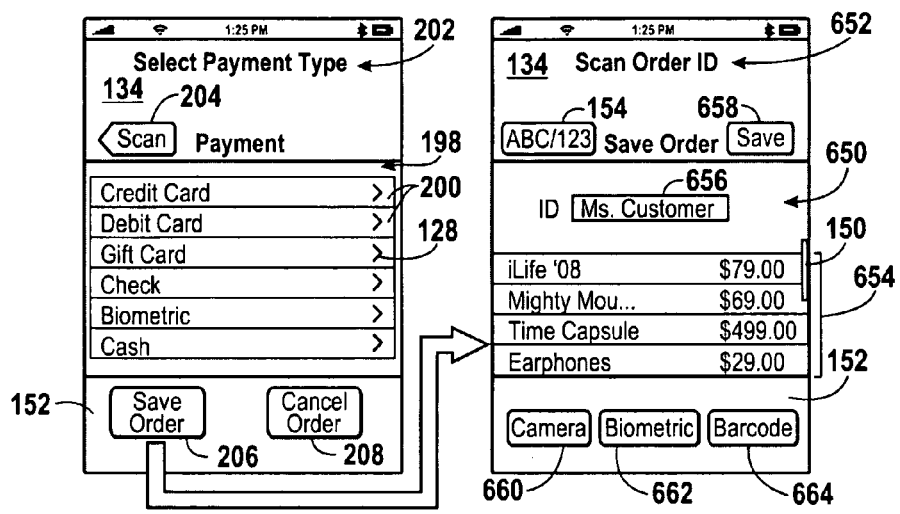
FIG. 31 is a front view of screens of the device of FIG. 30 illustrating a method of saving an order in accordance with one embodiment.

FIG. 31 illustrates a process for saving an order that may be retrieved by selecting the graphical 634 shown in FIG. 30. From the payment screen 198, a merchant may select the graphical element 206 to display the save order screen 650. The screen 650 includes instructions 652 prompting the merchant to scan an order identifier. The order identifier may be a customer's name, credit card number, biometric feature, or other identifier that may allow subsequent retrieval of the order.

The current order to be saved may be summarized within a display window 654. For example, the display window 654 may display information about the order, such as the name and purchase price of articles in the order. The order identifier may be used to retrieve the current order after the order has been saved. Upon entry or scanning, the order identifier may be displayed within a display area 656. For example, the customer's name may be displayed after scanning a NFC enabled credit card or electronic device using the NFC device 44 (FIG. 1) of the electronic device 10. As shown, the device may default to a NFC scanning mode to receive the order identifier. However, the order identifier also may be entered using a keypad accessed by selecting the graphical element 154. After the order identifier has been entered and is displayed in the area 656, the graphical element 658 may be selected to save the order. The device 10 may save and store the order and the corresponding order identifier within the storage 54 (FIG. 3) of the device 10.

The screen 650 also includes graphical elements 660, 662, and 664 for entering the order identifier by other methods. Specifically, the graphical element 660 may be selected to enter the order identifier using the camera 46 (FIG. 2). The camera may be used to take a picture of the customer that may be stored as the order identifier. The camera also may be used to take a picture of the customer's credit card, driver's license, or other identifier using techniques similar to those described with respect to FIG. 13. The graphical element 662 may be selected to receive a biometric feature, such as a fingerprint, through the biometric sensor 45 (FIG. 1). The biometric feature may be stored as the order identifier. The graphical element 664 may be selected to enter the order identifier using the scanner 48 (FIG. 2). For example, the scanner 48 may be used to scan a barcode on a driver's license to input the customer's name as the order identifier. The scanner 48 also may be used to scan a barcode located on an article in the sales order to store that barcode as the order identifier.

Figure 32:
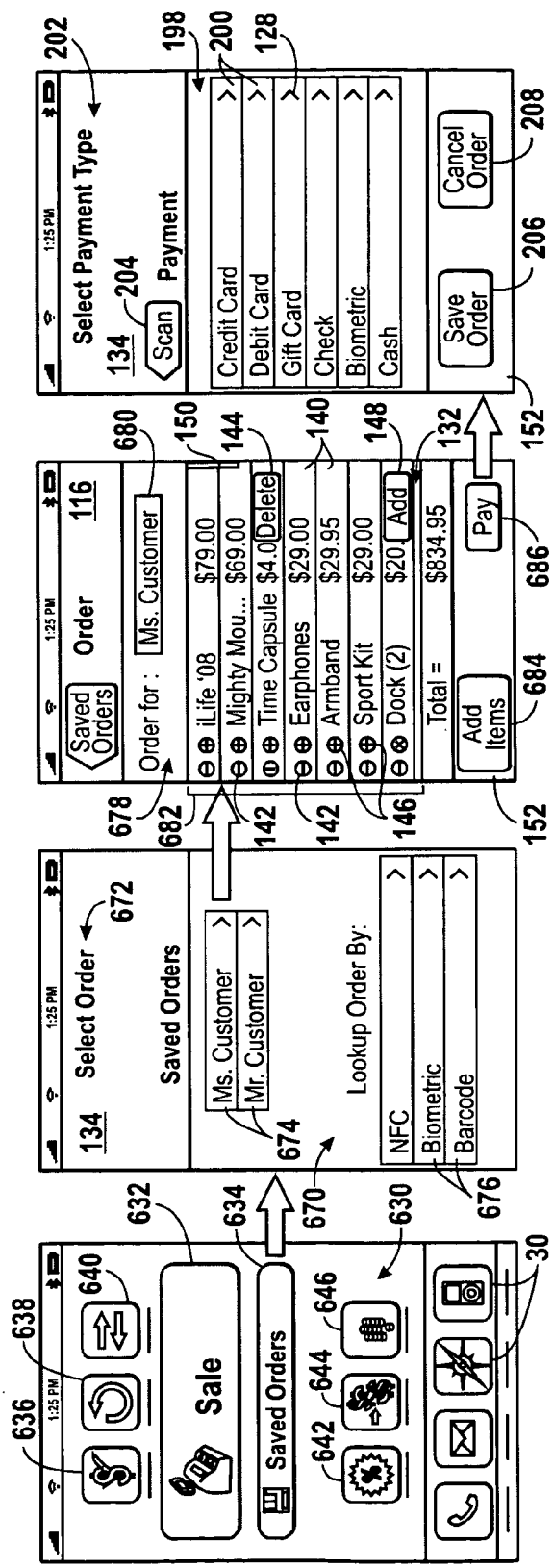
FIG. 32 is a front view of screens of the device of FIG. 30 illustrating a method of retrieving a saved order in accordance with one embodiment.

FIG. 32 illustrates a series of screens for retrieving a saved order. From the home screen 630, the graphical element 634 may be selected to begin the order retrieval process. In response to selection of the graphical element 634, the device may display an order selection screen 670. The screen 670 includes instructions 672 prompting the merchant to select an order for retrieval. The screen 670 may include a selection bar 674 displaying order identifiers for the saved orders. In other embodiments, for example, when the order identifier is a picture of the customer, the screen 670 may display the pictures. The merchant may then select the selection bar 674, picture, or other type of order identifier corresponding to the customer's order.

The screen 670 also includes selection bars 676 for retrieving the order through another input device, such as the NFC device 44 (FIG. 1), the biometric sensor 45 (FIG. 1), or the scanner 46 (FIG. 2). A merchant may select one of the selection bars 676 to retrieve the order using a corresponding input device. For example, selection of the NFC selection bar 676 may allow an order to be retrieved through near field communication by scanning the same NFC enabled device or credit card that was used to input the order identifier. In a similar manner, the biometric selection bar 676 may be selected to retrieve the order by scanning the same biometric feature that was used to input the order identifier. Further, the order may be retrieved by scanning an article or merchandise in the customer's order using the bar code scanner 48 (FIG. 2).

In response to selection of the customer's order, for example, through a selection bar 674 or an input of the corresponding order identifier, the order may be displayed on a screen 678. The screen includes a display area 680 displaying the name of the customer. In other embodiments, other identification information, such as the customer's rewards account number, credit card number, or address, may be used. A window 682 displays the articles in the customer's order. Graphical elements 142, 144, 146, and 148 may be selected to modify the articles in the order. For example, the graphical elements 142 and 144 may be selected to decrease the quantity of an article. The graphical elements 146 and 148 may be selected to increase the quantity of an article. Further, a graphical element 684 may be selected to add additional articles to the order by returning to a scanning mode or other type of article entry mode. In this mode, the NFC device 46 (FIG. 1), the scan device 48 (FIG. 1), the keypad 162 (FIG. 6), or similar input device may be used to add items to the order. If the customer is ready to pay for the order, the merchant may select the pay graphical element 686 to display the payment screen 198. The payment may be entered and processed using the techniques described above with respect to FIGS. 5-19.

Figure 33:
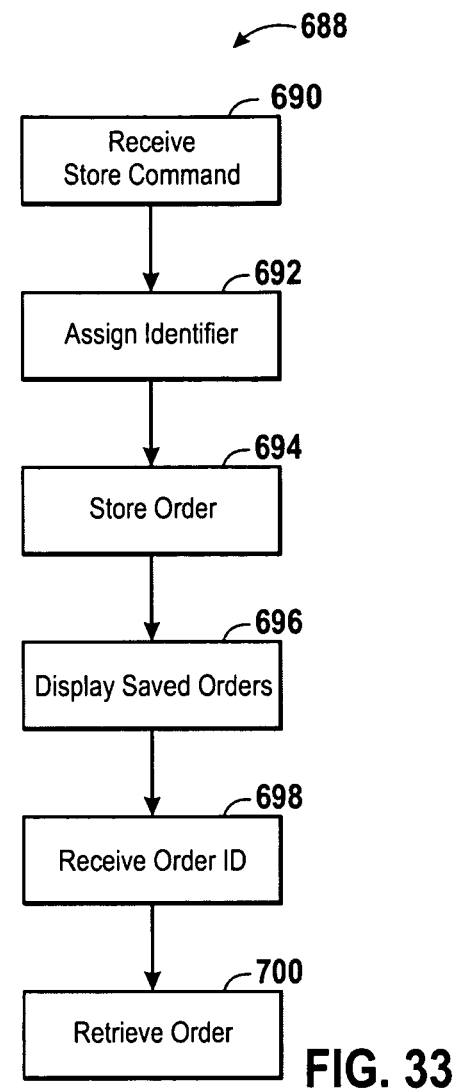
FIG. 33 is a flowchart depicting a method of retrieving a saved order in accordance with one embodiment.

FIG. 33 is a flowchart depicting an exemplary method 688 for saving an order as illustrated in FIG. 32. The method may begin by receiving (block 690) a storage command. For example, the storage command may be received when a user selects the graphical element 206 shown in FIG. 32. The device 10 may then assign (block 692) an identifier to the order. For example, the identifier may be entered using a keypad on the electronic device or the identifier may be entered using near field communication, biometric scanning, or other suitable techniques. The device 10 may then store (block 694) the order and the corresponding order identifier. For example, the orders may be stored within the storage 54 (FIG. 3) of the device 10 until subsequent retrieval. In certain embodiments, the orders may be stored for a designated time period and deleted after expiration of that period, for example after one week.

The method may continue by displaying (block 696) the saved orders. For example, the orders may be displayed in response to selection of the saved orders graphical element 634 shown in FIG. 32. The device 10 may then receive (block 698) an order identifier. The order identifier may be received through one of the communication interfaces of the device or through a keypad on the device. For example, a selection bar corresponding to the order identifier may be selected using a touch screen or the order identifier may be scanned using near field communication. The device 10 may then retrieve (block 700) the order associated with the order identifier. For example, the device 10 may retrieve the order from the storage 54 (FIG. 3) of the electronic device 10. In certain embodiments, the retrieved order may then be displayed on a screen, such as the screen 678 shown in FIG. 32.

Figure 34:
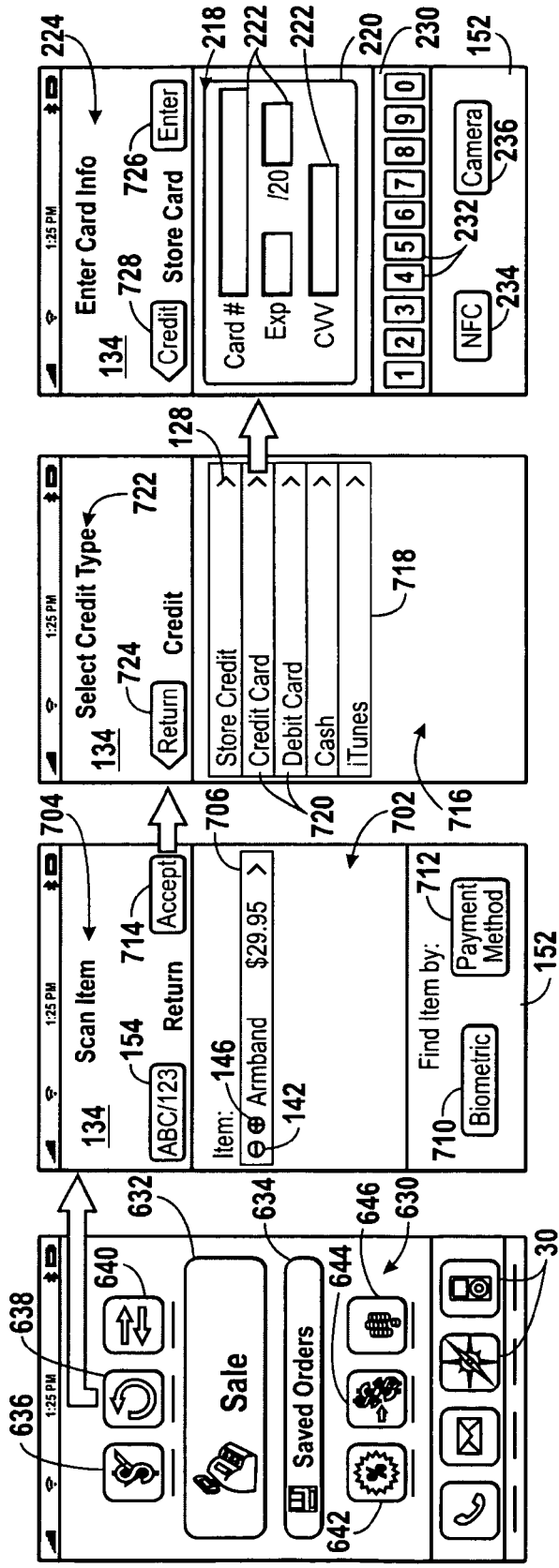
FIG. 34 is a front view of screens of the device of FIG. 30 illustrating a method of processing a return in accordance with one embodiment.

In addition to performing a sales transaction, the device 10 also may perform other sales related transactions such as processing a return, performing an exchange, or executing a price check. FIG. 34 illustrates a method of processing a return. From the home screen 630, the graphical element 638 may be selected to begin the return process and display a return identification screen 702. The screen 702 includes instructions 704 prompting the merchant to scan the article to be returned. The article may be scanned by bringing an NFC tag located on the item in close proximity to the device 10. In another embodiment, the article may be scanned by reading a barcode for the article. The default scanning mode may be configured by the device manufacturer or by a merchant through a settings menu.

A window 706 displays the identification information, such as the name and price, for the scanned article. In certain embodiments, the window may be selected to bring up additional information about the item. Graphical elements 142 and 146 may be used to increase or decrease the quantity of the item scanned. For example, if a customer wishes to return two identical type items, only one of the items may be scanned and then the graphical element 146 may be selected to increase the quantity of the item.

The article to be returned also may be identified using a keypad accessed by selecting the graphical element 154. For example, a merchant may enter the SKU number using the keypad. Of course, other methods of identification, such as biometric features or payment information, may be used to enter the identification information for the article to be returned. For example, the biometric graphical element 710 may be selected to identify the article using a customer's biometric features. Specifically, if a customer paid for the item using her biometric fingerprint, the customer may then input her biometric fingerprint to bring up her recent transactions. The merchant may then select the article to be returned from the articles listed on a transaction summary screen. The item also may be identified through the payment method by selecting the graphical element 712. Selection of the graphical element 712 may display a screen for entering information corresponding to the payment method used to purchase the article. For example, a customer may tap the same NFC based credit card used to purchase the article to the device 10 to bring up her recent orders. The article may then be selected from articles listed on a transaction summary screen.

After the article for return has been entered into the device 10 and displayed in the window 706, the merchant may select the graphical element 714 to continue processing the return. Upon selection of the graphical element 714, a credit screen 716 may be displayed. The screen 716 may include a display window 718 that lists the various types of credit available to the customer. For example, the customer may receive store credit for the article, or the credit amount may be applied to the customer's credit card or debit card. Further, the customer may receive a cash refund or have one of her accounts, such as an iTunes® account credited with the refund amount.

The available credit types may be shown in selection bars 720 within the display window. The credit type may be selected through the corresponding selection bar 720. Instructions 722 prompt the merchant to select the type of credit. The merchant also may return to the previous screen by selecting the graphical element 724. Selection of a selection bar 720 may display screens for processing that type of credit. For example, selection of the credit card selection bar 720 may display the credit card entry screen 218. The screen 218 may be the same screen used to enter credit card information for completing a sales transaction. The title bar 134, however, may include different navigational graphical elements 726 and 728. After the credit card information has been entered, for example, using the keypad 230 (FIG. 10), the NFC device 44 (FIG. 1), the scanner 48 (FIG. 2), the camera 46 (FIG. 2), or the biometric sensor 45 (FIG. 1), the graphical element 726 may be selected to process the return and apply the credit to the displayed credit card. However, if none of the credit types is acceptable to the customer, the graphical element 728 may be selected to return to the credit screen 702.

Methods similar to those shown in FIG. 34 also may be used to perform a price check or an exchange. For example, to perform an exchange, the article to be exchanged may be entered techniques similar to those described for FIG. 34. Then, instead of issuing a credit, the replacement article may entered or scanned using the NFC device 44 (FIG. 1), the scanner 46 (FIG. 1), the camera 48 (FIG. 1), the keypad 230 (FIG. 10), or other techniques described herein. To perform a price check, a screen similar to the screen 702 shown in FIG. 34 may be used to enter article identification information and display the purchase price for the article.

Figure 35:
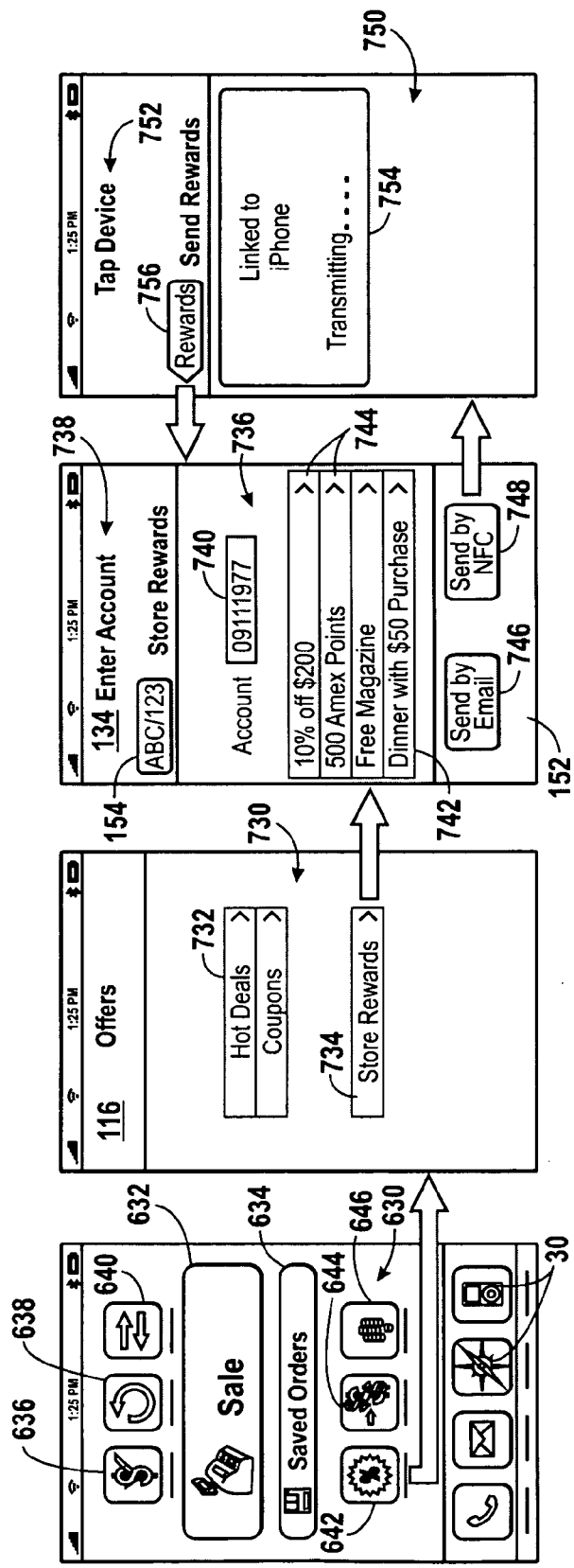
FIG. 35 is a front view of screens of the device of FIG. 30 illustrating a method of transmitting rewards in accordance with one embodiment.

Referring now to FIG. 35, the home screen 630 also may include the graphical element 642 that may be selected to display a screen 730 describing current offers available to customers. The screen 730 may include a window 732 that includes selection bars for displaying hot deals, such as current sales and limited time offers available in the store. The window 732 also may include a selection bar for displaying coupons available for store merchandise. In certain embodiments, the coupons may be e-mailed to the customer upon entry of the customer's e-mail address. Further, the coupons may be transmitted using near field communication or other techniques described herein.

The screen 730 also includes a selection bar 734 for displaying current store rewards. The rewards may be offered by the merchant or by companies partnering with the merchant. In response to selection of the store rewards selection bar 734, a screen 736 may be displayed showing the available rewards. The screen 736 includes instructions 738 prompting the merchant to enter the customer's account number. The account number may be a number generated by the merchant and assigned to the customer when the customer signs up for the merchant's reward program. The account number also may be based on a customer's personal information, such as an e-mail address or driver's license number.

The account number may be entered using a keypad accessible through the graphical element 154. The account number also may be entered using near field communication. For example, the device may be used to scan a customer's NFC enabled credit card, electronic device, or rewards card linked to the customer's rewards account. The account number also may be entered using the bar code scanner 48 (FIG. 2) or the camera 46 (FIG. 2).

The available rewards for the entered account number may be displayed within a window 742. The rewards may include customized rewards generating using information from the customer's account, as well as general rewards available to all customers that are members of the rewards program. For example, customers who are frequent shoppers may receive more valuable rewards than occasional shoppers may. Further, the rewards may be customized based on a customer's previous purchases or spending habits.

The rewards shown within the window 742 may be rewards provided by the merchant or by companies partnering with the merchant. For example, the merchant may offer rewards, such as 10% off a purchase of two hundred dollars, to entice customers to spend more money. A company may offer rewards as a form of advertising. In certain embodiments, the company may pay the merchant to display the company's rewards on the device. In one example, American Express may offer five hundred rewards points to customers paying with their American Express card. Another company may offer a complimentary issue of a magazine to entice a customer to become a subscriber. In yet another example, a customer may be offered a dinner after signing up to receive marketing e-mails from a company. Additional information about each reward may be viewed by selecting individual selection bars 744 that display rewards within the display window 742.

The rewards also may be transmitted to a customer's electronic device to allow a customer to review the rewards at her leisure. For example, the rewards may be sent to the customers e-mail by selecting a graphical element 746. In response to selection of the graphical element 746, the device 10 may transmit the reward information to an e-mail address associated with the account number show in the display window 740. The reward information also may be sent to a customer's NFC enabled electronic device by selecting a graphical element 748. The graphical element 748, in response to selection, may display a NFC screen 750. The screen 750 may include instructions 752-prompting the customer to tap her NFC enabled device to the electronic device 10 to establish a near field communication link. A display window 744 may indicate that a NFC link has been established and that the rewards information is being transmitted. The screen 750 also includes a graphical element 756 that may be selected to cancel the transmission and return to the rewards screen 736.

Of course, the rewards may be transmitted to the customer in a variety of methods in addition to e-mail and near field communication. For example, the device may transmit a signal over one of the communication paths (FIGS. 22-24) to an electronic device at a customer service center to print the rewards for pickup by the customer. Rewards that are discounts (for example, 10% off) may be stored within the device 10 until the customer is ready to check out. Upon checkout, the rewards may be automatically applied to the customer's purchase price.

Figure 36:
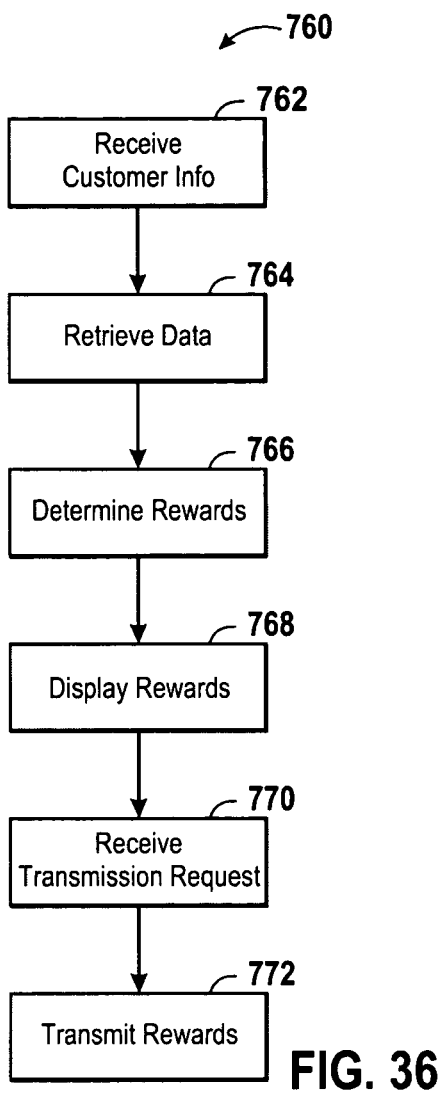
FIG. 36 is a flowchart depicting a method of transmitting rewards in accordance with one embodiment.

FIG. 36 is a flowchart depicting an exemplary method 760 for transmitting rewards to a customer as illustrated in FIG. 35. The method may begin by receiving customer information (block 762). For example, the customer information may include a customer's account number for the rewards program. The device 10 may then retrieve (block 764) data based on the customer information. The data may represent the customer's spending habits, for example, the average purchase price over the past year and the number of purchases made recently. The data also may include the specific items or types of items purchased recently. For example, if the merchant is a department store, the data may include the number of purchases made in the electronics department and the home furnishings department. In certain embodiments, the data may be obtained from the external server 96 over one of the communication paths (FIGS. 22-24).

Based on the data, the device may determine (block 766) the rewards available to the customer. Of course, the determination also may be performed by the external server 96. In these embodiments, the server 96 may transmit the available rewards to the device 10. Once the rewards have been determined, the device may display (block 768) the rewards. For example, the rewards may be displayed on the screen of the device 10. The device 10 may then receive (block 770) a transmission request. The transmission request may occur automatically in response to entry of the customer's account number, or a transmission request may occur in response to selection of a graphical element. For example, the merchant may select the transmission method, such as NFC, which serves as the transmission request. In response to the transmission request, the device 10 may transmit (block 772) the reward information to the customer. As noted above, the rewards may be transmitted using a variety of methods such as using the customer's e-mail address or near field communication.

Figure 37:
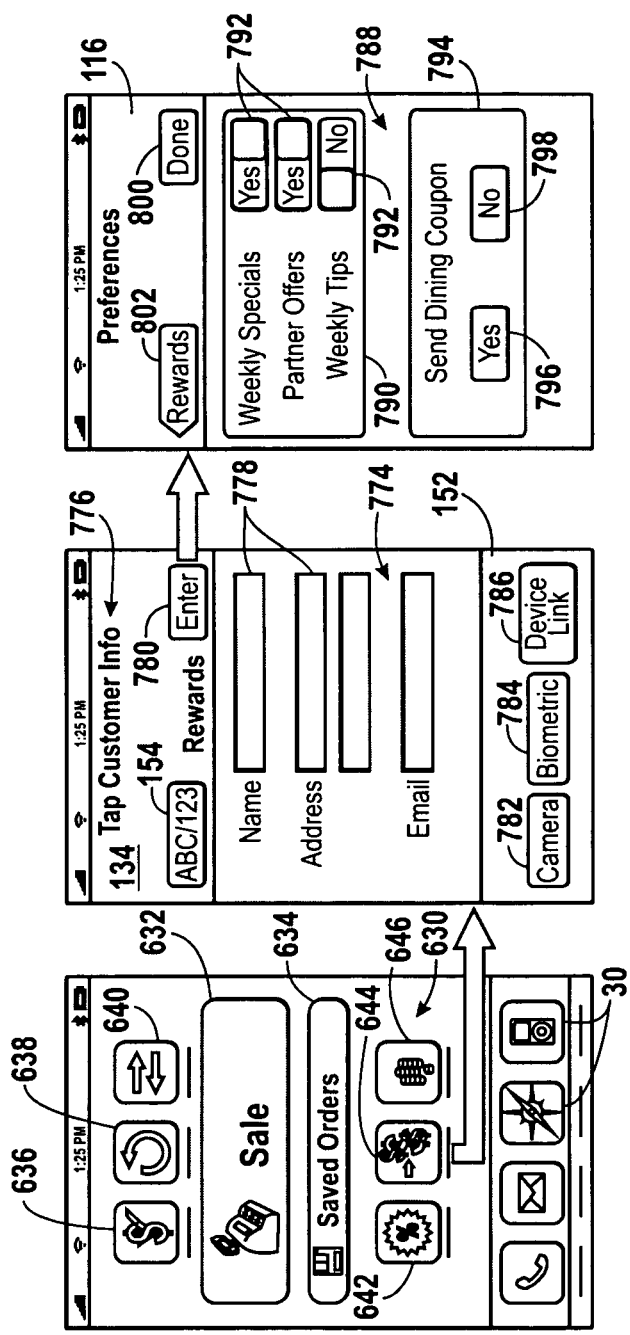
FIG. 37 is a front view of screens of the device of FIG. 30 illustrating a method of transmitting rewards in accordance with one embodiment.

The POP device 10 also may be used to enroll customers in a rewards program. As shown in FIG. 37, selection of the rewards graphical element 644 may display a rewards sign up screen 774. The screen 774 includes instructions 776 prompting the merchant to enter the customer's information. The customer's information may be entered by tapping a customer's NFC enabled device, such as an electronic device or a smart card, to the device 10. The customer's information may then be received through near field communication and displayed within the windows 778. Of course, a keypad also may be used to enter the customer's information by selecting the graphical element 154.

The lower summary bar 152 includes graphical elements 782, 784, and 786 for entering the customer's information using the camera 48 (FIG. 2), the scanner 48 (FIG. 2) and a device link, respectively. The graphical element 782 may be selected to display screens for using the camera to capture the customer's information. For example, the camera may operate in conjunction with image processing software to obtain the information from a picture of the customer's driver's license or credit card.

The customer's information also may be entered using biometric features by selecting the graphical element 784. For example, a customer may place his finger on the biometric sensor 45 (FIG. 30) to enter his information. The customer's information also may be entered using a device identification protocol by selecting the graphical element 786 to establish a device link as described below with respect to FIGS. 39 and 40.

After the customer's information has been entered, the merchant may select the graphical element 780 to enter the information and display a screen 788 for configuring the customer's reward preferences. The screen 788 includes a display window 790 that shows preferences that may be selected using slide bars 792. The slide bars 792 may be actuated between the yes and no positions using the touch screen to select or deselect each of the options listed. For example, as configured, the customer may receive weekly specials and partner offers thorough e-mail. However, the customer has chosen not to receive weekly tips. Of course, additional preferences may be displayed and configured based on the merchant's individual needs.

A merchant also may offer a customer a reward for enrolling in the rewards program. These rewards may be shown in a display window 794. For example, in this embodiment, the merchant has chosen to send the customer a dining coupon. In certain embodiments, the window 794 may be selected to display additional information describing the reward. The window 794 includes graphical elements 796 and 798 for accepting or rejecting reward. The graphical element 796 may be selected to accept the reward. In response to selection of the graphical element 796, the device may transmit the dining coupon to the customer's e-mail account. The graphical element 798 may be selected to reject the reward. After the preferences have been selected, a merchant may select the graphical element 800 to exit the preferences screen 788 and return to the home screen 630.

Figure 38:
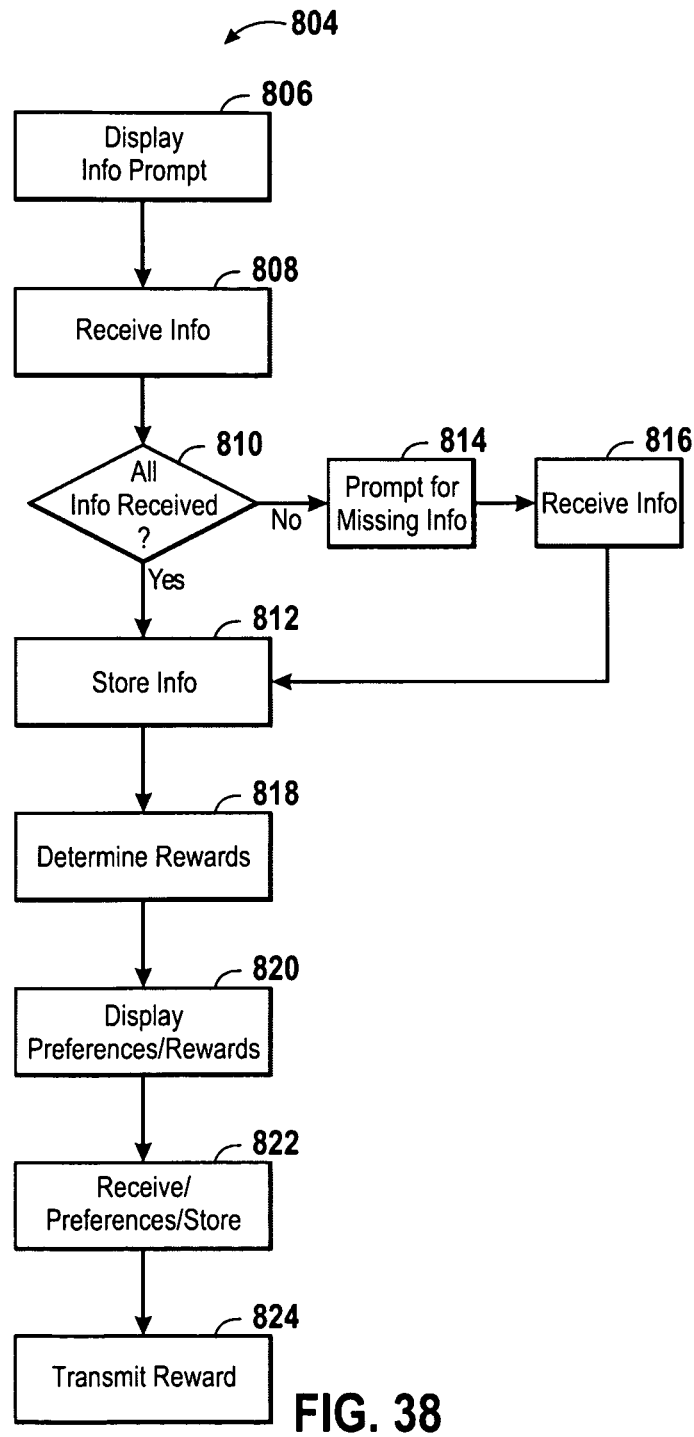
FIG. 38 is a flowchart depicting a method of transmitting rewards in accordance with one embodiment.

FIG. 38 is a flowchart depicting an exemplary method 804 for setting preferences for a customer's reward account as illustrated in FIG. 37. The method may begin by displaying (block 806) an information prompt. For example, the information prompt may be displayed in response to selection of the rewards graphical element 644 shown in FIG. 37. The prompt may request entry of information through near field communication, through the scanner, or through another default input device, such as the camera. The device 10 may then receive (block 808) the customer's information through the default input or through another input selected using the graphical elements. The customer's information may include the customer's name, mailing address, e-mail address, telephone number, and/or other similar information.

The device 10 may then determine whether all of the information has been received (block 810). Of course, certain types of information, such as a mobile phone number, may be optional. In these situations, the device 10 may be configured only to verify that the required information has been received. If all the information has been received, the device may store (block 812) the information. However, if not all of the information has been received, the device 10 may prompt (block 814) the merchant for the missing information. For example, the prompt may be displayed within a display window notifying the merchant of the type of information that is missing. After receiving (block 816) the information, the device may store the information (block 812).

The information may then be used to determine (block 818) the available rewards. For example, in certain embodiments, the rewards may be determined based on the customer's spending habits, types of purchases, and proximity to the store location. In other embodiments, the rewards may be determined based on the number of rewards available to the merchant for that week. For example, a merchant may offer a different type of reward each week and may only offer a limited number of certain rewards.

The device 10 may then display (block 820) the preferences and rewards. The preferences may be related to the customer's preferred communication method, types of communications, and frequency of communications. The device may then receive and store the customer's preferences (block 822). In certain embodiments, the preferences may be transmitted to an external device, such as the server 96 for storage. The device 10 may then transmit (block 824) the reward to the customer. For example, the reward may be automatically transmitted to the customers e-mail upon completion of the rewards enrollment process.

Figure 39:
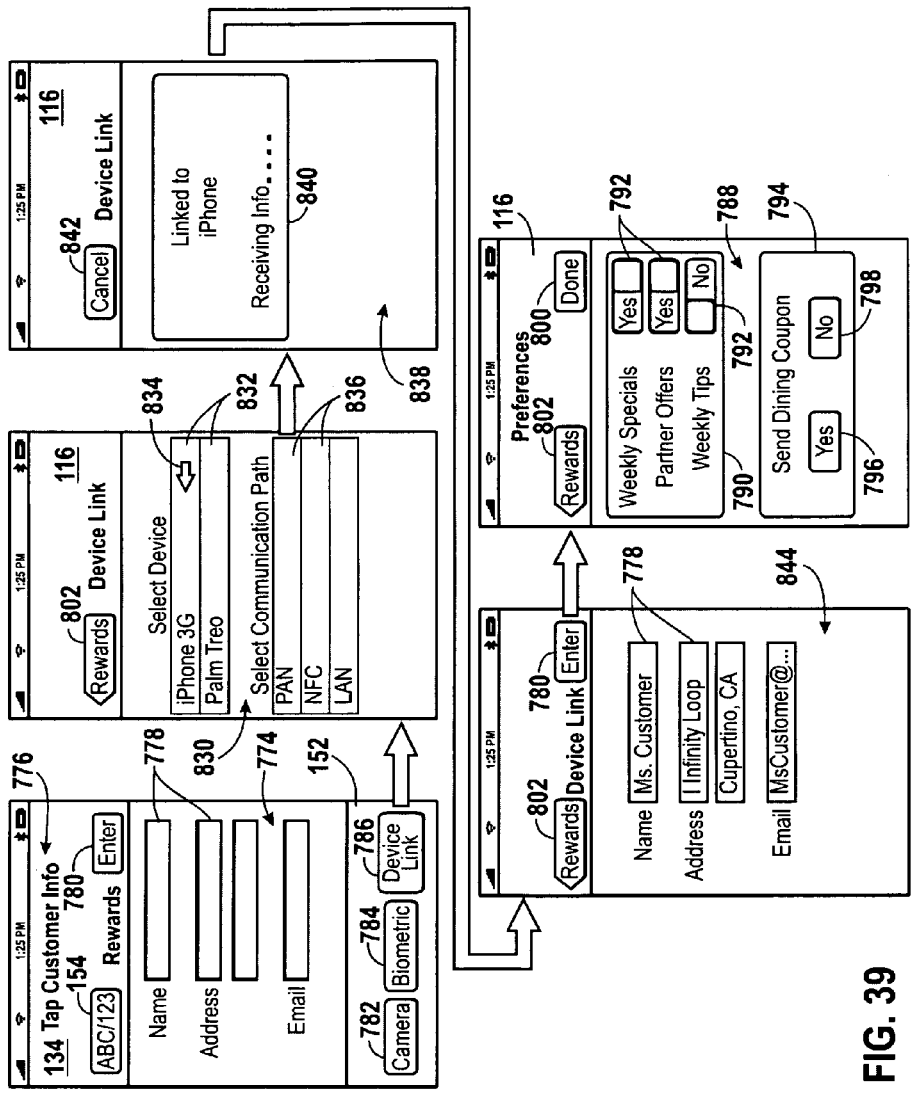
FIG. 39 is a front view of screens of the device of FIG. 30 illustrating a method of linking devices in accordance with one embodiment.

FIG. 39 illustrates a series of screens for receiving customer information using a device link. The device link may be accessed by selecting the graphical element 786 from the rewards screen 774. Although the device link is shown in the rewards context, the device link may be used to establish communication links in any of the applications discussed herein. The device link may employ a device identification networking protocol, such as Bonjour® by Apple Inc., installed on the POP device 10 and another external device. The protocols may allow each device to broadcast their identification information using internet protocol (IP). The devices may open a peer-to-peer connection between the devices using the broadcasted identification information.

In response to selection of the device link graphical element 786, a device link screen 830 may be displayed. The screen 830 includes selection bars 832 that display detected devices available for communication. These devices may be identified based on broadcasted identification information. Above the selection boxes 832 is an instruction prompting the merchant to select a device for connection. An indication 834 shows the currently selected device, in this case an iPhone® 3G.

The screen 830 also includes selection bars 836 showing the types of communication paths available between the electronic devices. In certain embodiments, the communication paths that are unavailable for selection may be grayed out or not displayed within the selection bars 836. Instructions, located above the selection boxes 836, prompt the merchant to select a communication path. Selection of a selection box 836 may automatically connect the two devices through the displayed communication path. As shown, the PAN communication selection box 836 has been selected to connect the devices over a personal area network.

The device may also display a status screen 838 upon selection of a communication path. The screen 838 includes a display window 840 indicating the status of the device link that includes identifying the external device connected to the device 10 as well as the transmission status. As shown, the display window 840 indicates that the device 10 is linked to an iPhone®. The display window 840 also indicates that the electronic device 10 is currently receiving information, such as customer information, from the iPhone®.

After the information has been received, the information may be displayed on a screen 844 within the display areas 778. In certain embodiments, the information shown with the display areas 778 may be edited by selecting these areas. For example, selection of an area 778 may bring up a keypad for editing the information. Once the information is correct, the merchant may select the graphical element 780 to enter the information and display the preferences screen 778. As described previously with respect to FIG. 37, the customer may then select the preferences shown in the display area 790. The customer also may receive a reward shown in display window 794 in appreciation for signing up for the rewards program. The merchant also may cancel the signup process by selecting the graphical element 802 to exit the device link mode and return to the rewards screen.

Figure 40:
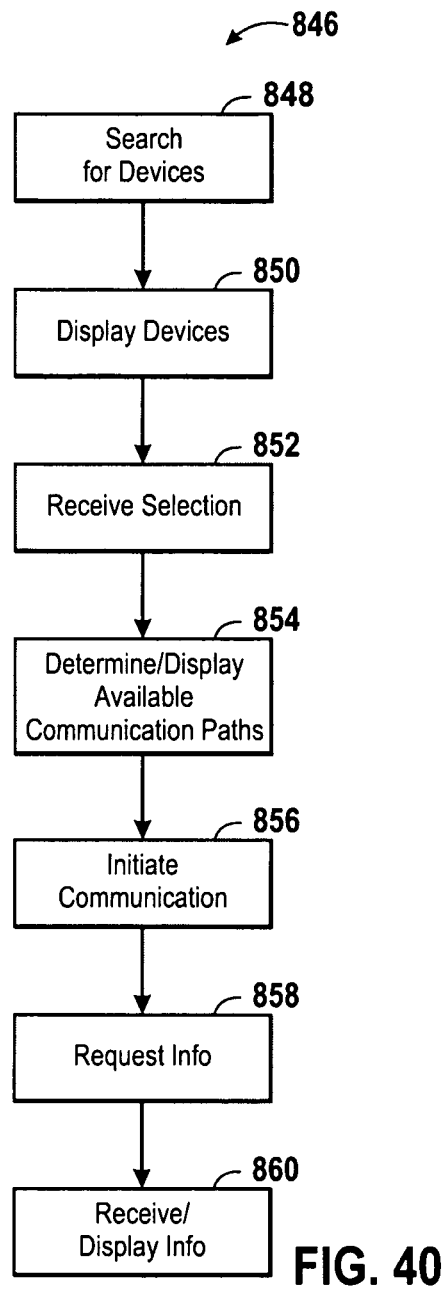
FIG. 40 is a flowchart depicting a method of linking devices in accordance with one embodiment.
Figure 41:
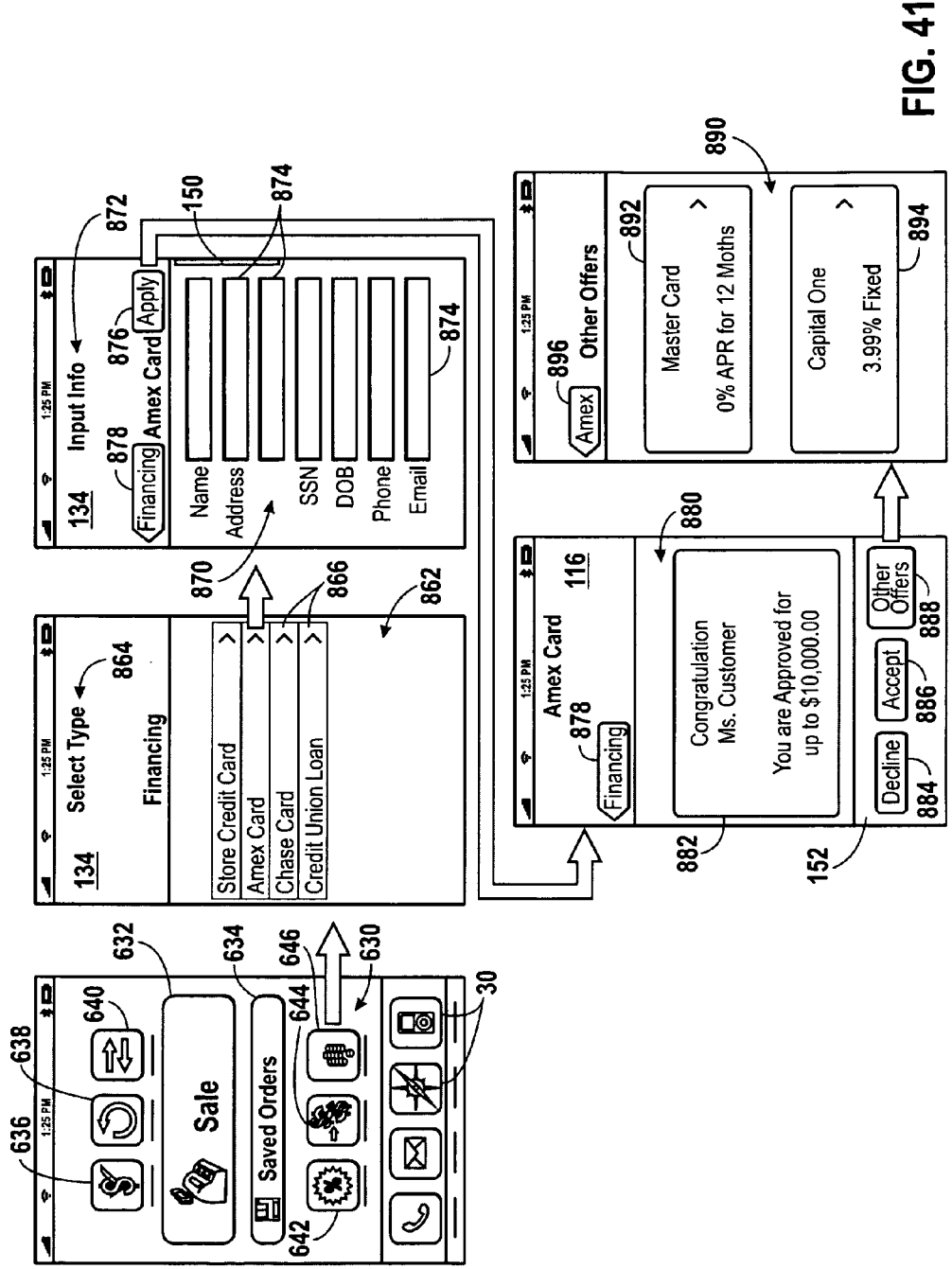
FIG. 41 is a front view of screens of the device of FIG. 30 illustrating a method of determining financing in accordance with one embodiment.

FIG. 40 is a flowchart depicting an exemplary method 846 for establishing a device link as illustrated in FIG. 39. The method may begin by searching (block 848) for devices. The searching may occur in response to selection of the device link graphical element 786 shown FIG. 39. In other embodiments, the searching may occur automatically when the device needs to receive information. For example, when the device needs to acquire payment information, the device may automatically begin searching for devices. The searching may occur using a device identification network protocol stored within the device 10. The searching also may include broadcasting the device's own identification information and searching for other devices broadcasting their own identification information using internet protocol.

After devices have been identified, the device 10 may display (block 850) the available devices. In certain embodiments, a list of available devices, indicating their type, model number, or other identification information, may be displayed on a screen of the device 10. In other embodiments, the device 10 may display a master list of devices and indicating which devices are available from the list using shading or other indicators. The device 10 may then receive (block 852) a selection indicating a device with which to establish a connection. For example, the device may receive a user selection of one of the selection bars 832 shown in FIG. 39. The device 10 may then determine and display (block 854) available communication paths between the POP device 10 and the selected external device. The communication path may be determined based on service information received from the external device. For example, the external device may broadcast the applications that it uses. The device 10 may then determine which applications are compatible for establishing a communication path. The communication path may be established through one of the communications interfaces shown in FIG. 3, such as the PAN interface 64, the NFC interface 60, the LAN interface 66, the WAN interface 68, or other suitable interface.

The method may then continue by initiating (block 856) communication with the selected device. Once communication has been established, the device 10 may request (block 858) information. For example, the information may include customer identification, such as a customer's name and address, for enrolling the customer in a rewards program. In another example, the information may include payment information, such as a credit card account number and expiration date. The device may then receive (block 860) the information over the selected communication path and may display the information to allow a customer or merchant to verify that the accuracy of the information.

The POP device 10 also may be used to enroll a customer in a financing program. For example, the POP device may be used to apply for a store's credit card or to apply for a loan from a bank or other financial institution. The financing application process may begin with selection of the financing graphical element 646, shown on the screen 630 in FIG. 41. In response to selection of the graphical element 646, a financing screen 862 may be displayed. The screen 862 includes instructions 864 prompting the merchant to select the desired type of financing. Selection boxes 866 display the available types of financing. The financing types may include a store credit card, commercially available credit cards, a credit union, and a bank loan, among others. In certain embodiments, the merchant may receive a percentage of the loan amount from the financing established with a bank or financial institution. For example, if the merchant is a car dealer, the car dealership may have an agreement with a bank to provide automobile loans. The car dealer may receive compensation for enrolling customers in the bank's loan program.

In response to selection of a type of financing, a financing information screen 870 may be displayed that requests entry of information needed to apply for the selected type of financing. The screen 870 includes instructions 872 prompting the merchant to input the necessary information. The information may be input using a variety of methods including, but not limited to, using a keypad, transmitting the information through near field communication, or scanning a barcode containing the information using a scanner. Upon entry, the information may be displayed within the display area 874. If the information is correct, the merchant may select a graphical element 876 to apply for that type of financing. However, if the customer would like to select a different type of financing, the merchant may select a graphical element 878 to return to the financing screen 862.

In response to selection of the graphical element 876, a status screen 880 may be displayed. The screen 880 includes a display window 882 that indicates the status of the application process. The display window may show whether the application has been approved or rejected, the credit line amount, and other applicable information. Graphical elements 884 and 886 allow a customer to accept or decline the credit offer. Further, the customer may choose to see other available offers by selecting a graphical element 888. The other offers may be determined based on the customer's entered information. For example, the other offers screen 890 may include offers for a MasterCard or Capital One credit card that have interest rates and terms corresponding to a customer's income level and occupation. Display windows 892 and 894, included on screen 890, show information describing the other available offers. The information may include the interest rate, credit amount, and the name of the issuing financial institution, among other things. Additional details for the other available offers may be viewed by selecting the corresponding display window.

Figure 42:
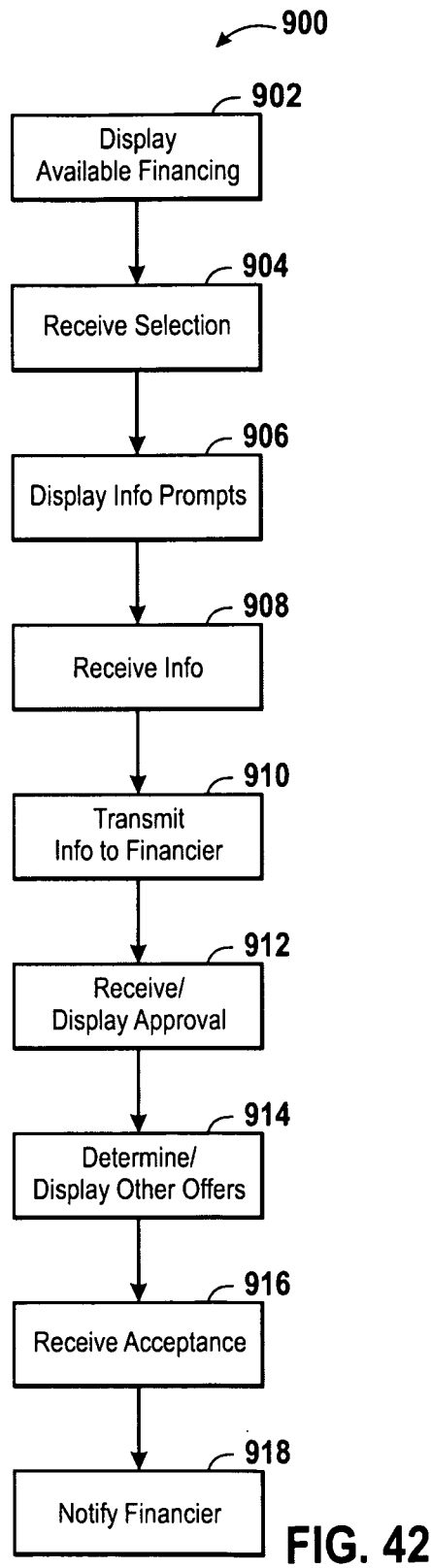
FIG. 42 is a flowchart depicting a method of determining financing in accordance with one embodiment.

FIG. 42 is a flowchart depicting an exemplary method 900 for applying for customer financing. The method may begin by displaying (block 902) available financing options. The available financing options may be determined based on the credit card companies, banks, credit unions, and other financial institutions that have financing agreements with the merchant. In certain embodiments, the merchant may receive a fee for singing the customers up for a financial institution's financing.

After displaying the financing options, the device may receive (block 904) a selection indicating the financing type. Each financing type may have a corresponding screen, or series of screens, stored within the device 10 or within an external device such as the server 96. The screens may display prompts requesting the information required to apply for financing. For example, the requested information may include the customer's name, address, and social security number, as well as the customer's amount of income and debt.

Upon receiving (block 908) the information, the device may transmit the information to the financial institution or financier (block 910). In certain embodiments, the information may be transmitted to an external device, such as the server 96, for subsequent transmission to the financier. However, in other embodiments, the information may be transmitted directly to the financier, over the Internet, for example. The financier may then perform a credit check or other verification processes to approve the customer for financing.

In response to receiving an approval (block 912), the device 10 may display an approval message. The device 10 may then determine and display (block 914) other offers. For example, the device 10 may use the customer's information that was provided to apply for financing to determine other offers that may be available to the customer. The customer may then accept the selected financing offer or the other displayed financing offers. After the device receives acceptance of a credit offer (block 916), the device may notify (block 918) the financier. The device also may store the financing information, particularly the amount of credit, for reference during the purchase process.

Figure 43:
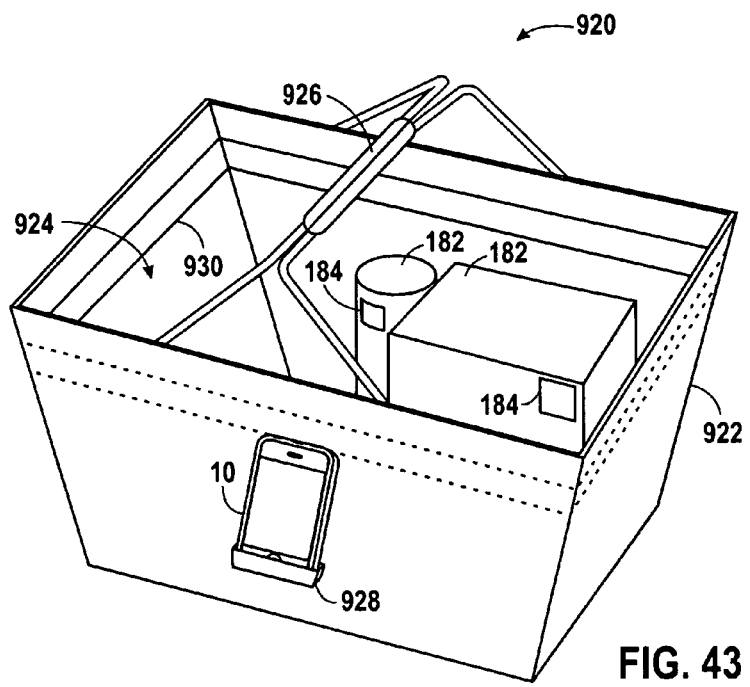
FIG. 43 is a perspective view of a POP device incorporating the electronic device of FIG. 1.

FIG. 43 illustrates a system 920 that may be used to conduct a sales transaction. The system 920 may allow a customer to scan articles and pay for the articles without the assistance of a salesperson. The system 920 also may operate in conjunction with the merchant's security system to impede the removal of unpurchased articles from the store. For example, the articles may include security tags that can be deactivated after payment to prevent an alarm from sounding when the articles are removed from the store.

The system 920 includes a container 922 that may be connected with the POP device 10. The container may be constructed of plastic, fabric, metal, or other suitable material, and may be used to hold articles of merchandise 182. The container 922 includes an inner volume 924 in which the articles 182 may be placed. Handles 926 may extend from the container 922 to facilitate portability. The container 922 includes a receptacle 928 for receiving the device 10. The receptacle may include a base that includes a connection port, such as a serial connection for connecting to an I/O port, such as the I/O port 34 (FIG. 2) of the device 10. The POP device 10 may be inserted into the receptacle 928 to connect the POP device 10 to the container 922. The receptacle 928 also may provide support for the device 10 when the device 10 is attached to the container 922.

The container 922 also includes an integrated NFC device 930. The NFC device 930 may include a narrow strip of NFC receivers disposed around the upper perimeter of the container 922. Wires, or a wireless network, may connect the NFC device 930 to the receptacle 928. The NFC device 930 may read information from the NFC tags 184 and transmit the information to the POP device 10 through the receptacle 928. In certain embodiments, the communication may be received through the NFC interface 60 of the POP device 10. The NFC device 930 also may write information to the NFC tags 184 to deactivate security features of the tags 184. Of course, the location and number of the NFC devices may vary.

In operation, the NFC device 930 may acquire identification information from the NFC tags 184 located on the articles 182 as the articles 182 are placed within the container 922. In certain embodiments, the NFC device 930 may include a memory for storing the identification information for the articles. The identification information may then be transmitted to the POP device 10 after the articles 182 have been placed within the container 922. However, in other embodiments, the NFC device 930 may directly transmit the information to the device 10 through the receptacle 928. In these embodiments, identification information may be transmitted when each article 182 is placed within the container 922. Regardless of when the identification information is transmitted, the system 920 allows articles 184 to be scanned as they are placed into the container 922.

As shown, the system 920 allows the device 10 to be removed from the container 922. The separate device 10 and container 922 may provide shopping flexibility by allowing a merchant to give the POP device 10 to a salesperson to perform the scanning or to connect the POP device 10 to the container 922 so that a customer may scan the articles by placing the articles into the container 922. The containers 922 may be an auxiliary item that a merchant may purchase to expand an existing sales transaction structure employing one or more POP devices 10. A salesperson also may remove the POP device 10 to perform handheld scanning if a customer is having difficulty operating the container 922 and POP device 10. Of course, the POP device 10 also may be integrated into the container 922. For example, the components of the POP device 10 may be built into the container walls.

Figure 44:
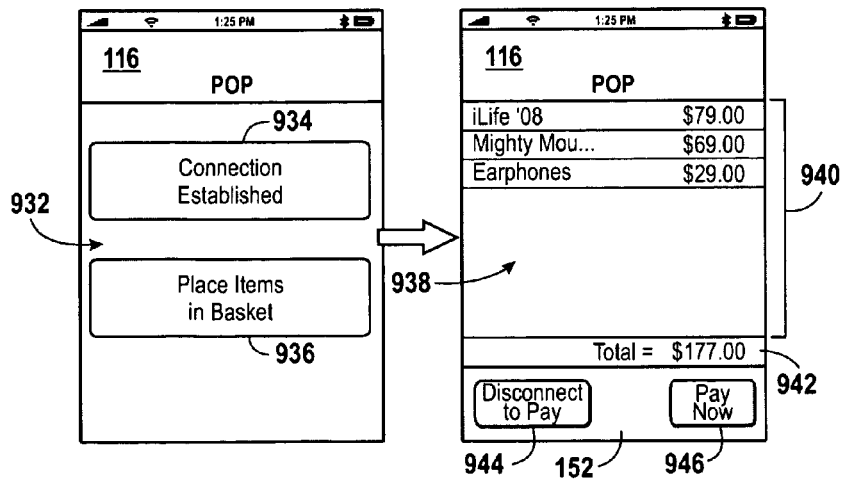
FIG. 44 is a front view of screens of the electronic device of FIG. 43 in accordance with one embodiment.

FIG. 44 illustrates screens that may appear on the device 10 while connected to the container 922 shown in FIG. 43. To begin a sales transaction, the device 10 may be inserted into the receptacle 928 to display the connection screen 932. The screen 932 includes a window 934 notifying a customer or merchant that a connection has been established. The screen 932 also includes a window 936 prompting the customer to place items into the basket or container. In response to detecting placement of articles 182 within the container 922, the device 10 may display an order summary screen 938. The screen 938 includes a display window 940 that may display information about the scanned articles. The display window 940 may include several selectable areas showing the name of the article, its price, and other descriptive information. An area for an article may be selected to show additional information about the article, such as the article serial number and product description. The screen 938 also includes a summary bar 942 that displays the current total purchase price for the articles that have been scanned.

After placing the articles within the container 922, the customer may select a payment option using the graphical elements 944 and 946. To transmit payment information while the device 10 is disconnected from the container 922, the customer may select the graphical element 944. Payment while the device 10 is disconnected may facilitate scanning of payment information using the camera 46 (FIG. 2), the scanner 48 (FIG. 2), or the biometric sensor 45 (FIG. 1). Disconnection of the device 10 also may facilitate manual entry of payment information using a keypad of the device 10. The customer also may pay while the device 10 is connected to the container 922 by selecting the graphical element 946. Near field communication based payment may be particularly well suited to payment while the device 10 is connected to the container 922. For example, a customer may tap an NFC enabled card or device to the POP device 10 while the device is located within the receptacle 928 (FIG. 43). Of course, NFC based payment also may occur while the device 10 is disconnected from the container 922.

Figure 45:
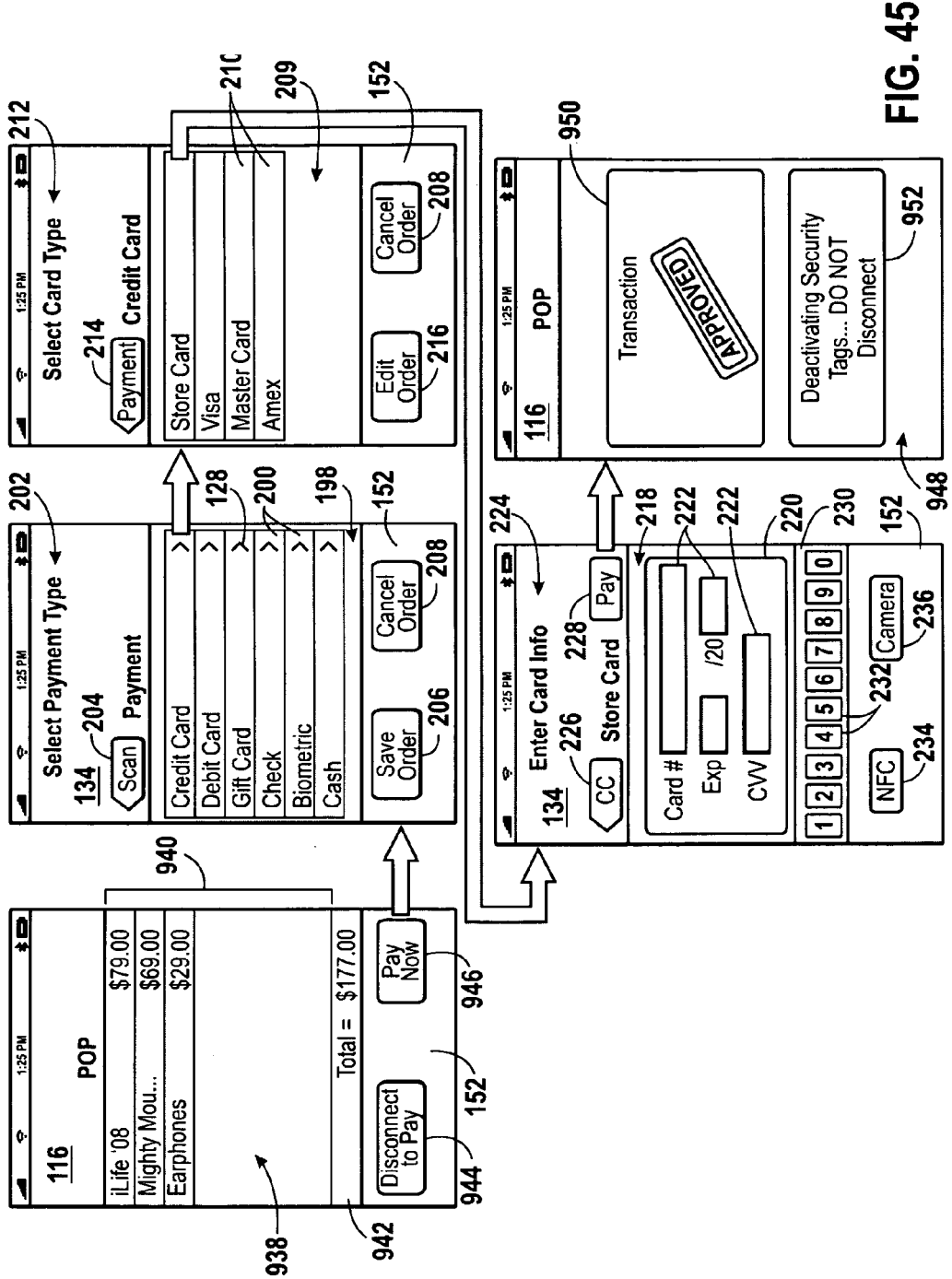
FIG. 45 is a front view of screens of the device of FIG. 43 illustrating a method of receiving payment in accordance with one embodiment.

FIG. 45 illustrates processing of a payment while the device 10 is connected to the container 922, as shown in FIG. 43. To begin the payment process, a customer may select the graphical element 946 included on the summary screen 938 to display the payment screen 198. The payment screen 198 includes the selection bars 200 for selecting a payment method as described above with respect to FIG. 10. The instructions 202 prompt the user to select a type of payment method. The customer may select one of the selection bars 200 to pay using the corresponding payment method as previously described with respect to FIGS. 6-19. For example, the customer may select the credit card selection button 200 to display the credit card payment screen 209.

After selecting a card type, the card entry screen 218 may be displayed with instructions 224 prompting the user to enter the card information. As described previously with respect to FIGS. 6-19, the card information may be entered using the keypad 162 (FIG. 6), the near field communication device 44 (FIG. 2), the camera 46 (FIG. 2), the scanner 48 (FIG. 2), or other techniques described herein. After the payment information has been entered, the user may select the graphical element 228 to transmit the information for approval. Once the transaction has been approved, the approval may be displayed on the transaction summary screen 948 within a window 950.

The screen 948 also includes a window 952 that displays a message indicating that the device is currently deactivating the security tags. The window 952 instructs the user not to disconnect the device 10. During this process, the device 10 may send write signals to the NFC device 930 of the container 922. The NFC device 930 may then transmit these signals to the NFC tags 184 located on the articles 182 to deactivate the NFC tags. For example, the tags may be encrypted with security information that when activated works in conjunction with the store's security system to sound an alarm if the tags are removed from the store without being deactivated. After the tags have been deactivated, the customer may package the purchased articles and remove them from the store.

A similar process may be used to process a payment while the device 10 is disconnected from the container 922. The same screens shown in FIG. 45 may also appear when the device 10 is receiving payment information while disconnected. However, the screens may include additional window or prompts instructing the customer to connect the device 10 to the container 922 to allow deactivation of the security features.

Figure 46:
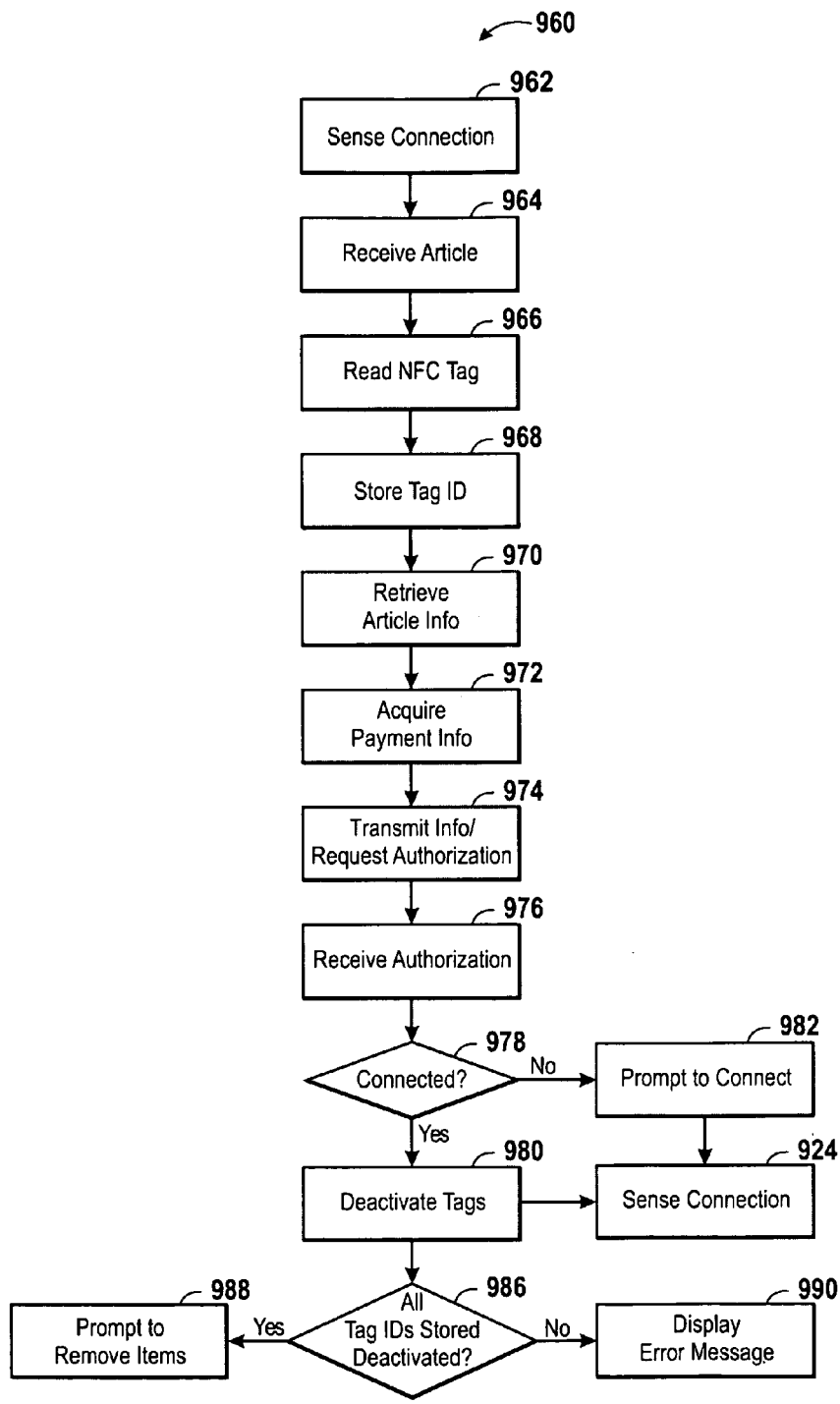
FIG. 46 is a flowchart depicting a method of conducting a sales transaction in accordance with one embodiment.

FIG. 46 is a flowchart depicting an exemplary method 960 for performing a sales transaction using the system 920 shown in FIG. 43. The method may begin when the device 10 senses (block 962) connection to the container 922. The system 920 may then receive (block 964) one or more articles, such as the articles 184 shown in FIG. 43. For example, the articles may be received when a customer places them within the container 922.

The NFC device 930 may then read (block 966) the NFC tags located on the articles to retrieve the tag information. The tag information may include an identification number or code that may be used to identify the article and obtain the article identification information, such as the article serial number and purchase price. In other embodiments, the tag information may include the article identification information. The tag information may then be stored (block 968) within the NFC device 930 or within the device 10. For example, the information may be stored within a memory of the NFC device 930. In another example, the device 930 may transmit the identification information to the device 10 where it may be stored within the storage 54 (FIG. 3). The device 10 may then retrieve (block 970) article information associated with the tag identification information. For example, the device 10 may transmit the tag identification information to an external server, such as server 96 (FIG. 4) using the communication interface 56 (FIG. 3) to obtain the price information for the article. In other embodiments, the article identification information may be included within the tag information. In these embodiments, the identification information may be retrieved or extracted from the stored tag information. As noted above, the device 10 may use the identification information to calculate a purchase price for the articles.

The method may continue by acquiring (block 972) payment information. For example, the device 10 may acquire a customer's credit card information using near field communication. In other embodiments, the payment information may be received through the keypad, the camera, the scanner, or other suitable means. The device 10 may then transmit (block 974) the payment information and request authorization. For example, the information may be transmitted to the financial institutions 98 and 100 shown in FIG. 4 using the external server 96. The device 10 may then receive (block 976) authorization for payment. The authorization may be received over one of the communication paths shown in FIGS. 22-24.

After receiving the authorization, the device 10 may then determine whether it is connected to the container 922 (block 978). If the device is connected, the device 10 may deactivate (block 980) the NFC tags located on the articles. For example, the device 10 may transmit a signal to the NFC tags, either directly or through the NFC device 930, to deactivate security features included on the tags. If connection is not detected, the device 10 may prompt a user (block 982) to connect the device 10 the container 922. Upon sensing (block 924) the connection, the device 10 may deactivate the tags (block 980).

After deactivation, the device 10 may determine whether all of the tags that have been stored have been deactivated (block 986). For example, the device 10 may transmit a signal to all of the tags in the container 922 to determine each tag's activation status. The device 10 may then determine whether a deactivated status has been received for each tag stored in the device 10 or in the NFC device 930. If all of the tags have been deactivated, the device 10 may prompt (block 988) the user to remove the items from the basket. For example, the customer may place the articles 184 within the customer's personal shopping bag or within bags provided by the merchant to remove the articles from the store. If a tag that has been stored does not have a deactivated status, the device 10 may display an error message (block 990). The error message may prompt the customer to contact a salesperson to address the problem with the deactivation process.

Figure 47:
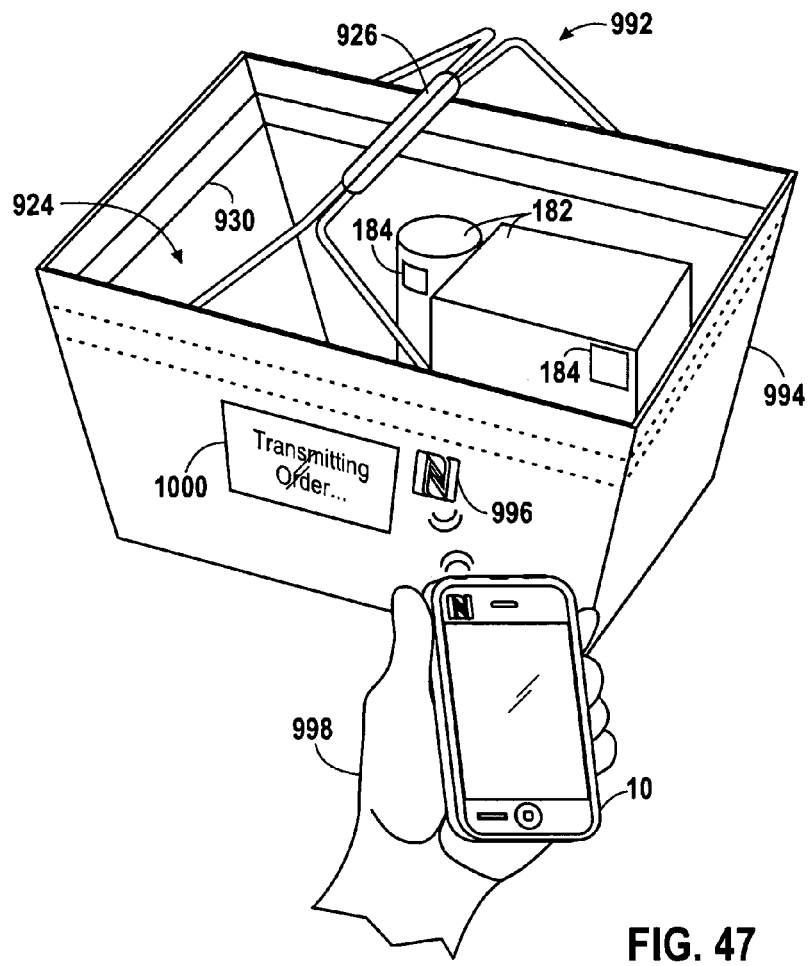
FIG. 47 is a perspective view of another POP device incorporating the electronic device of FIG. 1 in accordance with one embodiment.

FIG. 47 illustrates another system 992 that may be used to conduct a sales transaction using the POP device 10. In this system, either a customer or a merchant may operate the POP device 10. The system 992 includes a container 994 that may be used to hold the articles 182. The container may be constructed of plastic, rubber, metal, or other suitable material and may be used to store the articles within the inner volume 924. The container 994 includes the NFC device 930 that may be used to read the NFC tags 184 located on the articles 182 as the articles 182 are placed within the container 994. The container 994 also includes an NFC transmission area 996 for establishing a near field communication link with the POP device 10. The NFC transmission area 996 may identify the location of the NFC device 930 on the container 994. A user 998 may bring the device 10 within close proximity to the NFC transmission area 996 to establish a near field communication link between the device 10 and the NFC device 930. In certain embodiments, multiple NFC transmission areas 996 may be identified on the container 992 in close proximity to the NFC device 930.

The container 994 also includes a display screen 1000 that may display notifications indicating the status of the sales transaction. For example, the display screen 1000 may be used to a notification indicating that a near field communication link has been established and indicating that the container 992 is transmitting article information to the device 10. The display screen may be LCD screen, an LED display screen, or other suitable display screen. In certain embodiments, the display screen 1000 may include a touch screen.

In operation, a customer may place articles 182 to be purchased within the container 994. As the articles 184 are placed within the inner volume 924, the NFC device 930 may read the NFC tags 184 located on the articles 182. The information received from the NFC tags 184 may be used to retrieve or extract article identification information, such as the article's SKU and purchase price. The NFC device 930 may then store the identification information until a connection is established with the POP device 10.

Figure 48:
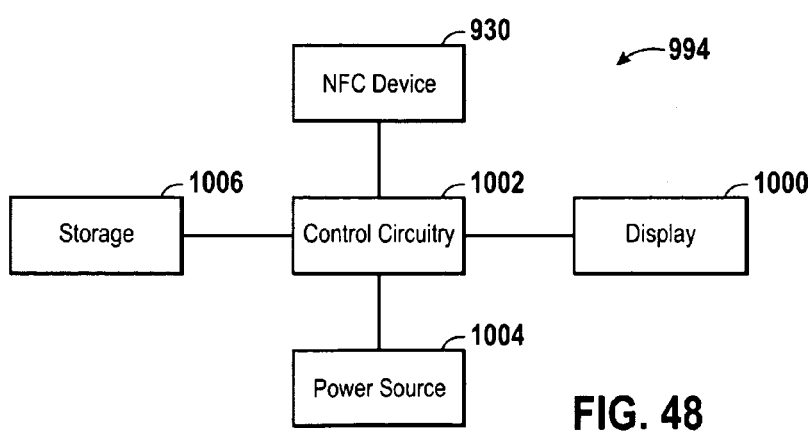
FIG. 48 is a simplified block diagram of the POP device of FIG. 47 in accordance with one embodiment.

FIG. 48 is a simplified block diagram of the container 994 shown in FIG. 47. The block diagram includes the NFC device 930 and the display 1000, as well as many other components. The operation of the container 994 may be controlled by control circuitry 1002, and powered by a power source 1004 that may include one or more batteries. The control circuitry 1002 may include control logic and circuitry, and in certain embodiments, may include one or more microprocessors. The control circuitry 1002 may receive signals from the NFC device 930 and may process the signals for transmission to the POP device 10. The control circuitry 1002 also may store information received from the NFC device 930 in storage 1006. The storage 1006 may be a non-volatile storage type such as read-only memory (ROM), flash memory, an optical disk, or other non-volatile computer readable media. The storage 1006 also may include volatile memory such as random access memory (RAM) and/or non-volatile memory such as read-only memory (ROM). The storage may hold the information until the information may be transmitted to the POP device 10.

Figure 49:
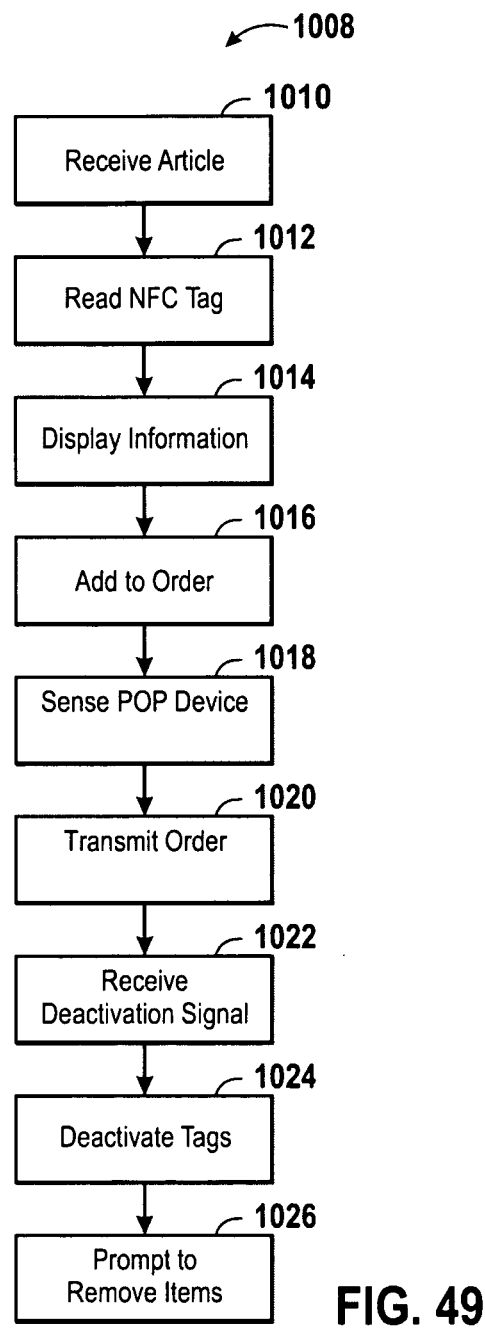
FIG. 49 is a flowchart depicting a method of determining conducting a sales transaction in accordance with one embodiment.

FIG. 49 is a flowchart depicting an exemplary method 1008 for conducting a sales transaction using the system 992 shown in FIG. 47. The method may begin by receiving (block 1010) an article. The article may be received when it is placed within the container 994 (FIG. 47). As the article is placed within the container, the NFC device 930 may read (block 1012) the NFC tag located on the article. The NFC tag may contain article identification information, such as price information and a serial number. The device 994 may then display information, such as the article's name or price, on the screen 1000 (block 1014). The device 994 also may add the item to the previously scanned articles that may be stored together as an order (block 1016). For example, the device 10 may update the display to show the article within an order summary shown on the display, and the device 994 may update the total purchase price to include the price of the article.

The device 994 may then store the order and the corresponding information until it senses (block 1018) the POP device 10. Upon sensing the POP device, the container 994 may transmit (block 1020) the order to the device 10. The container 994 may then receive (block 1022) a deactivation signal. For example, the deactivation signal may be sent from the device 10 after receiving a payment authorization. Upon receiving the deactivation signal, the container 994 may send a signal to deactivate (block 1024) the NFC tag located on the article. After deactivation, the device 994 may prompt (block 1026) the customer to remove the items. For example, the device 994 may display a notification message on the display screen 1000. The deactivation signal may be used to ensure that a customer has paid for all articles before leaving the store.

Figure 50:
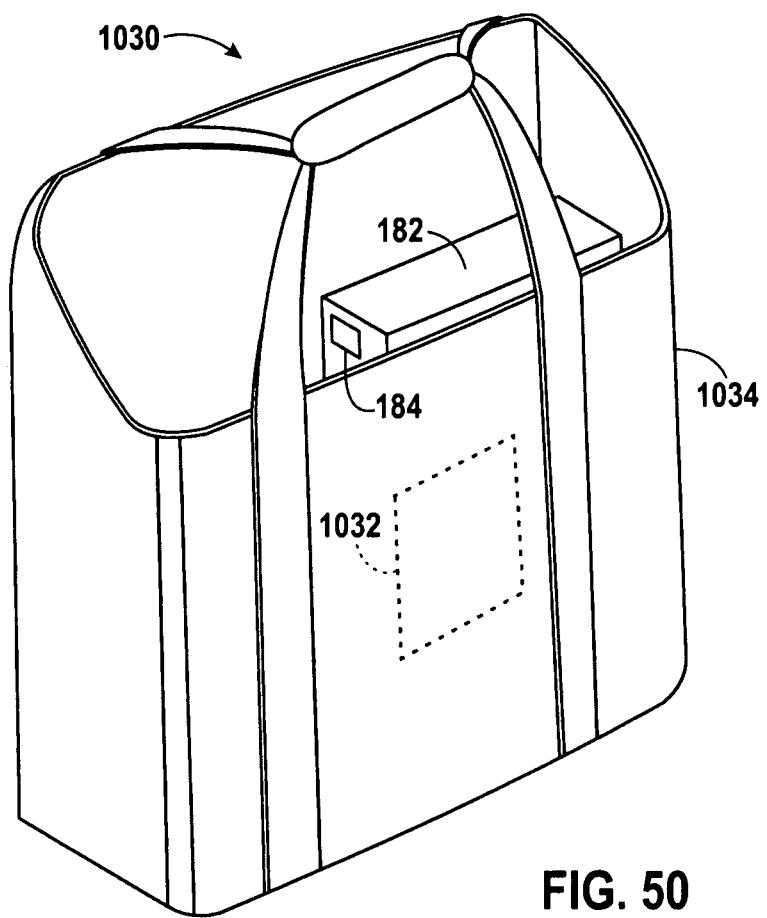
FIG. 50 is a perspective view of another POP device in accordance with one embodiment.

FIG. 50 illustrates another system 1030 that may be used to conduct a sales transaction with the POP device 10. The system 1030 includes a detachable reader 1032 that may be placed within a container 1034. The container 1034 may be a customer's personal shopping bag or a bag provided by the merchant. In certain embodiments, the container 1034 may be an environmentally friendly, reusable shopping bag. The detachable reader 1032 may function as an NFC device that may be attached to and removed from the POP device 10. For example, the detachable reader 1032 may be placed within the container 1034 while a customer is shopping. When detached, the reader 1032 may function in a read mode to read the tags 184 on articles 182 placed within the container 1034. The detachable reader 1032 may then be brought within close proximity to the POP device 10 to transfer the order information to the POP device. The POP device may then be used to receive payment information and obtain payment authorization as described with respect to FIGS. 9-29.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A handheld portable point of purchase device, comprising:
    a near field communication (NFC) device configured to sense connection to an NFC-enabled shopping container and to acquire identification information from one or more NFC-tagged articles disposed in the NFC-enabled shopping container;
    a processor configured to:
        transmit the identification information to an external server in a remote location;
        retrieve article information for the one or more NFC-tagged articles from the external server based on the identification information;
    a display configured to display the article information for the one or more NFC-tagged articles;
    an input configured to receive transaction information based on the identification information;
    a communication interface configured to:
        transmit the transaction information to an external device, and
        receive a transaction authorization based on the transaction information; and
    an NFC writer configured to:
        send a first signal to the one or more NFC-tagged articles for activating an in-store security feature of the one or more NFC-tagged articles, wherein the in-store security feature triggers an in-store security system when activated;

send a second signal to the one or more NFC-tagged articles for deactivating the in-store security feature of the one or more NFC-tagged articles;

wherein the processor is configured to cause the NFC writer to send the second signal when the transaction authorization is for a purchase of the one or more NFC-tagged articles and wherein the processor is configured to cause the NFC writer to send the first signal when the transaction authorization is for a return of the one or more NFC-tagged articles; and send a third signal to the one or more NFC-tagged articles to determine an activation status for each of the one or more NFC-tagged articles, wherein the processor configures the display to prompt for removal of the one or more NFC-tagged articles from the NFC-enabled shopping container when each of the one or more NFC-tagged articles has been deactivated.

2. The device of claim 1, comprising control logic for selecting the communication interface from a plurality of different type communication interfaces, wherein the selection is based on a preference stored within the portable point of purchase device.

3. The device of claim 1, wherein the article information comprises names of the one or more articles, or prices for the one or more articles, or a combination thereof.

4. The device of claim 1, wherein the near field communication device is configured to read the identification information for the one or more articles from a near field communication device of the shopping container.

5. The device of claim 1, wherein the near field communication device is configured to acquire the identification information in response to sensing connection to the shopping container.

6. A handheld portable point of purchase device, comprising:

a connection port configured to mate with a receptacle on a near field enabled shopping container to establish a physical connection between the portable point of purchase device and the shopping container;

a processor configured to sense connection to the shopping container, to acquire identification information, through the connection port, for one or more NFC-tagged articles disposed in the shopping container, to transmit identification information to an external server, and to retrieve article information for the one or more NFC-tagged articles based on the identification information;

a display configured to display the article information for the one or more NFC-tagged articles;

a near field communication device configured to receive transaction information based on the identification information;

a communication interface configured to transmit the transaction information to an external device and configured to receive a transaction authorization based on the transaction information; and an NFC writer configured to:

send a first signal to the one or more NFC-tagged articles for activating an in-store security feature of the one or more NFC-tagged articles, wherein the in-store security feature triggers an in-store security system when activated;

send a first signal to the one or more NFC-tagged articles for deactivating the in-store security feature of the one or more NFC-tagged articles;

wherein the processor configures the NFC writer to send the second signal when the transaction authorization is for a purchase of the one or more NFC-tagged articles and wherein the processor configures the NFC writer to send the first signal when the transaction authorization is for a return of the one or more NFC-tagged articles; and send a third signal to the one or more NFC-tagged articles to determine an activation status for each of the one or more NFC-tagged articles, wherein the processor configures the display to prompt for removal of the one or more NFC-tagged articles from the NFC-enabled shopping container when each of the one or more NFC-tagged articles has been deactivated.

7. The device of claim 6, wherein the processor is configured to display a notification on the handheld device that indicates establishment of the connection in response to sensing connection to the shopping container.

8. The device of claim 6, wherein the processor is configured to determine whether the portable point of purchase device is connected to the shopping container in response to receiving the payment authorization.

9. The device of claim 8, wherein the processor is configured to display a notification prompting a user to connect the portable point of purchase device to the shopping container in response to determining that the portable point of purchase device is not connected to the shopping container.

* * * * *